US006997017B2

(12) United States Patent
Pitbladdo

(10) Patent No.: US 6,997,017 B2
(45) Date of Patent: *Feb. 14, 2006

(54) OVERFLOW DOWNDRAW GLASS FORMING METHOD AND APPARATUS

(76) Inventor: Richard B. Pitbladdo, 6949 Bentgrass Dr., Naples, FL (US) 34113

( * ) Notice: Subject to any disclaimer, the term of this patent is extended or adjusted under 35 U.S.C. 154(b) by 0 days.

This patent is subject to a terminal disclaimer.

(21) Appl. No.: 10/826,097

(22) Filed: Apr. 16, 2004

(65) Prior Publication Data

US 2005/0076677 A1    Apr. 14, 2005

Related U.S. Application Data

(63) Continuation-in-part of application No. 09/851,627, filed on May 9, 2001, now Pat. No. 6,748,765.

(60) Provisional application No. 60/516,076, filed on Oct. 31, 2003, provisional application No. 60/506,038, filed on Sep. 25, 2003.

(51) Int. Cl.
 *C03B 17/00*    (2006.01)
(52) U.S. Cl. ............................. 65/53; 65/195
(58) Field of Classification Search .................... 65/53, 65/121, 193, 195
See application file for complete search history.

(56) References Cited

U.S. PATENT DOCUMENTS

| 1,673,907 A | 6/1928 | Ferngren |
| 1,697,227 A | 1/1929 | Danner |
| 1,731,260 A | 10/1929 | Nobbe |
| 1,759,229 A | 5/1930 | Drake |
| 1,829,639 A | 10/1931 | Ferngren |
| 1,829,641 A | 10/1931 | Ferngren |
| 1,841,579 A | 1/1932 | Fraser |
| 1,891,370 A | 12/1932 | Danner |
| 3,149,949 A | 9/1964 | Dockerty et al. ............... 65/53 |
| 3,338,696 A | 8/1967 | Dockerty ...................... 65/145 |
| 3,433,613 A | 3/1969 | Dockerty ...................... 65/145 |
| 3,437,470 A | 4/1969 | Overman ...................... 65/195 |
| 3,451,798 A | 6/1969 | Simon ......................... 65/199 |
| 3,506,429 A | 4/1970 | Overman ...................... 65/203 |
| 3,519,411 A | 7/1970 | Cortright et al. .............. 65/90 |
| 3,589,887 A | 6/1971 | Ward ........................... 65/195 |
| 3,607,182 A | 9/1971 | Leibowitz ..................... 65/53 |

(Continued)

FOREIGN PATENT DOCUMENTS

DE    1596484    7/1967

(Continued)

OTHER PUBLICATIONS

Varshneya, Arun, "Fundamentals of Inorganic Glasses", Academic Press, Inc., 1994, pp. 534-540.

(Continued)

*Primary Examiner*—Sean Vincent
(74) *Attorney, Agent, or Firm*—Brown & Michaels, PC

(57) ABSTRACT

The forming apparatus of the present invention preferably includes an orifice on top of the trough. The uniquely shaped orifice substitutes for the weirs as the controlling entity for glass thickness. The orifice is designed such that as it deforms, it maintains a linear flow characteristic with respect to its length. As the orifice is made larger by the applied stress, the percentage width increase is the same over its length and consequently the percentage flow increase is the same over the length of the orifice. In another embodiment, the present invention provides an adjustment to change the flow characteristics of the trough to compensate for the degradation of the forming trough during an extended production run. A flow control plug can be inserted into the trough, such that flow dynamics can be altered during hot operation by insertion, removal or position adjustment of the flow control plug.

54 Claims, 42 Drawing Sheets

U.S. PATENT DOCUMENTS

| | | | |
|---|---|---|---|
| 3,682,609 A | 8/1972 | Dockerty | 65/83 |
| 3,723,082 A | 3/1973 | Knowles et al. | 65/84 |
| 4,214,886 A | 7/1980 | Shay et al. | 62/121 |
| 4,416,678 A | 11/1983 | Bottger | 65/2 |
| 5,374,595 A | 12/1994 | Dumbaugh, Jr. et al. | 501/66 |
| 6,319,867 B1 | 11/2001 | Chacon et al. | 501/66 |
| 2003/0029199 A1 | 2/2003 | Pitbladdo | 65/195 |
| 2003/0110804 A1 | 6/2003 | Fenn et al. | 65/90 |
| 2003/0192349 A1 | 10/2003 | Meda et al. | 65/53 |

FOREIGN PATENT DOCUMENTS

| | | |
|---|---|---|
| DE | 1596402 | 12/1967 |
| DE | 1596403 | 12/1967 |
| DE | 21 58 253 | 11/1971 |
| DE | 31 11484 A1 | 2/1983 |
| DE | 33 16795 | 11/1983 |
| DE | 31 11484 C2 | 12/1983 |
| DE | 33 14540 | 12/1983 |
| DE | 3329843 | 5/1984 |
| DE | 3507852 | 8/1985 |
| DE | 3518137 | 1/1986 |
| DE | 43 36 046 | 10/1993 |
| DE | 43 26 143 | 12/1993 |
| DE | 196 44 673 | 4/1998 |
| DE | 198 09 878 | 9/1999 |
| DE | 198 40 113 | 3/2000 |
| DE | 19964043 | 7/2001 |
| DE | 100 21 013 | 11/2001 |
| DE | 100 28 741 | 12/2001 |
| FR | 1549081 | 12/1967 |
| FR | 1549915 | 1/1968 |
| GB | 982153 | 2/1965 |
| JP | 09110443 | 4/1997 |
| JP | 10291827 | 11/1998 |
| JP | 11-246230 | 9/1999 |
| JP | 2001-80922 | 9/1999 |

OTHER PUBLICATIONS

Snyder, R.D./Byars, E.F., "Engineering Mechanics", McGraw-Hill Book Company, 1973, pp. 349-350.

Kingery, W.D.; Bowen, H.K.; Uhlmann, D.R., "Introduction to Ceramics", John Wiley & Sons, 1976, pp. 705-767.

Bottger, et al.; "LCD substrate—the future process" International Glass Review, Issue 2—2000; 3 pages.

Bocko, Peter L. and Mitchell, Mark H. "AMLCD Glass Substrates—Foundation for High-Tech Displays" The GlassReseacher, vol. 12, No. 1, pp. 26-29, 2002.

Section A-A   Section A-A   Section A-A

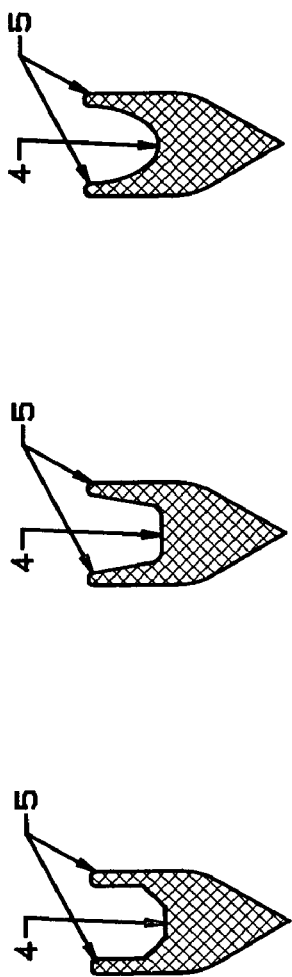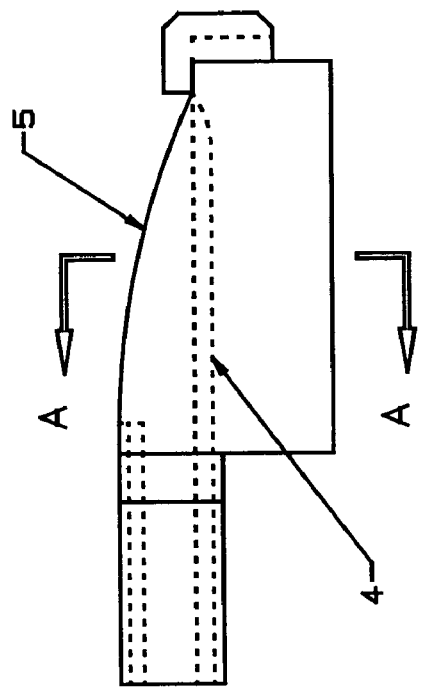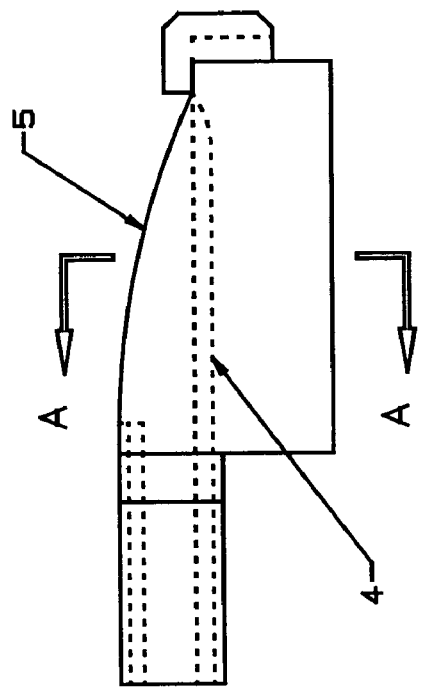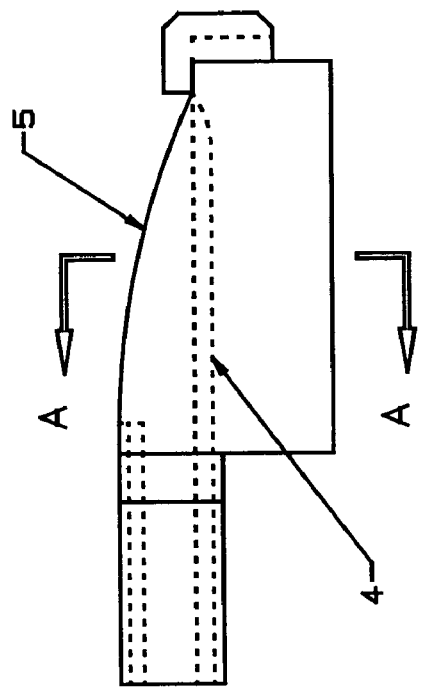

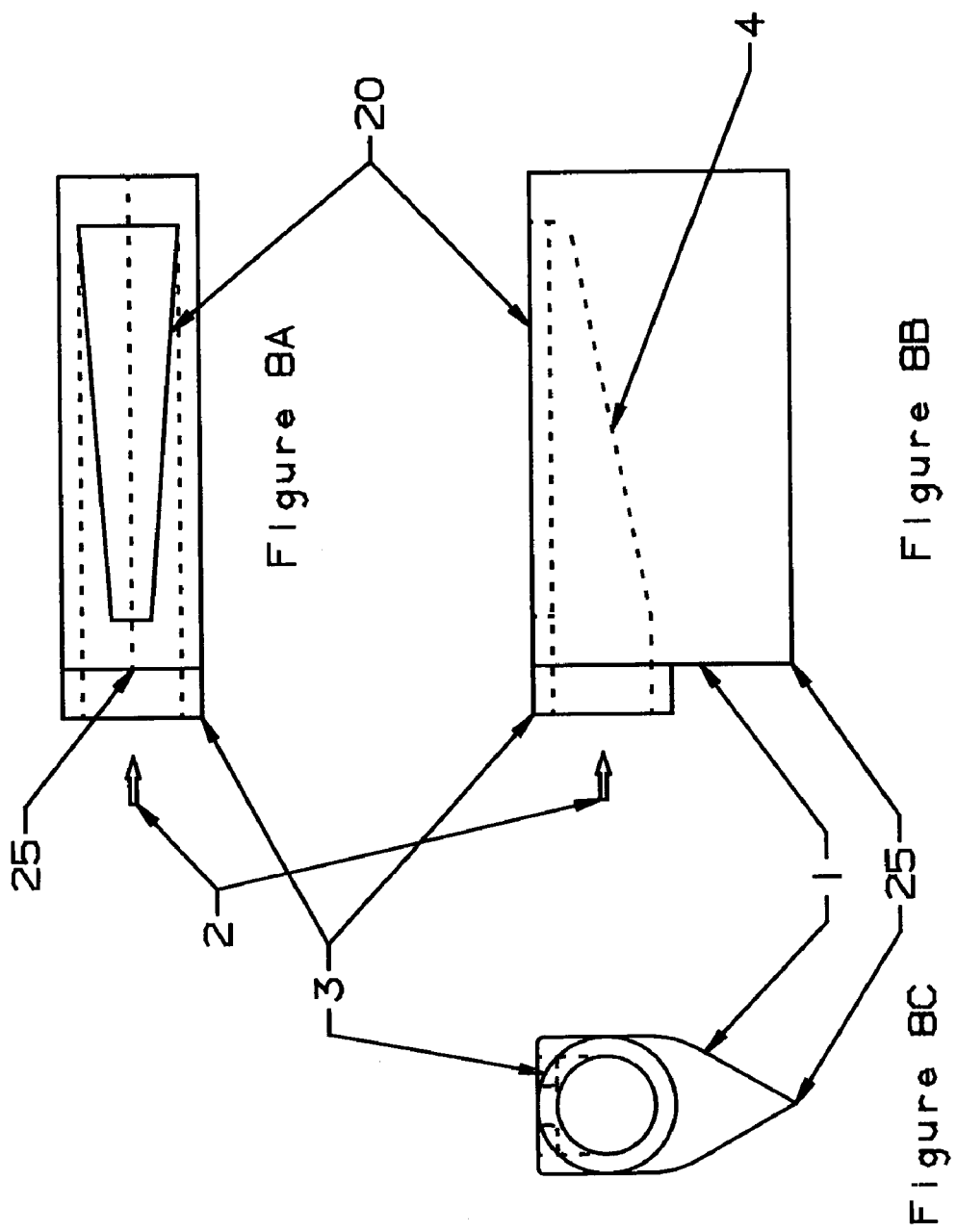

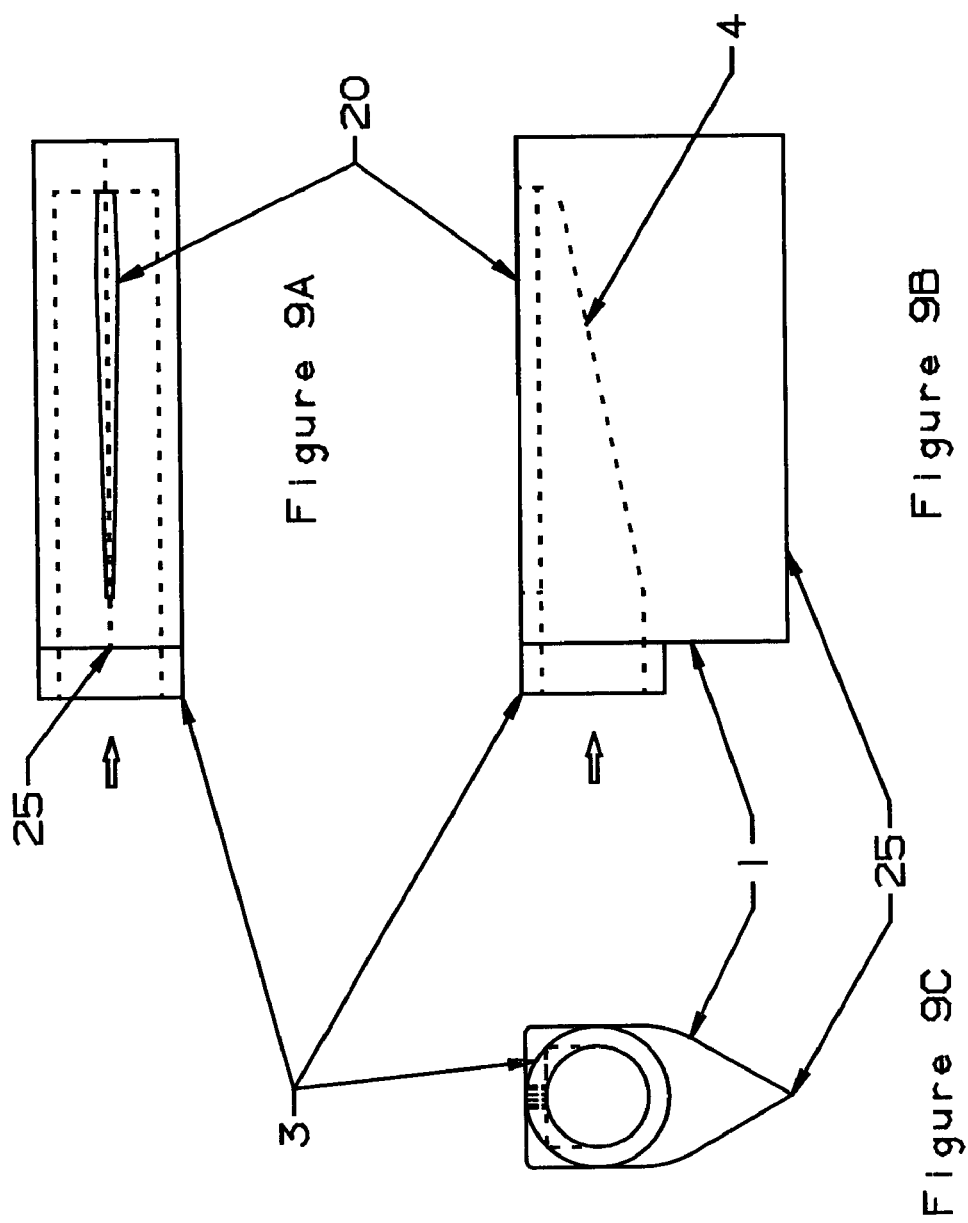

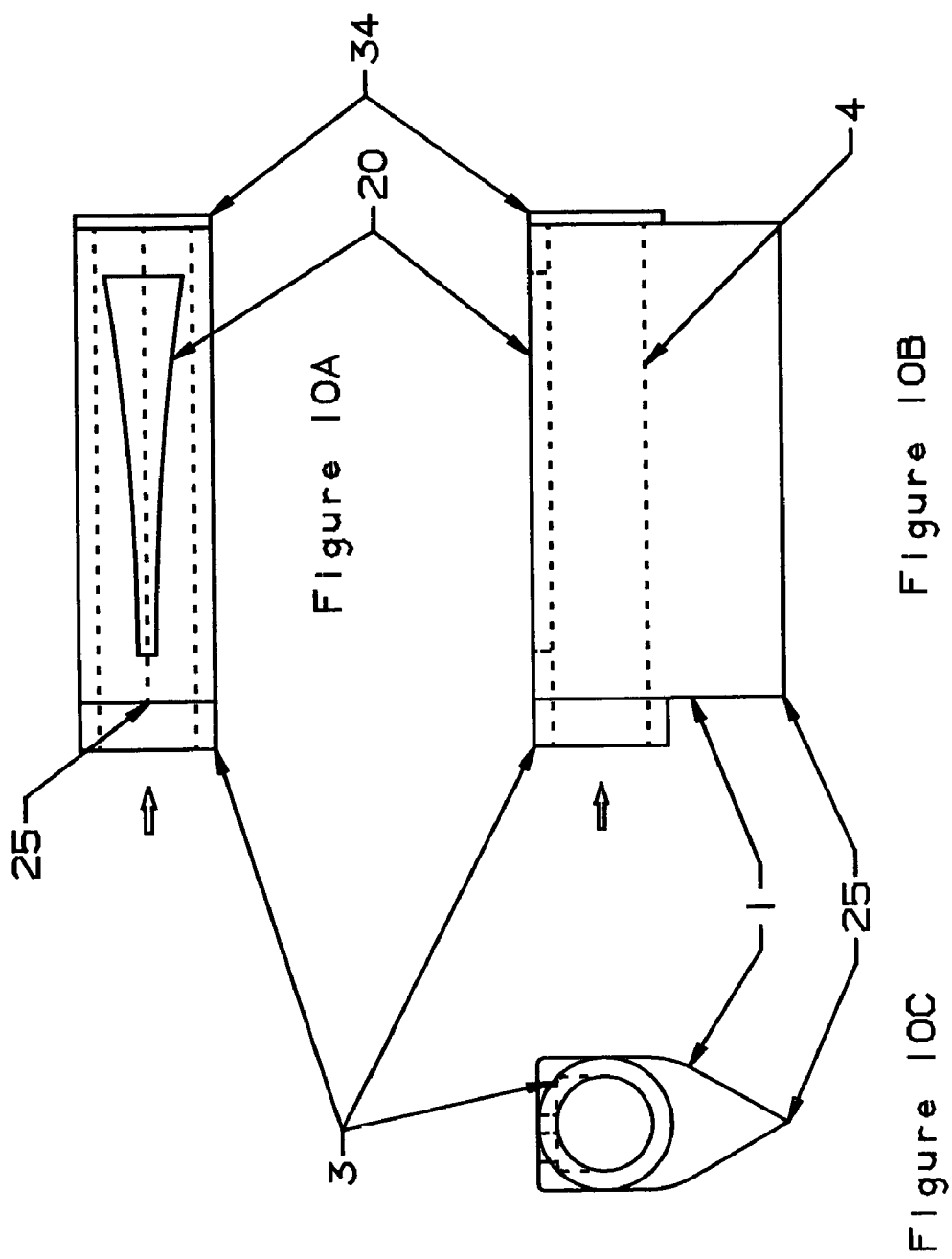

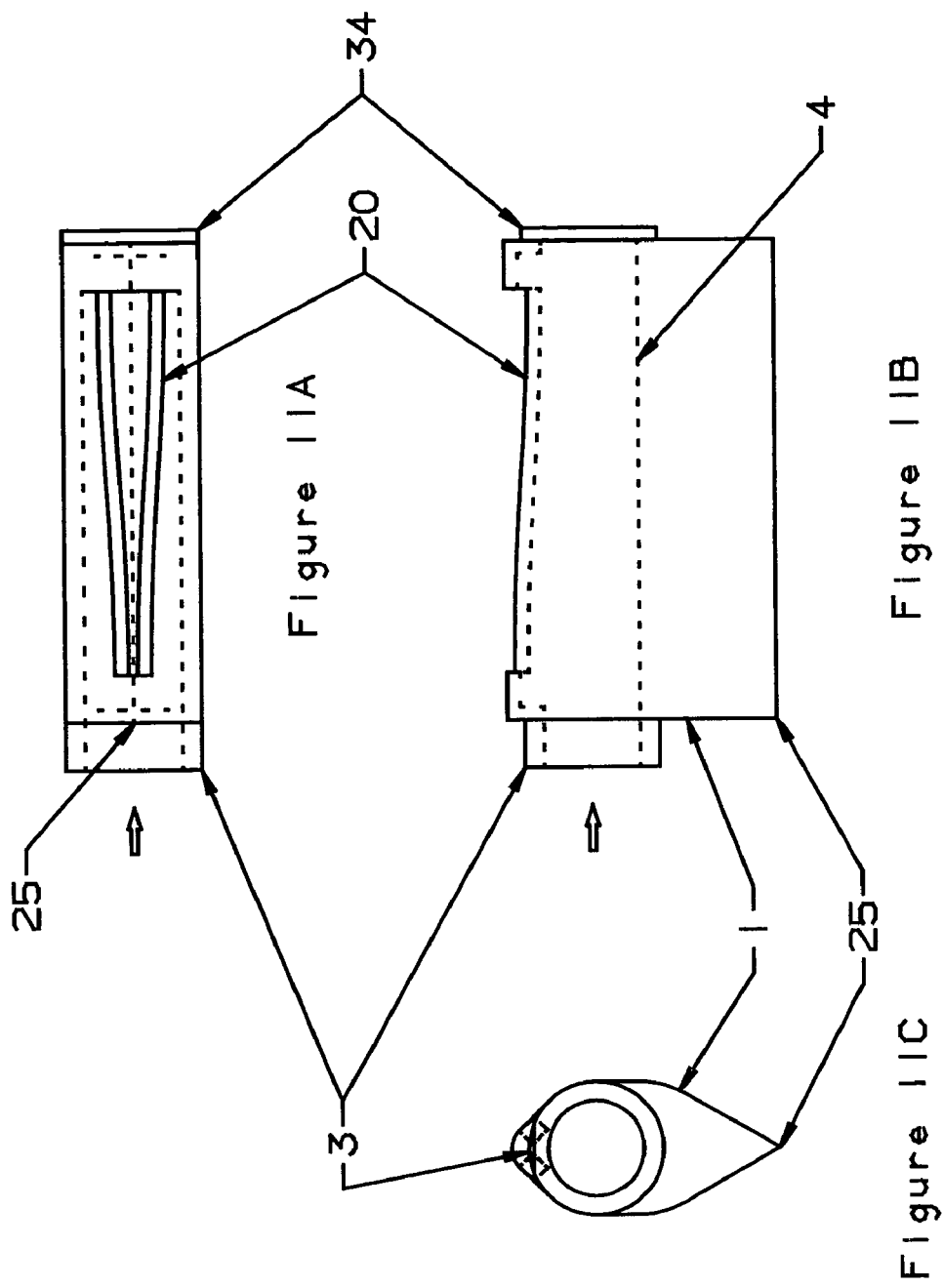

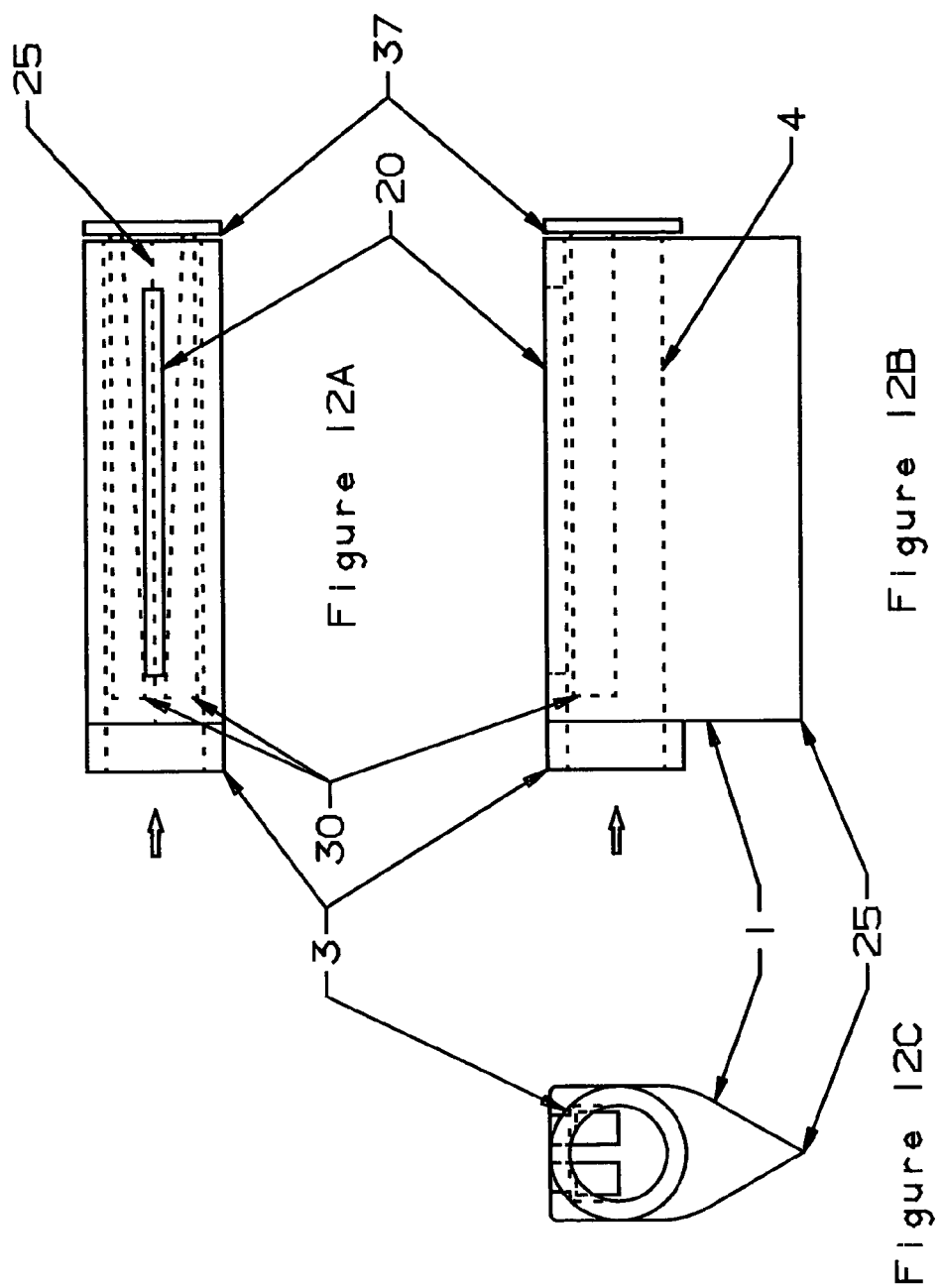

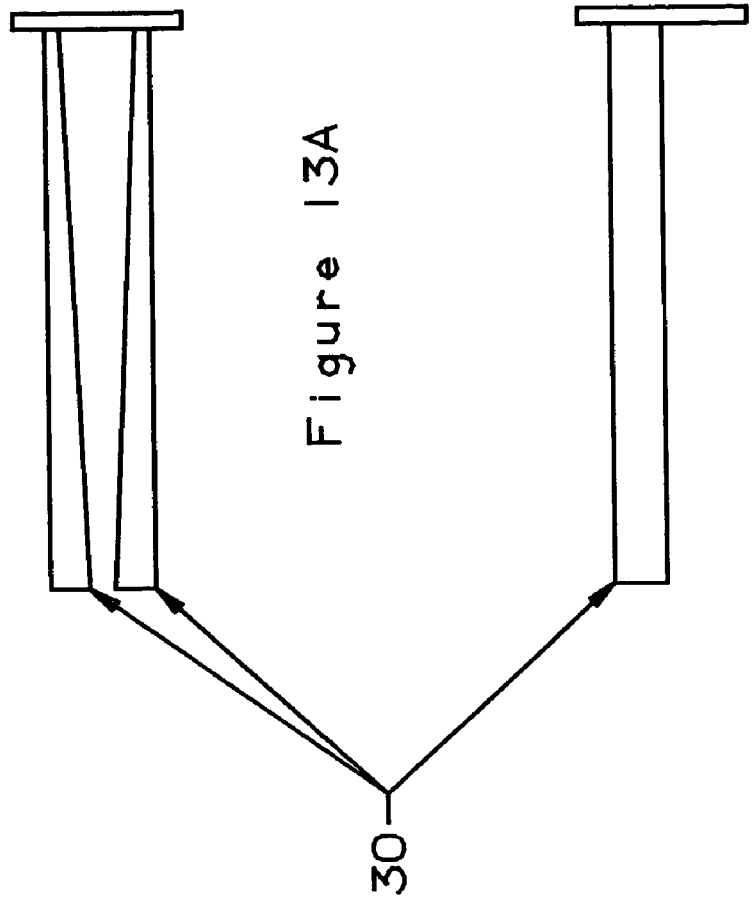
Figure 13A
Figure 13B
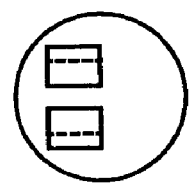
Figure 13C

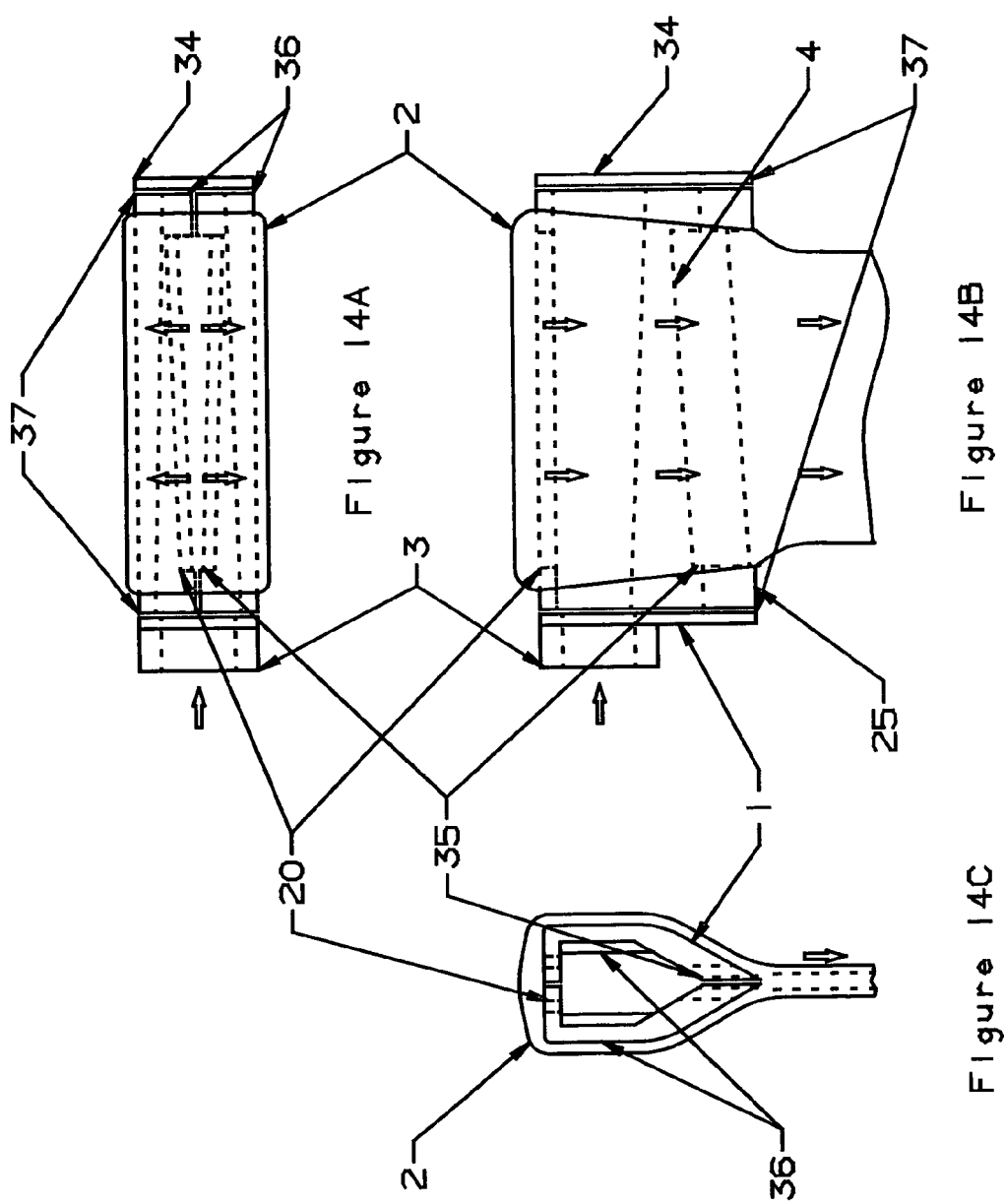

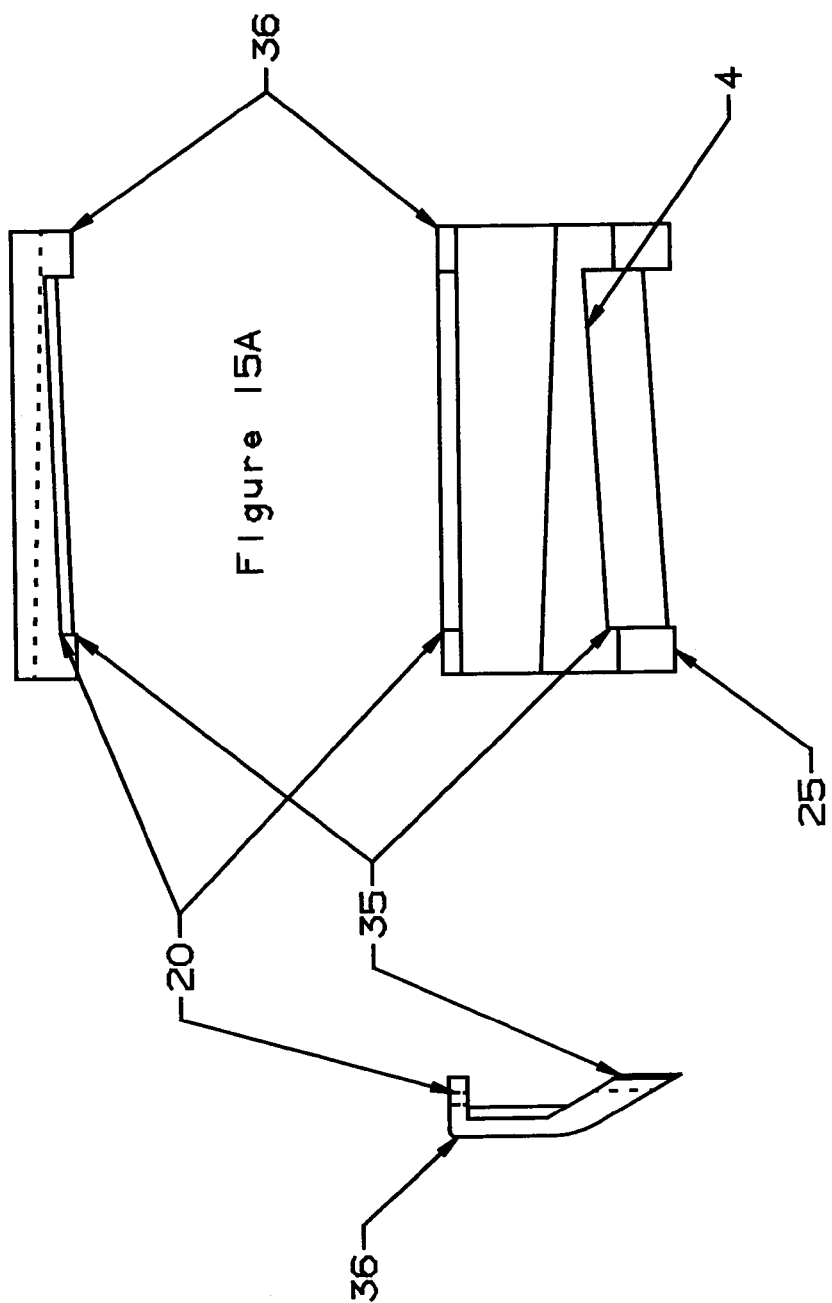

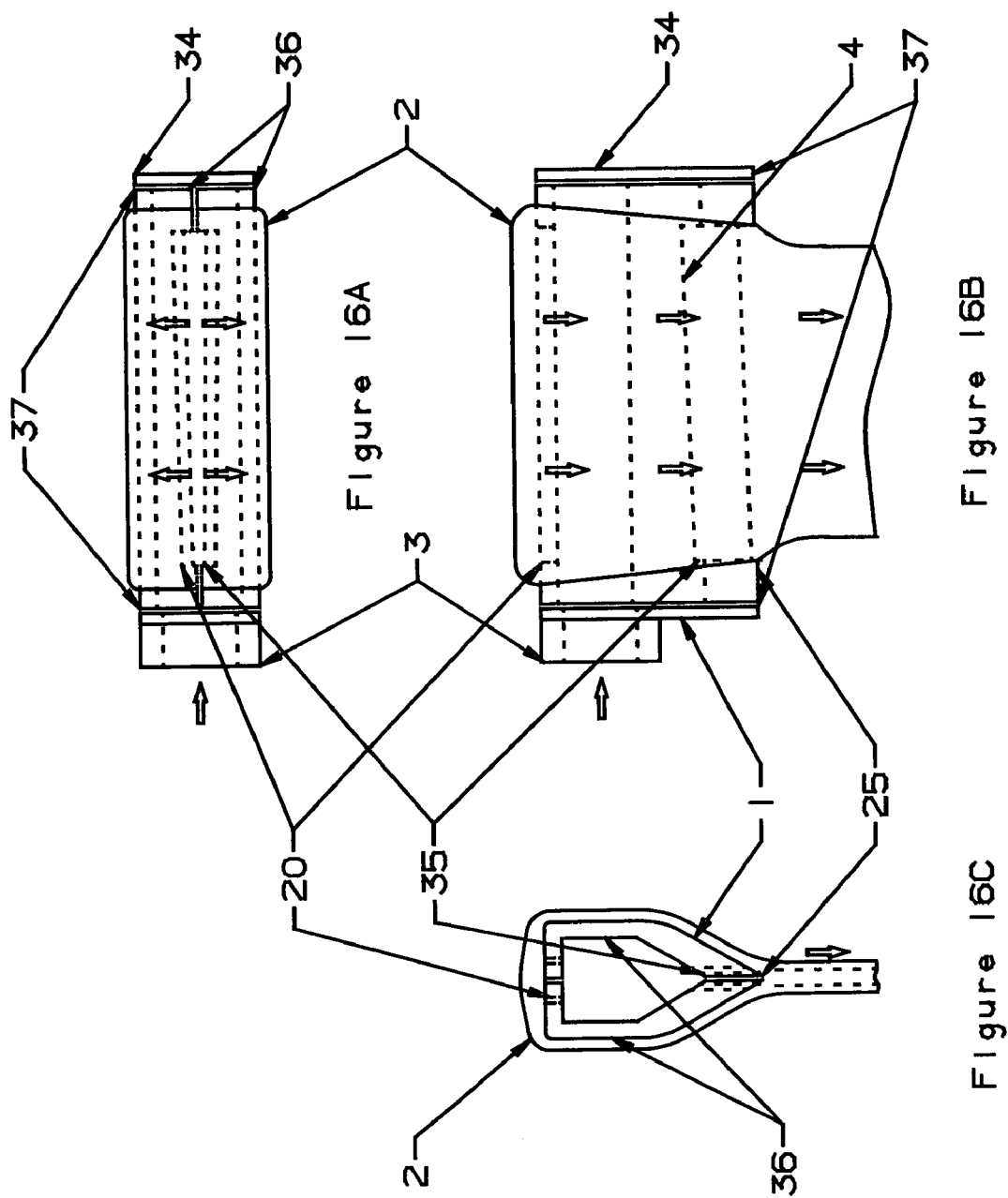

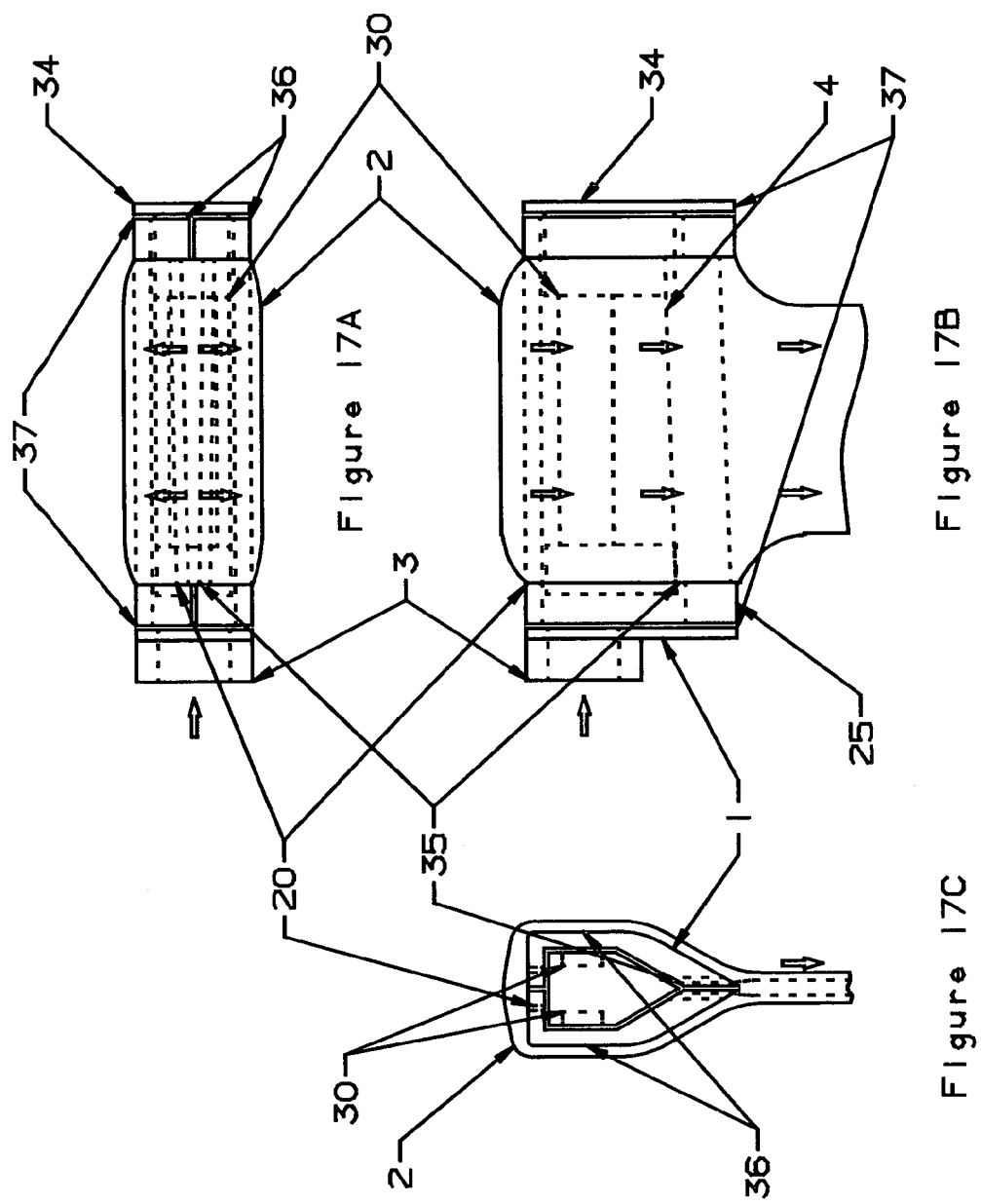

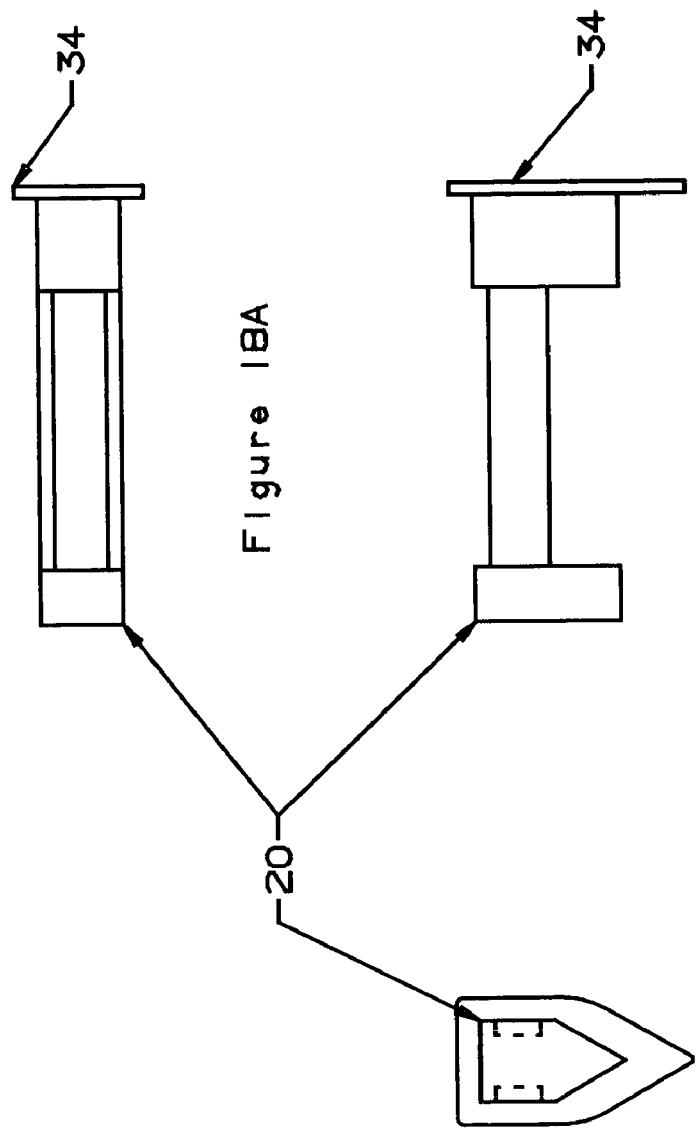

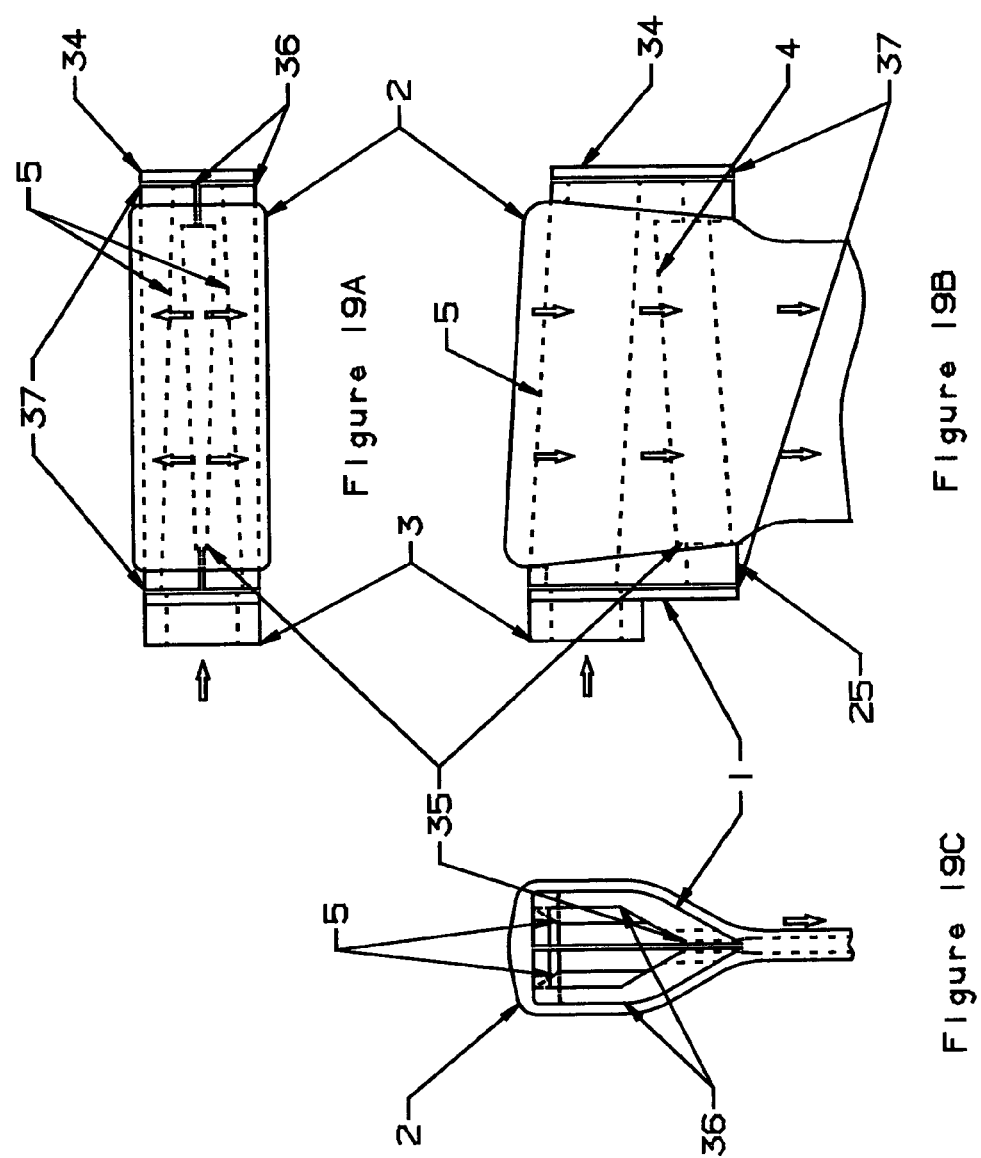

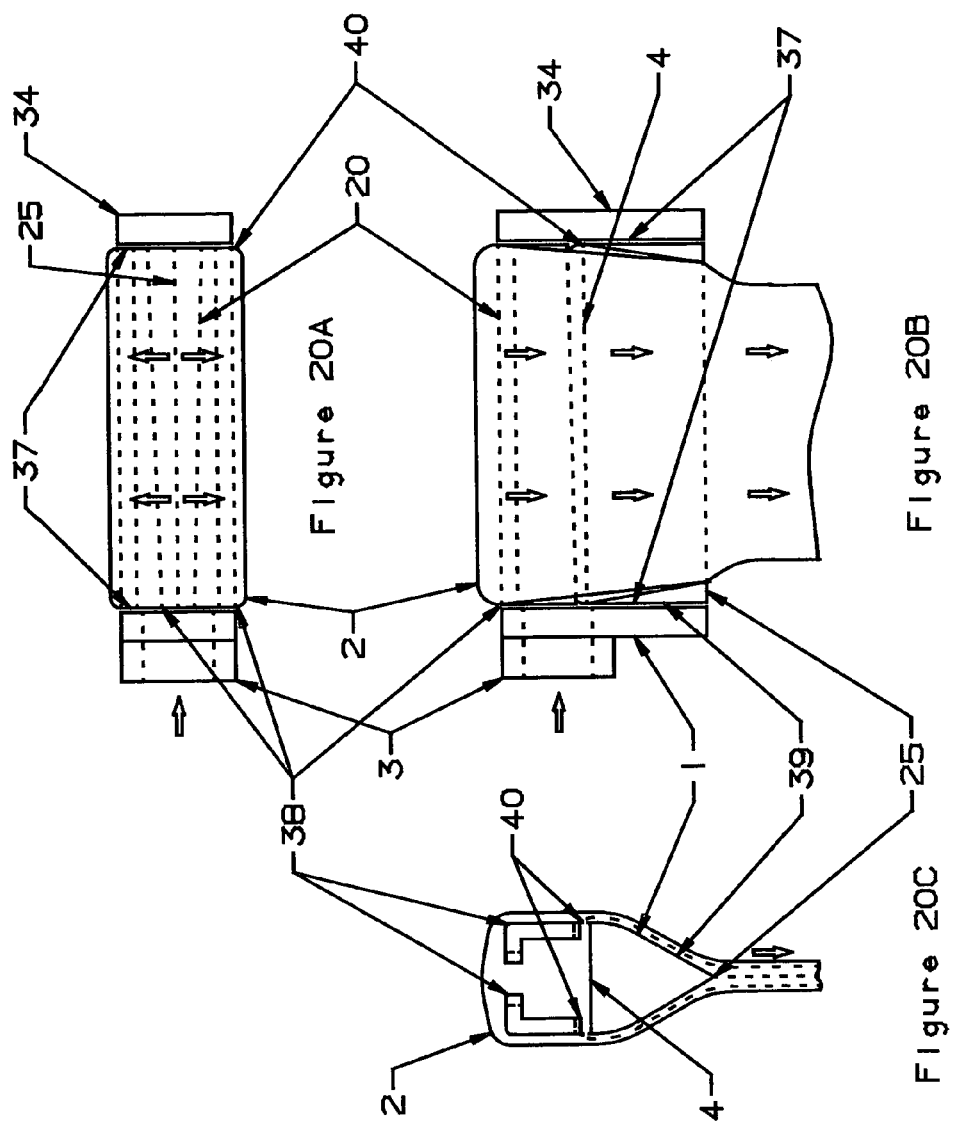

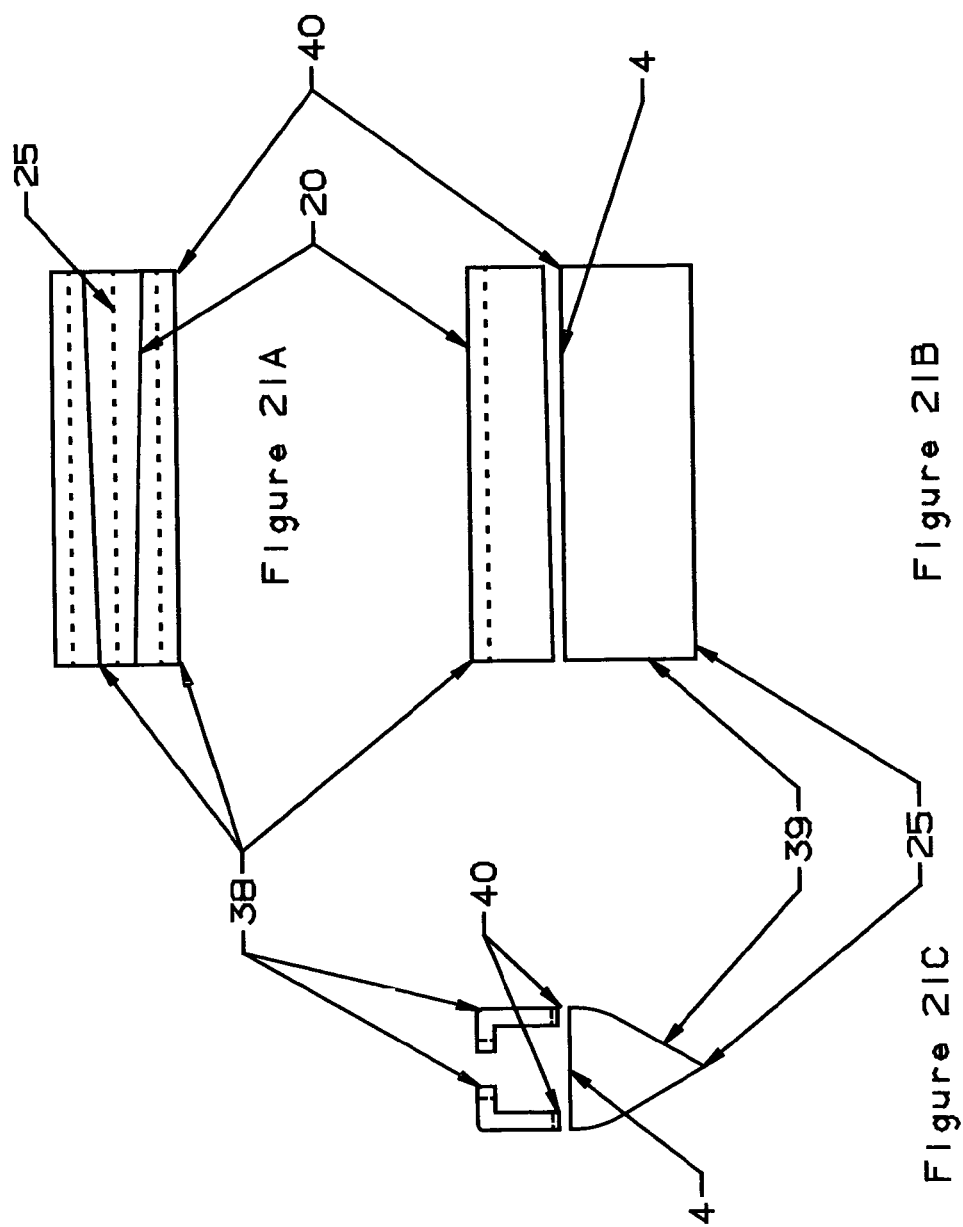

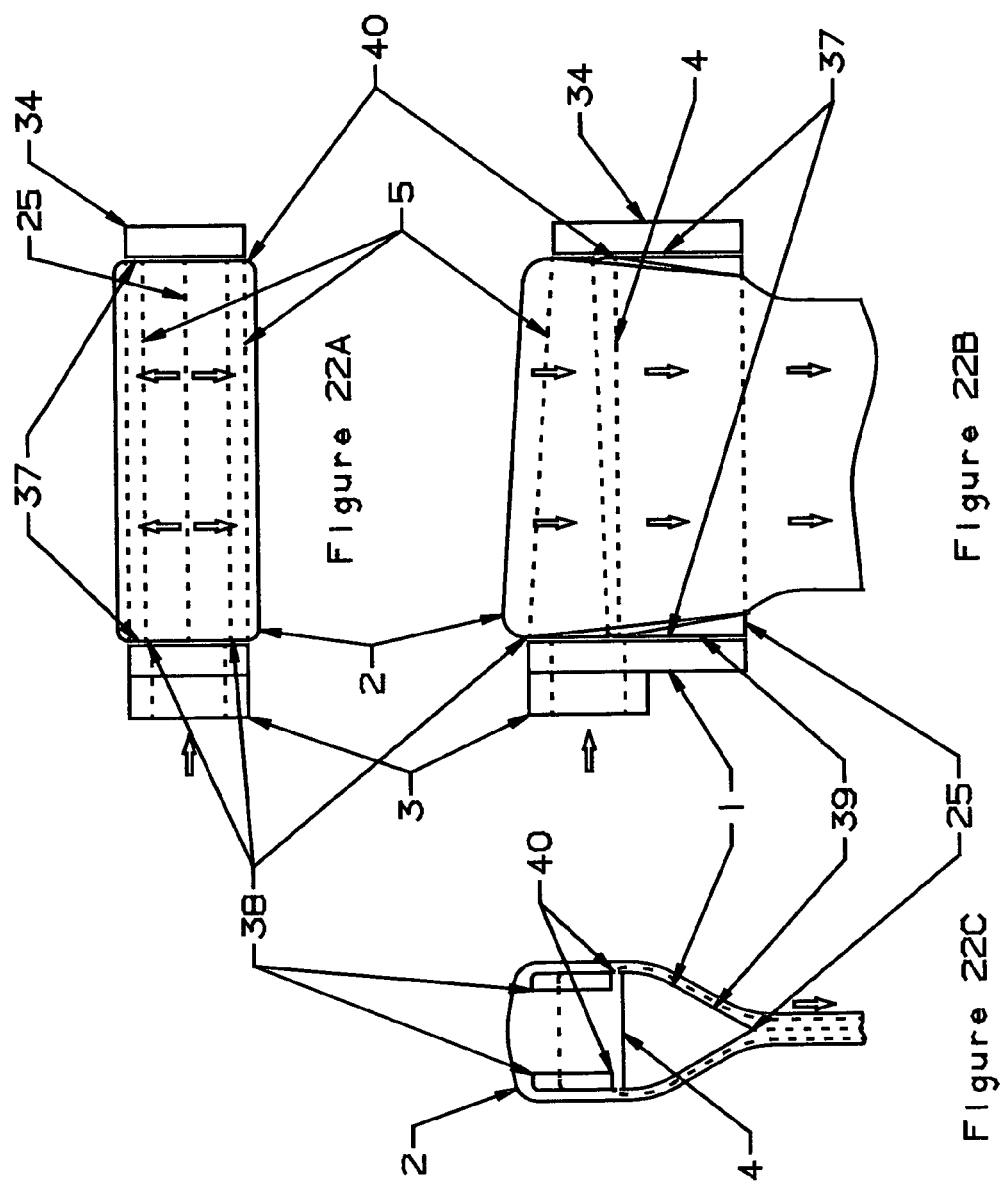

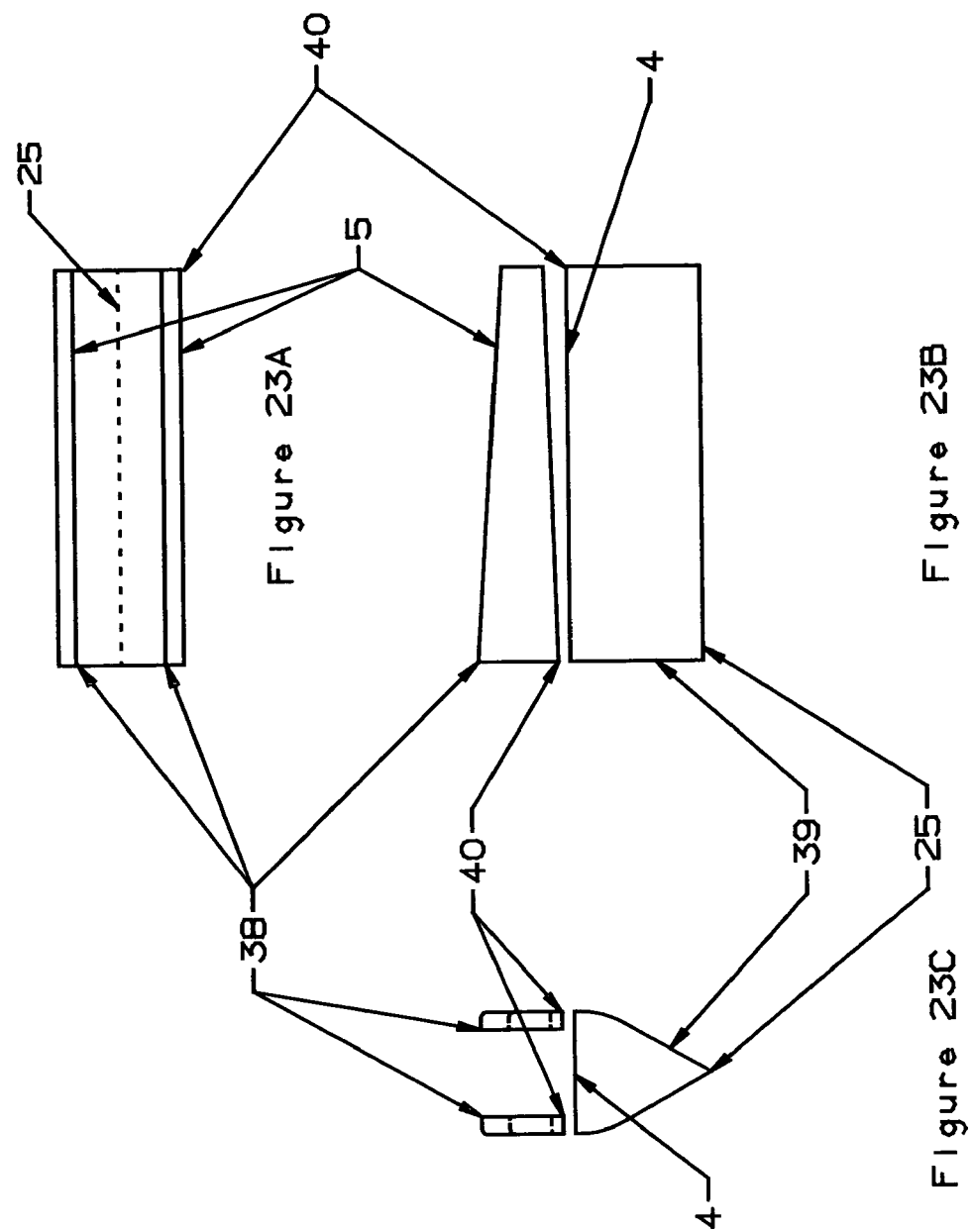

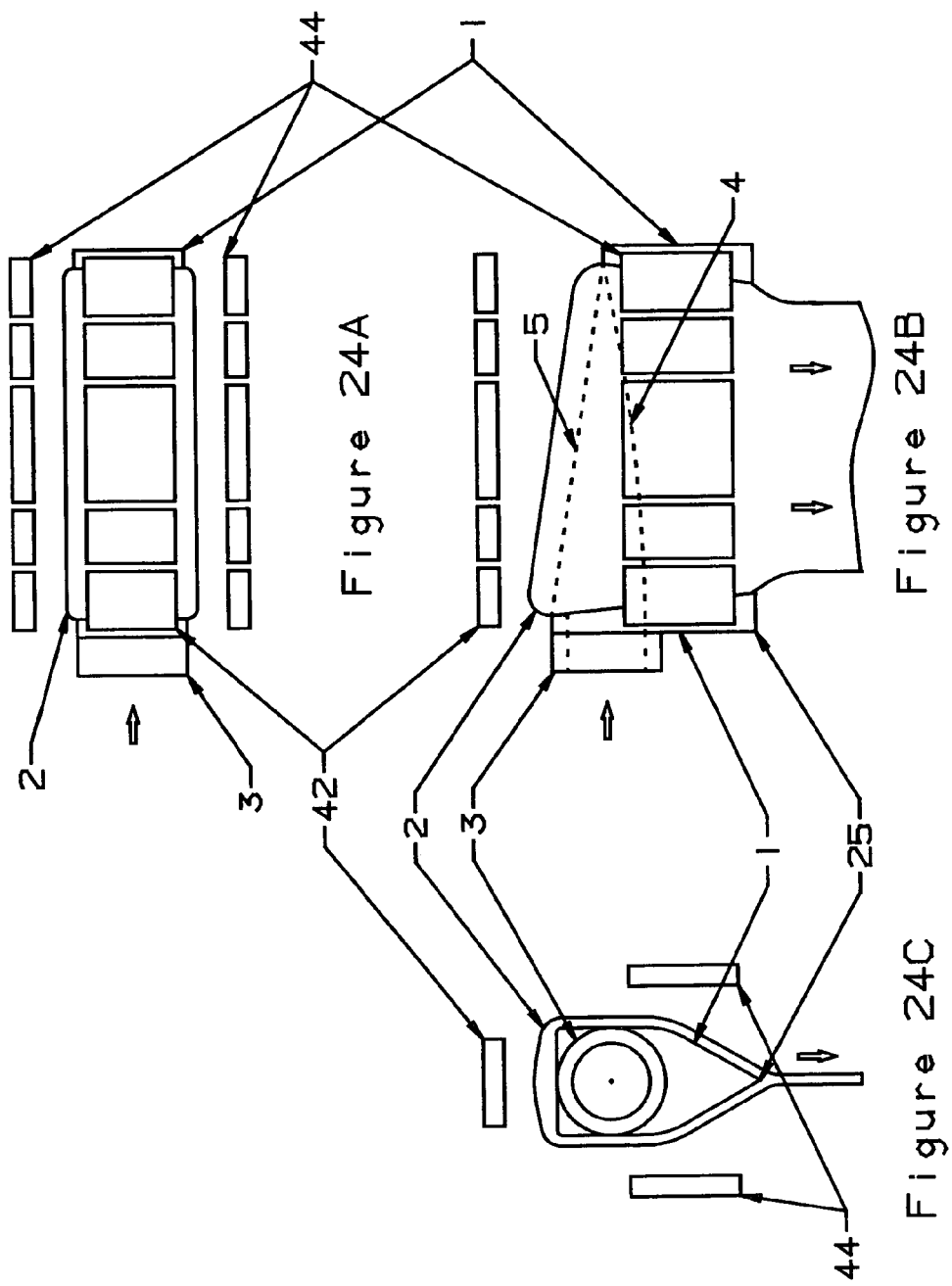

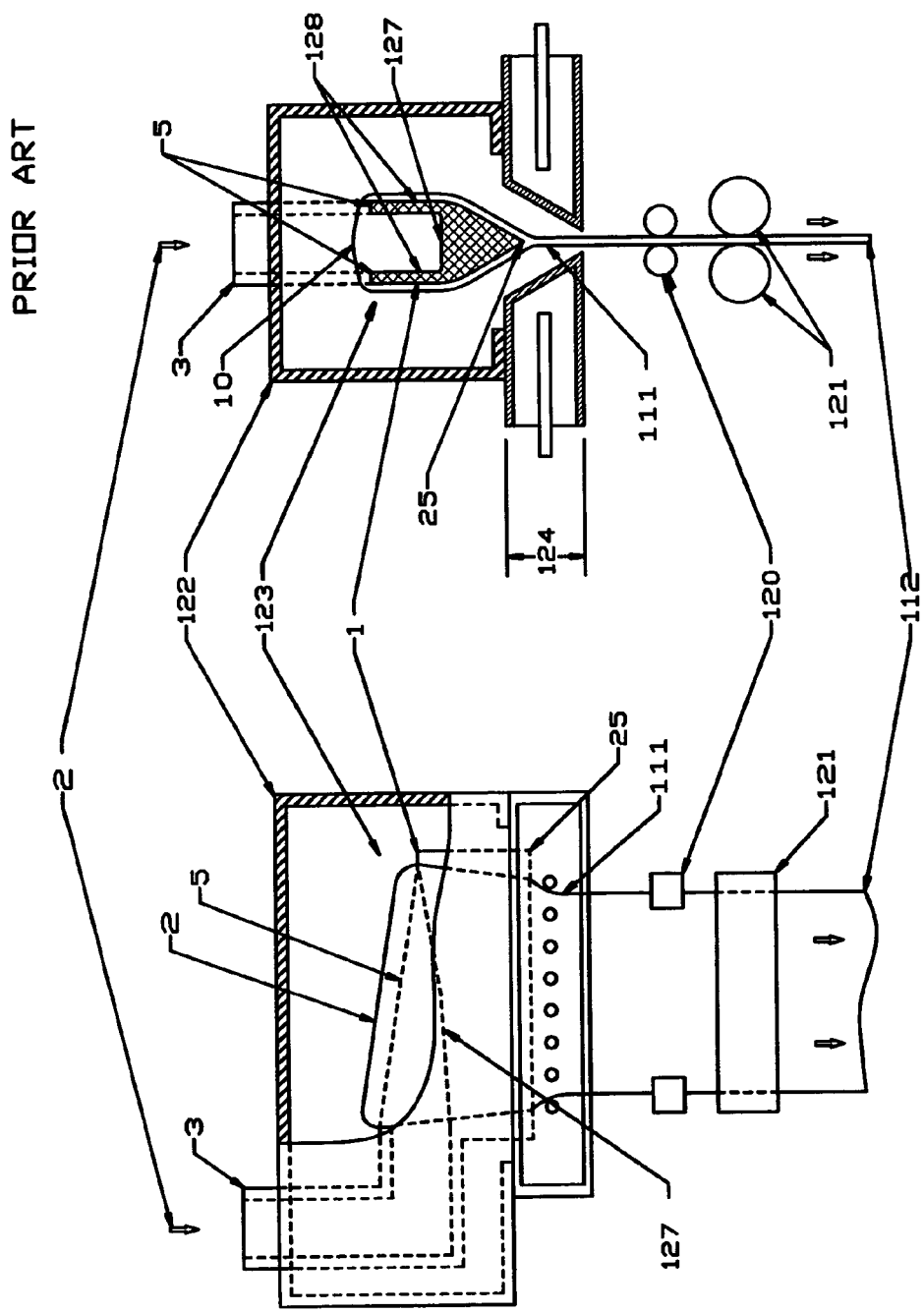

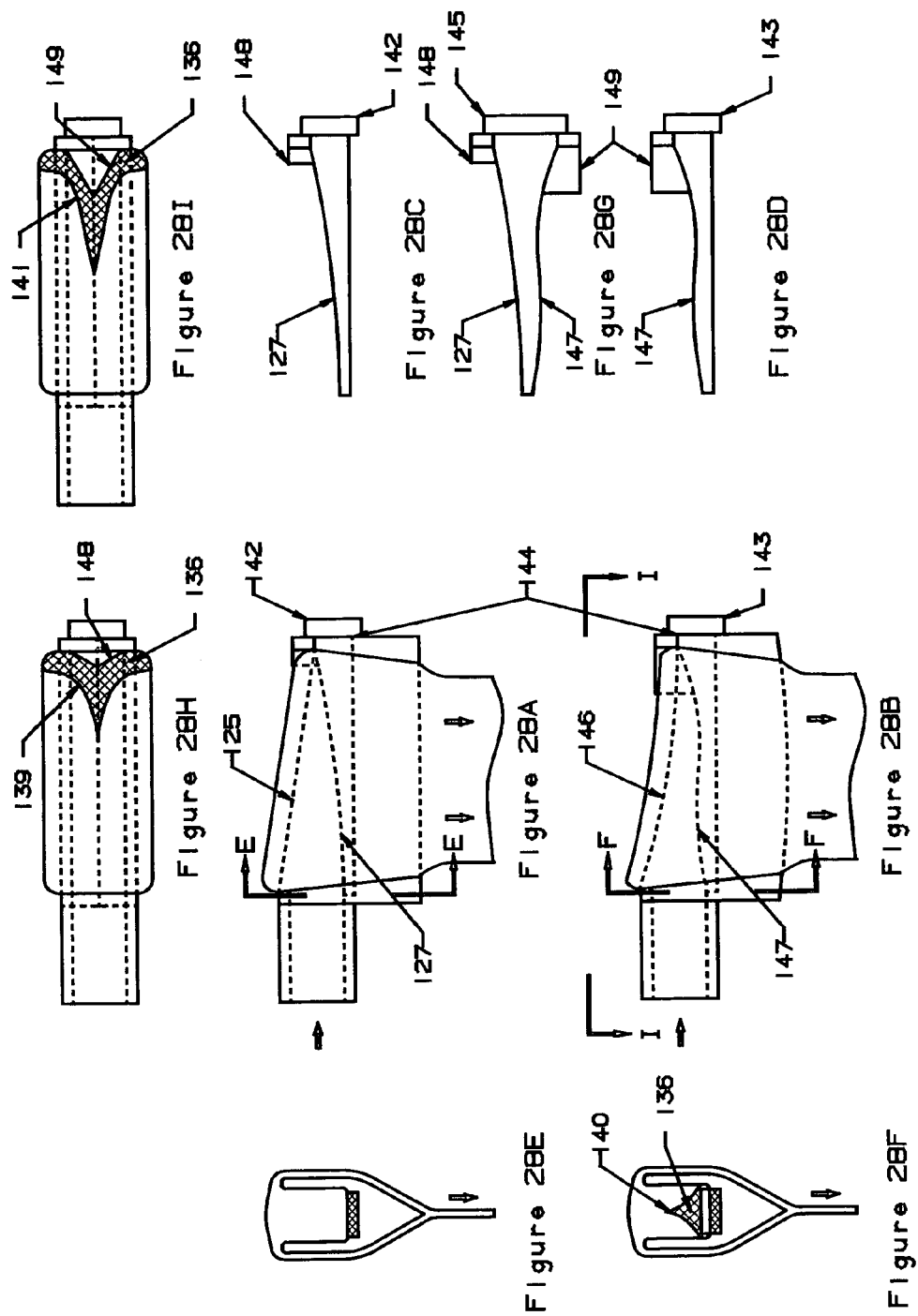

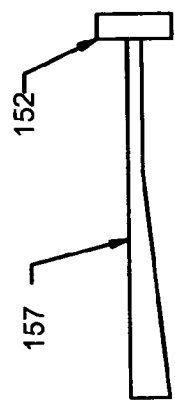
Figure 29C
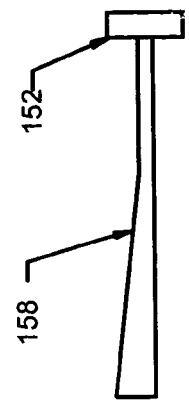
Figure 29D
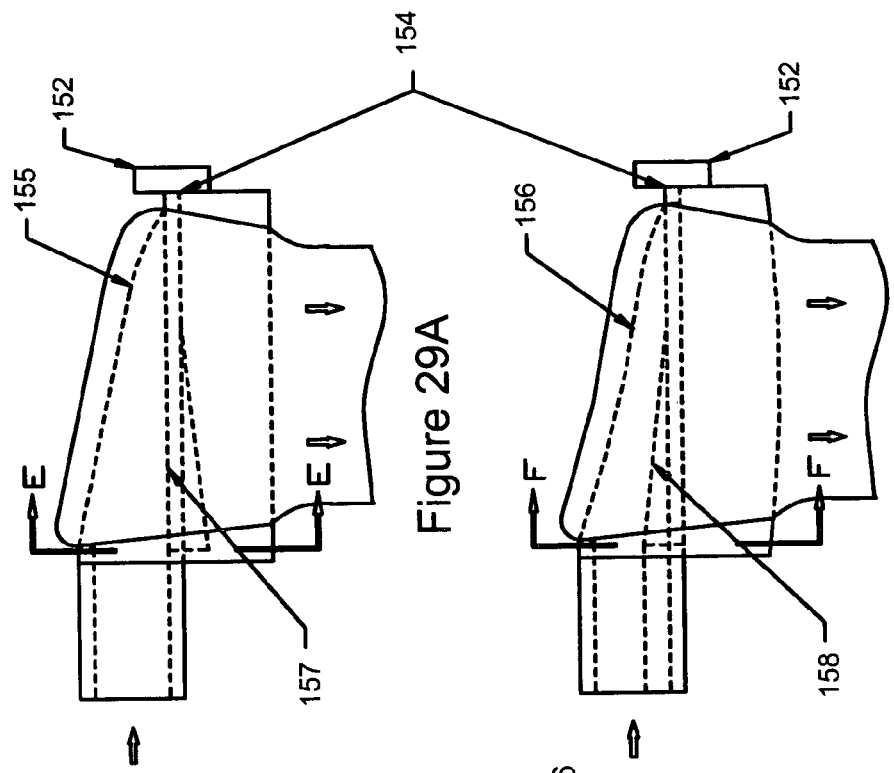
Figure 29A
Figure 29B
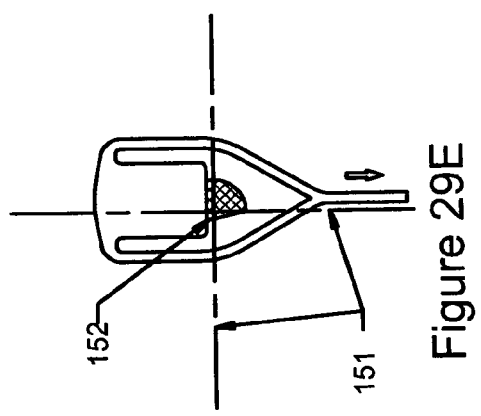
Figure 29E
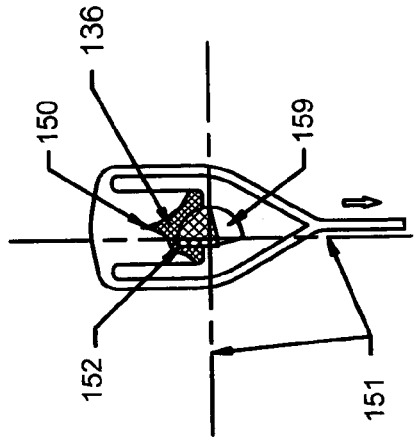
Figure 29F

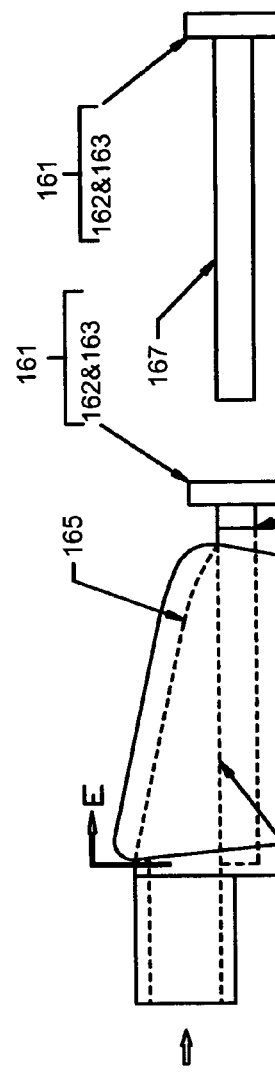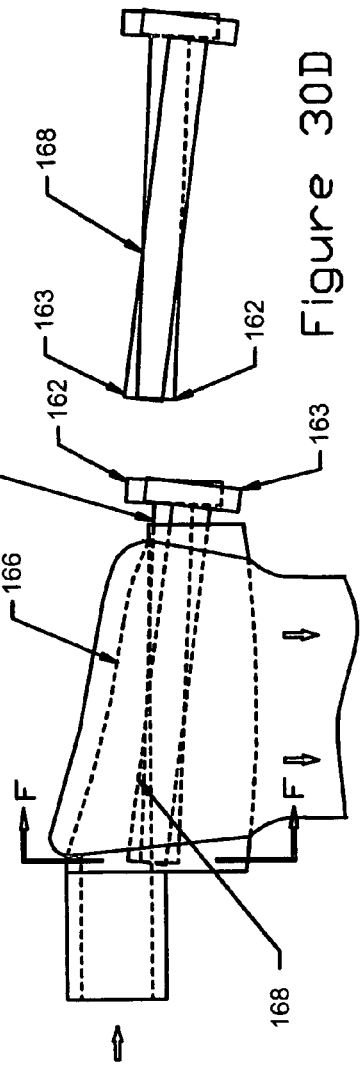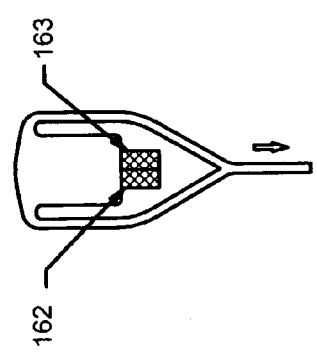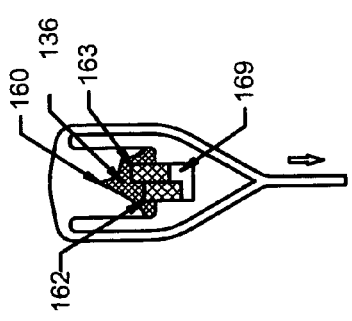

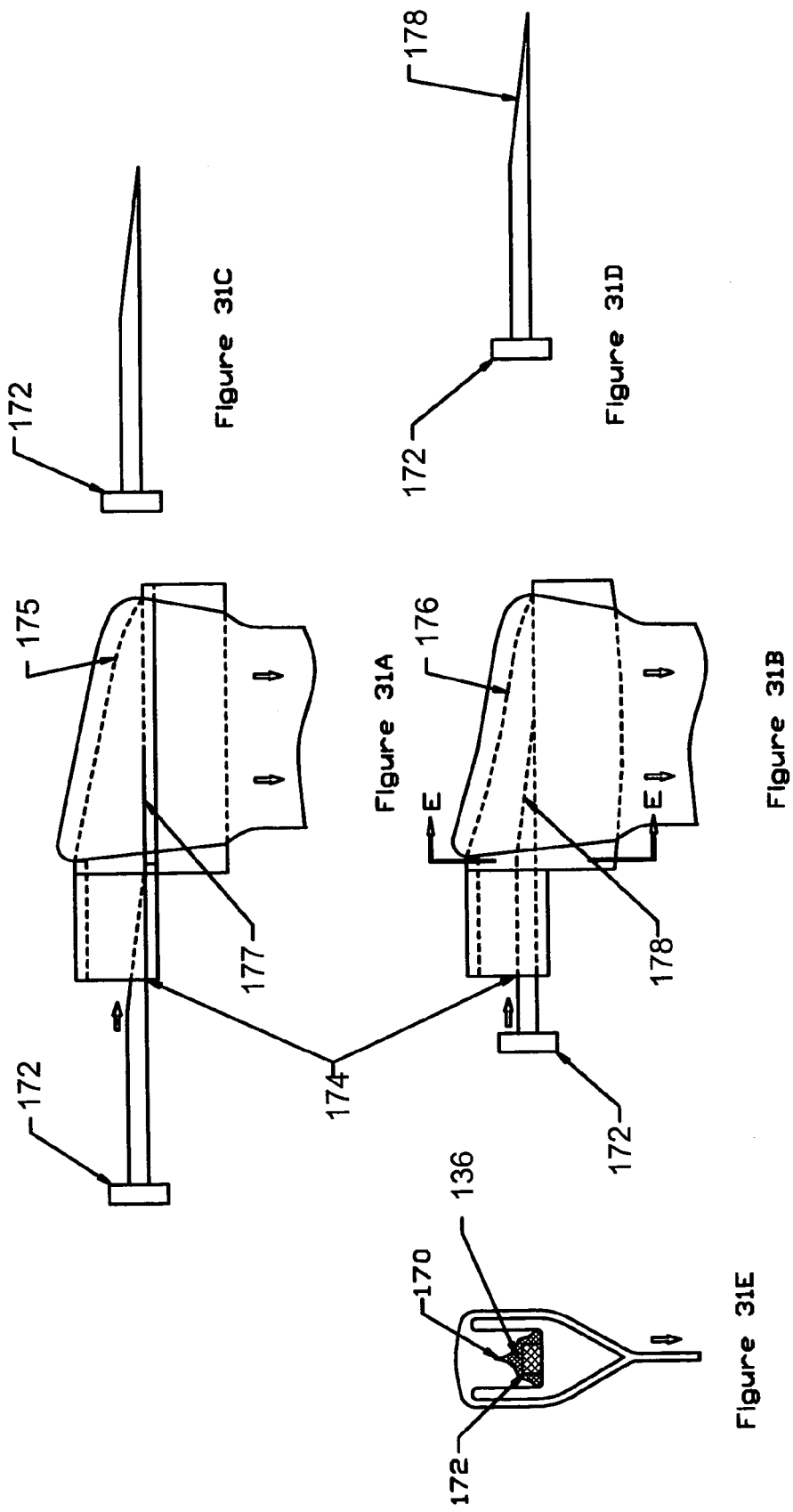

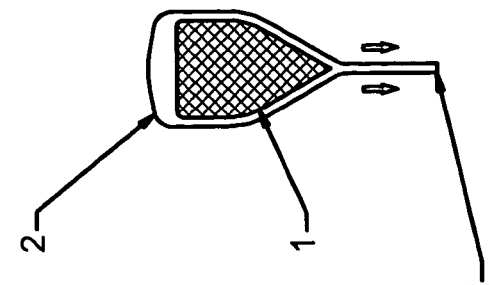
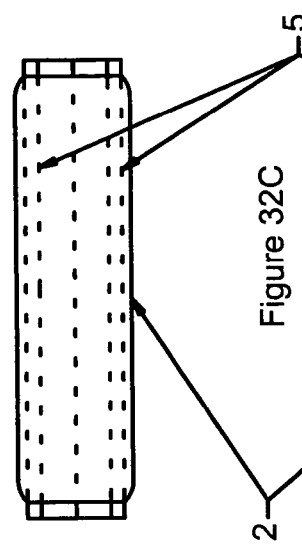
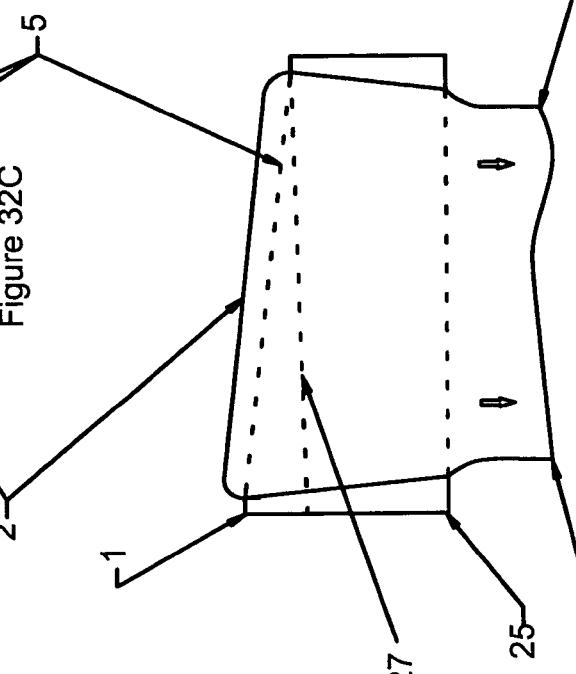
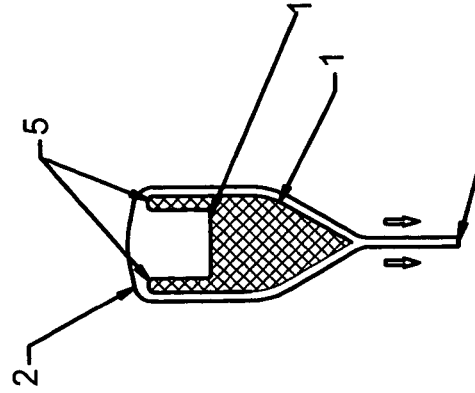
PRIOR ART
Figure 32D
Figure 32C
Figure 32A
Figure 32B

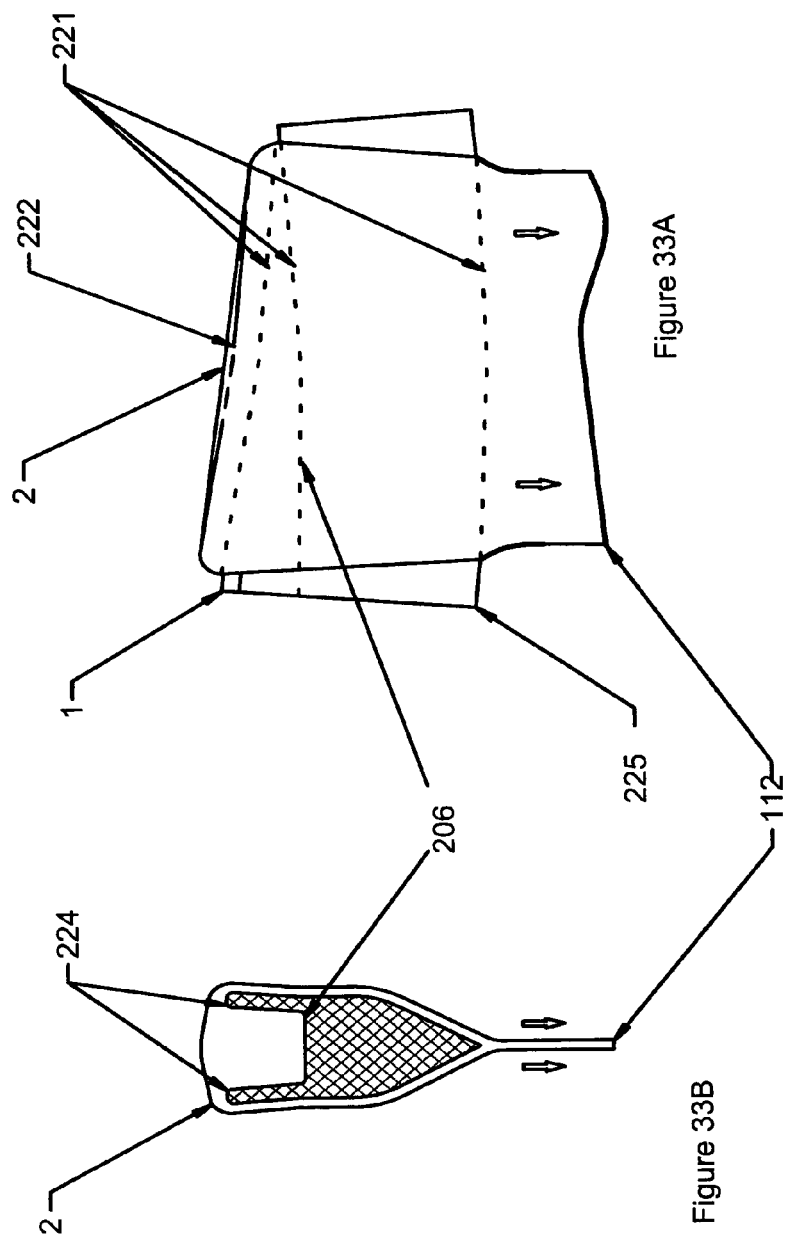

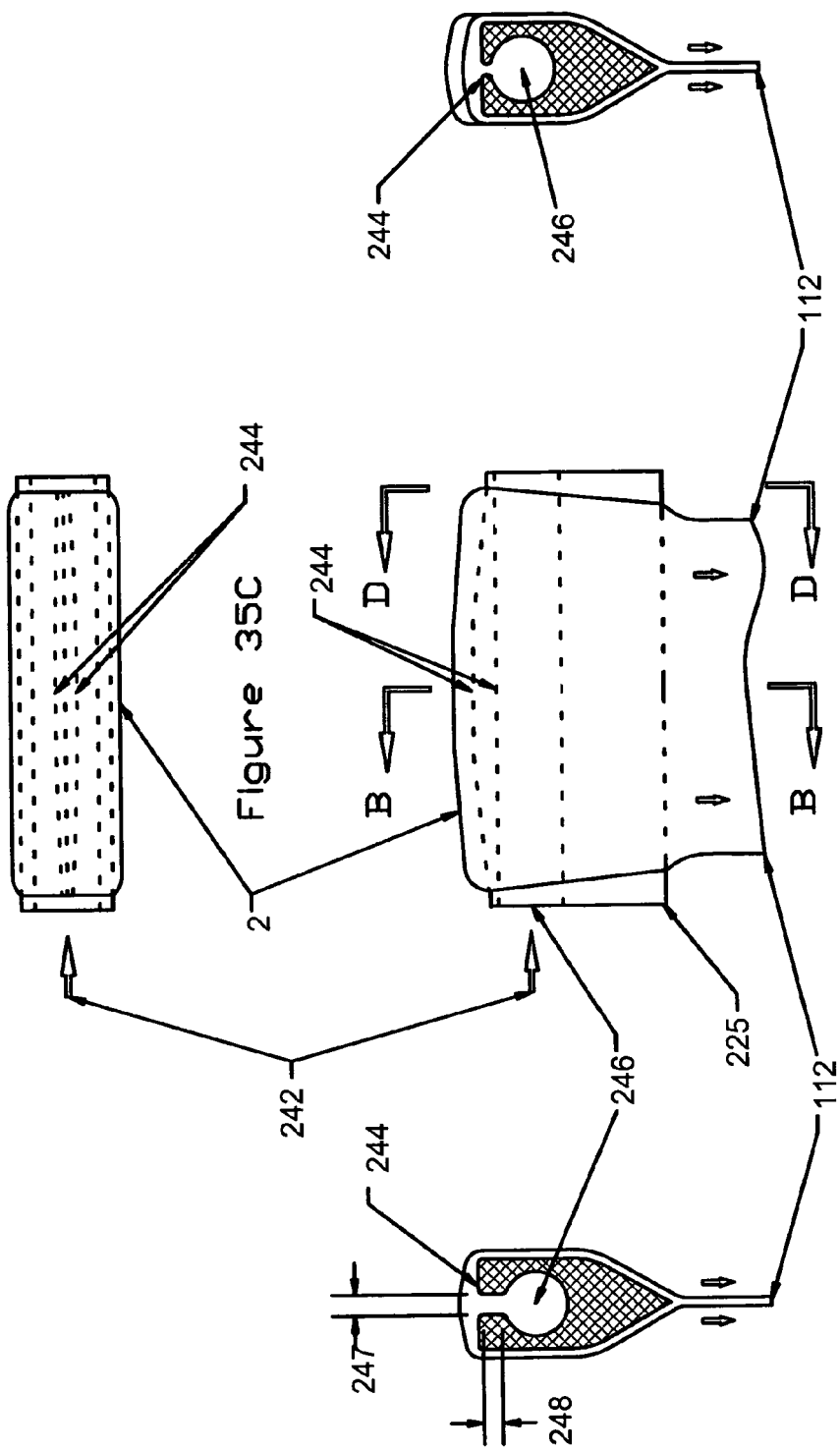

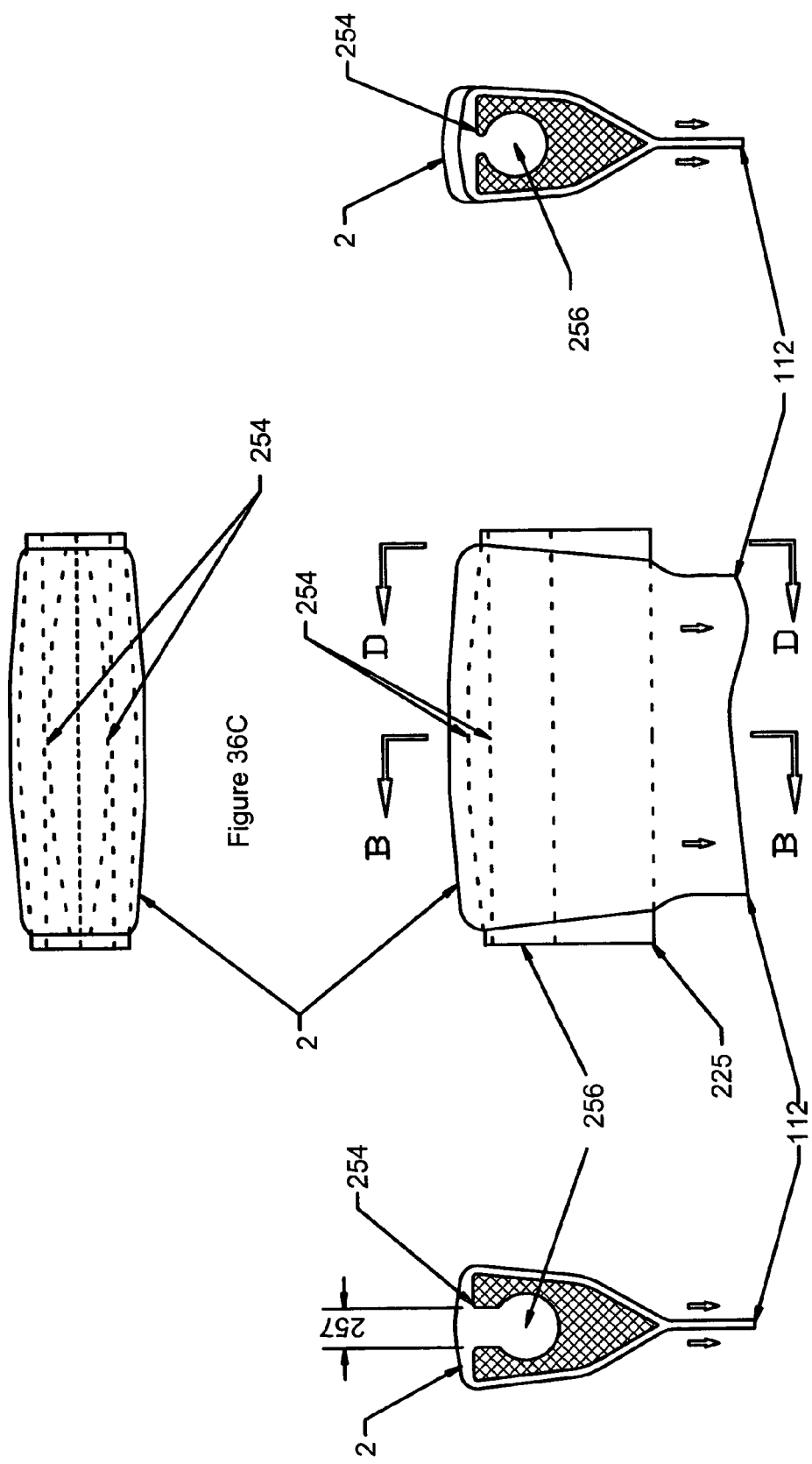

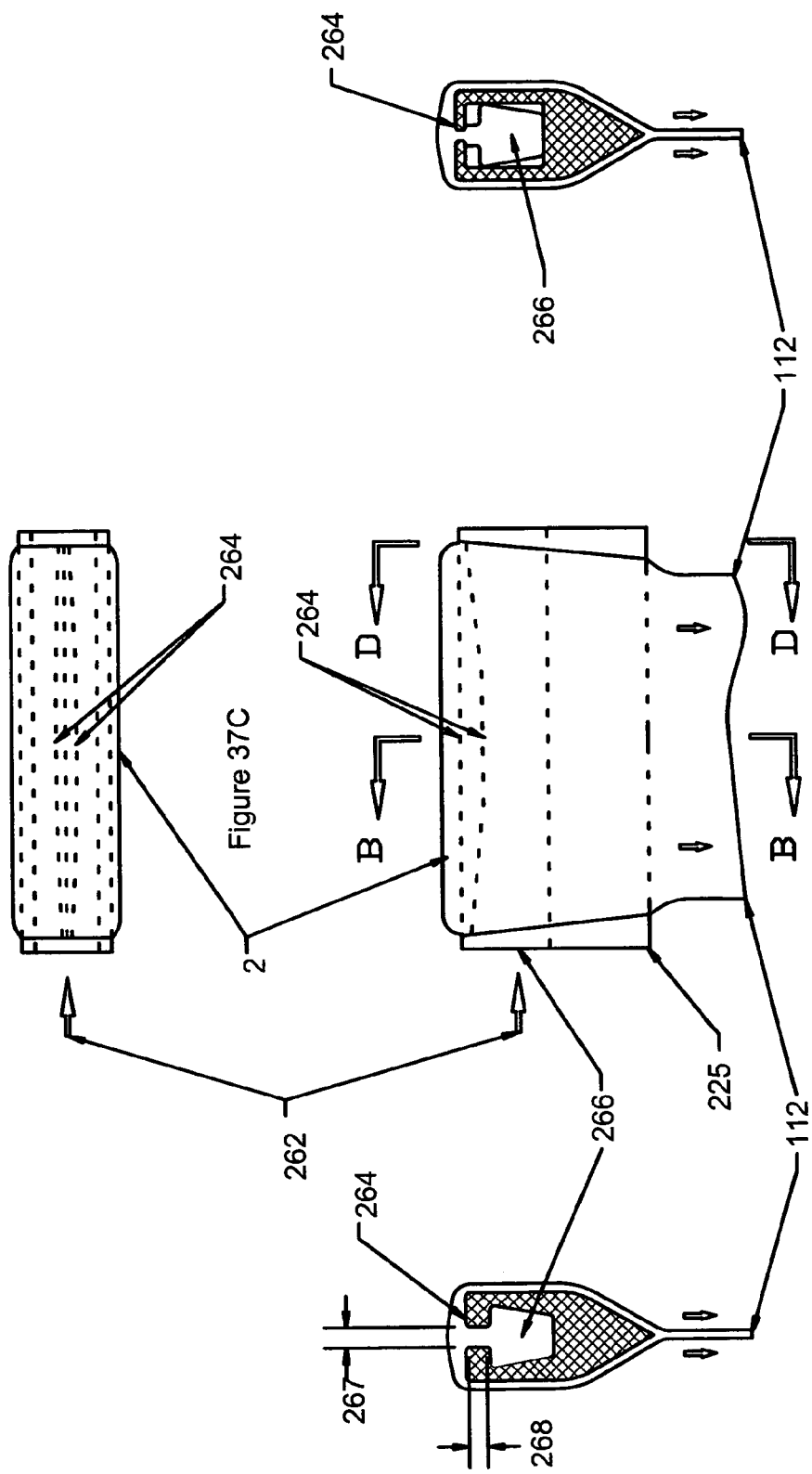

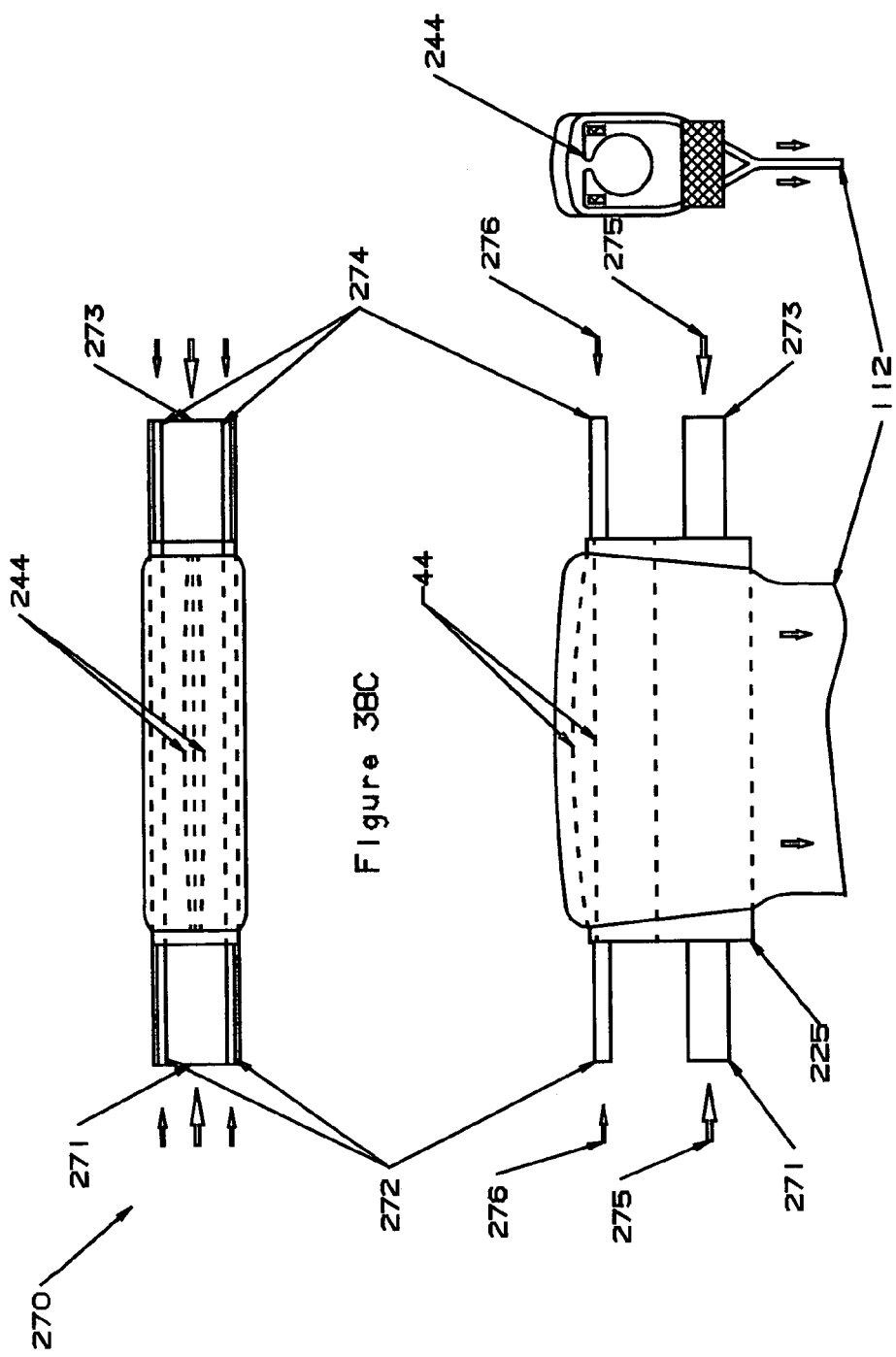

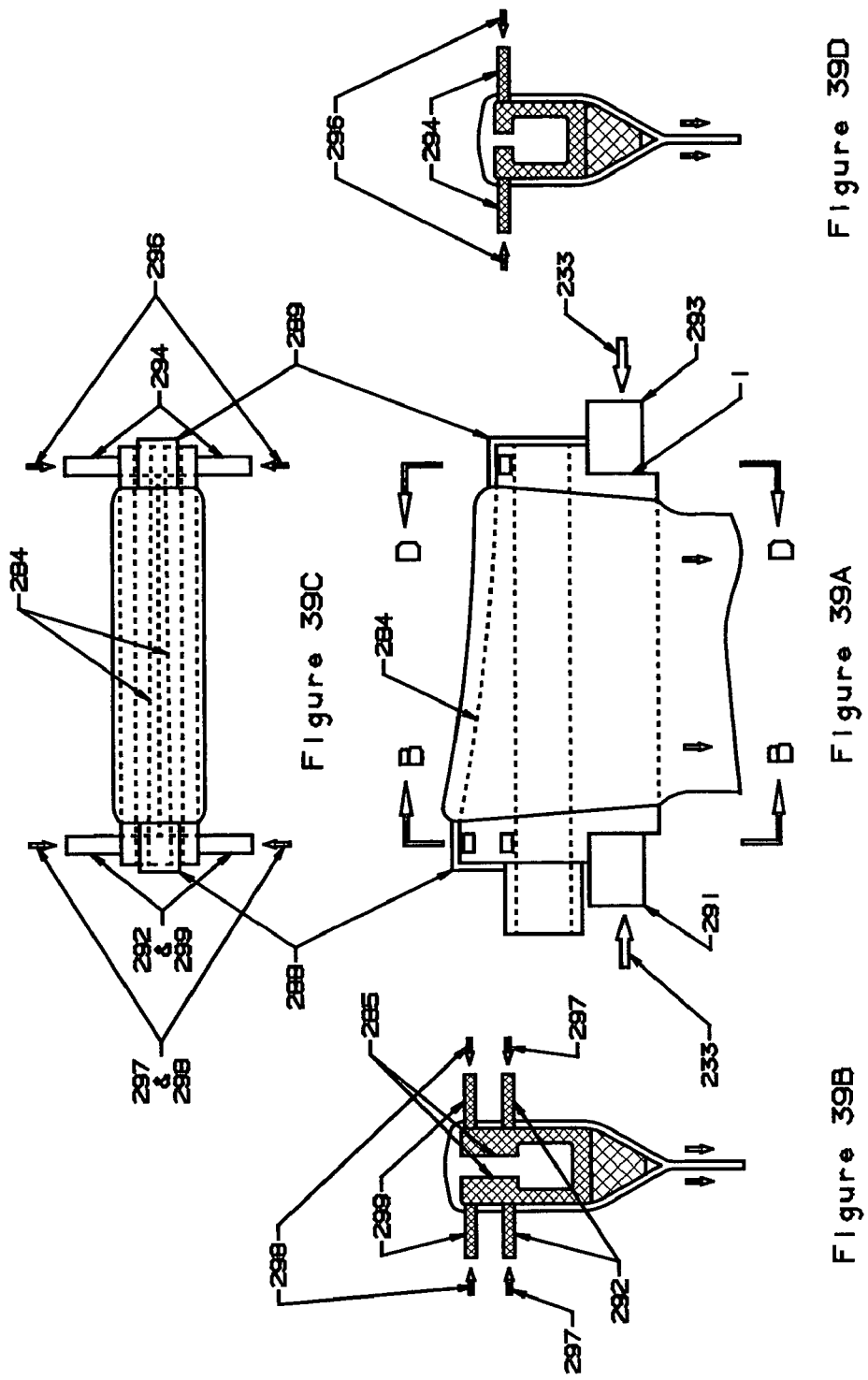

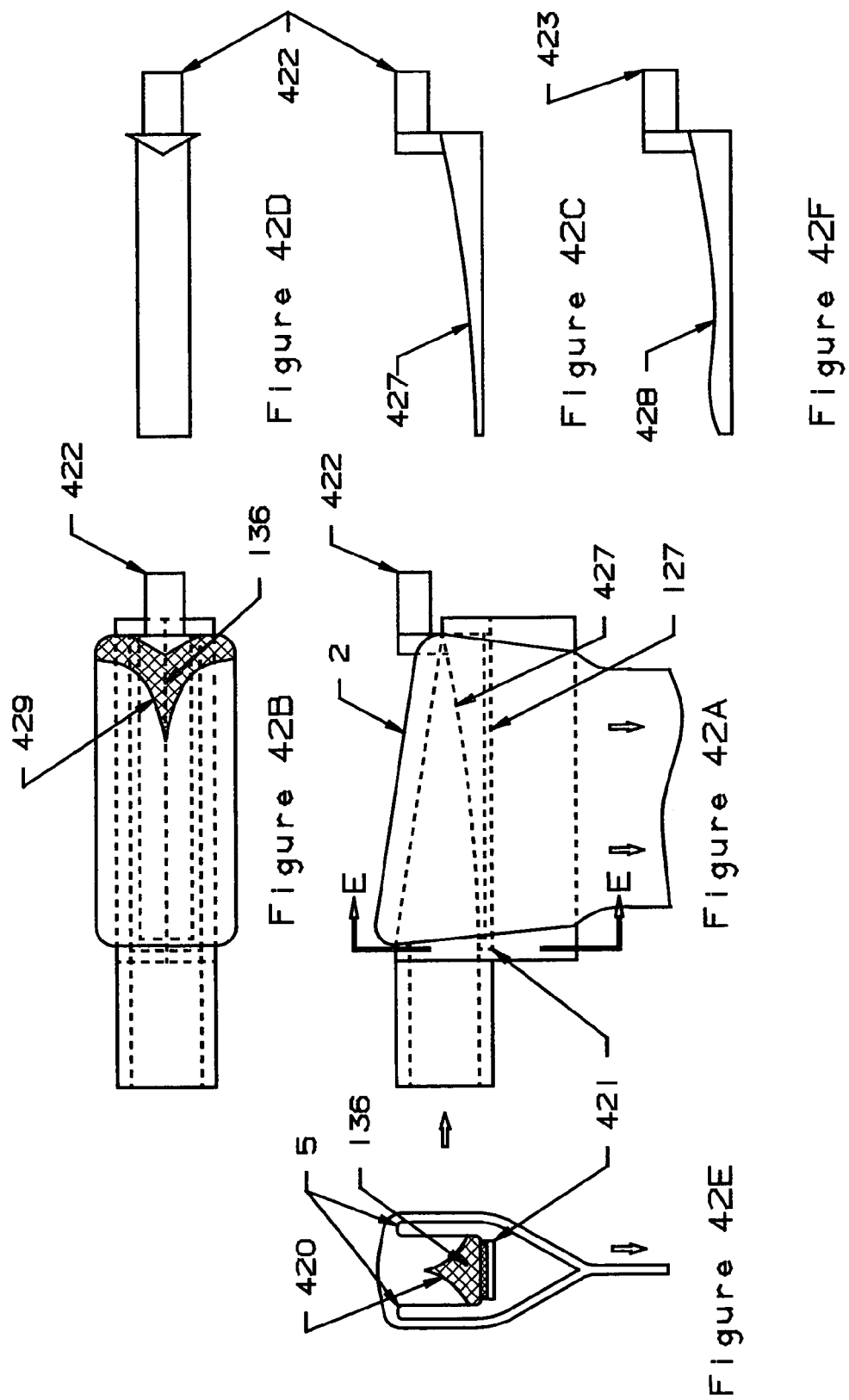

OVERFLOW DOWNDRAW GLASS FORMING METHOD AND APPARATUS

REFERENCE TO RELATED APPLICATIONS

This application claims an invention that was disclosed in one of the following provisional applications:
1) Provisional Application No. 60/506,038, filed Sep. 25, 2003, entitled "ADJUSTMENT DEVICE FOR SHEET GLASS FORMING APPARATUS"; and
2) Provisional Application No. 60/516,076, filed Oct. 31, 2003, entitled "OVERFLOW DOWNDRAW GLASS FORMING APPARATUS WITH COMPENSATING ORIFICE"

The benefit under 35 USC §119(e) of the United States provisional applications is hereby claimed, and the aforementioned applications are hereby incorporated herein by reference.

In addition, this is a continuation-in-part of patent application Ser. No. 09/851,627, filed May 9, 2001, entitled "SHEET GLASS FORMING APPARATUS", now U.S. Pat. No. 6,748,765. The aforementioned application is hereby incorporated herein by reference.

BACKGROUND OF THE INVENTION

1. Field of the Invention

The invention pertains generally to the manufacture of glass sheets, and, more particularly to a glass sheet formed from an overflow process.

2. Description of Related Art

This invention relates to the manufacture of glass sheet that is currently used for the production of TFT/LCD display devices that are widely used for computers now and are expected to be used for television sets in the future.

The glass that is used for these semiconductor powered display applications must have very high surface quality to allow the successful application of semiconductor type material. Sheet glass made using the apparatus of U.S. Pat. No. 3,338,696, incorporated herein by reference, makes the highest quality glass as formed and does not require post-processing. The patent teaches a manufacturing process termed: "the overflow process". Glass made using other processes requires grinding and/or polishing and thus does not have as fine a surface finish. The glass sheet must also conform to stringent thickness variation and warp specification. The fine surface finish is formed from virgin glass primarily from the center of the glass stream. This glass has not been in contact with foreign surfaces since the stirring operation.

The teachings of U.S. Pat. No. 3,338,696 are still the state of the art as practiced today, however, the apparatus has limitations.

A major drawback of the present overflow process is the limited range of production rates that can be accommodated by a given apparatus. Simple mathematics teaches that the mathematical product of glass flow, glass viscosity, and the tangent of the tilt angle must be a constant to make glass of uniform thickness for a given apparatus. In practice the angle of tilt has practical limitations and the simple mathematical assumptions fail because of non-linearity, thus the limited range of production rate.

There is also no adjustment provision for curvature or other non-uniformity in the thickness of the glass sheet. During a manufacturing campaign the forming apparatus is subject to changes in shape caused by material erosion and by thermal creep of the material from which the apparatus is constructed. This produces non-uniform sheet thickness for which there is no corrective adjustment.

In practice, glass forming processes are intended to be run for years if possible. Stopping the line may take a month and re-starting another month. The whole system is run at extreme temperature, so the materials used are under constant stress and often wear or need to be adjusted. Stopping the production to make these adjustments or repairs is a highly undesirable option.

The apparatus of "The Overflow Process" makes excellent glass during stable operating conditions, but it recovers from transient conditions very slowly. This is because the flow of glass through the forming apparatus is quite non-uniform. The glass that flows into the apparatus and forms the inflow end of the sheet has a different time history than the glass forming at the far end of the sheet. Because the glass flow is from one end to the other, on the order of 10 percent of the glass on the far end of the sheet is at least one hour older than the equivalent glass on the near end. An additional time differential is caused by the rectangular cross-section of the trough which has regions of glass where the flow velocity is very slow.

Another drawback of the apparatus shown in U.S. Pat. No. 3,338,696 is that its physical size becomes larger as the production rate is increased. Apparatus durability often requires that parts of the device are made from or coated with refractory metal, i.e. platinum. Thus increasing the size of the system substantially raises the cost of the manufacturing apparatus. The weir overflow process apparatus becomes large as production rates increase because the flow of glass in the trough, channeling glass to the overflow weirs, relies on gravitational flow. As the glass flow rate increases, either the trough must be larger, the slope of the weirs steeper, or the glass viscosity lower to accommodate this increased glass flow. Therefore, the range of production rates that can be accommodated by a given size apparatus is limited.

Another drawback is that the apparatus can only make glass sheet of a fixed width.

Yet another drawback of the apparatus of "The Overflow Process" is that, even though it makes excellent glass during initial operating conditions, the forming apparatus deforms during operation to the point where sheet glass of specification thickness profile is no longer manufactured. The production run is then terminated for rebuilding with a new trough and other components.

SUMMARY OF THE INVENTION

The present invention includes design features that can be used alone or in combination to facilitate faster, more uniform flow of glass through the apparatus and allows the thickness of the sheet to be adjusted.

An overflow device is provided at the far end of the trough and is used in conjunction with tilting of the apparatus to expand the range of glass flow rate and glass viscosity for which this invention will produce satisfactory product. The overflow device may be used in conjunction with tilting of the apparatus, changes in glass flow rate, and changes in glass viscosity (temperature) to regulate the thickness profile of the sheet. In addition, the forming apparatus can be made with non-linear weirs to provide a greater range of flow rates.

The glass flow in the inflow pipe can be modulated to provide more uniform time-dependent flow for forming the sheet. Similarly, a contoured trough cross-section is taught which can minimize the quiescent flow regions.

The forming apparatus can include an orifice on top of the trough and glass can be moved through the apparatus using pressure. In one embodiment, the orifice is narrow at the inlet end and wider at the far end to accommodate for the loss in static pressure of the glass as it flows to that end.

In the present invention, the shape of the orifice is matched to the deformation of the forming apparatus in such a way that the flow distribution of the glass in the longitudinal direction remains substantially uniform. Thus the deformation of the forming apparatus has a minimum effect on the thickness variation of the glass sheet resulting in an extended production campaign. As the orifice is made larger by the applied stress, the percentage width increase is proportioned at all locations along the orifice such that a percentage increase in glass flow is also the same at all locations along the orifice.

A forming apparatus can be provided with additional orifices on the bottom or sides to allow greater variability in sheet thickness. Effectively, an additional orifice adds glass to the middle of the formed sheet.

Irregularities in the thickness of the formed glass sheet may be corrected by selective heating of the glass in the trough, heating the weirs or orifice. This requires selective heating of the glass flowing down the outside of the apparatus to restore temperature uniformity at the bottom of the apparatus where the sheet is formed.

A flow control plug can be inserted into the trough, such that flow dynamics can be altered during hot operation by insertion, removal or position adjustment of the flow control plug.

A preferred embodiment of the present invention provides an adjustment to change the flow characteristics of the trough to compensate for the degradation of the forming trough during an extended production run.

BRIEF DESCRIPTION OF THE DRAWINGS

FIGS. 7A, 7B and 7C are illustrations of cross-sections of the trough of the forming apparatus through the section shown in FIG. 7D.

FIGS. 8A, 8B and 8C show a top, side and an inlet view of an embodiment that would be typical of a relatively low inlet pressure.

FIGS. 9A, 9B and 9C show a top, side and an inlet view of an embodiment that would be typical of a relatively high inlet pressure.

FIGS. 10A, 10B and 10C show a top, side and an inlet view of an embodiment that has a simple trough shape and a relatively low inlet pressure.

FIGS. 11A, 11B and 11C show a top, side and an inlet view of an embodiment that has a simple trough, an orifice that is not in a horizontal plane, and a relatively low inlet pressure.

FIGS. 12A, 12B and 12C show a top, side and an inlet view of an embodiment that has a simple trough shape, an internally mounted flow control plug and a relatively high inlet pressure.

FIGS. 13A, 13B and 13C show a top, side and an inlet view of an internal flow control plug.

FIGS. 14A, 14B and 14C show a top, side and an inlet view of an embodiment with a horizontal top orifice, a horizontal bottom orifice, and a shaped trough.

FIGS. 15A, 15B and 15C show a top, side and an inlet view of one of two sides of the apparatus shown in FIGS. 14A through 14C, which are in this instance mirror images.

FIGS. 16A, 16B and 16C show a top, side and an inlet view of an embodiment with a horizontal top orifice, a horizontal bottom orifice, and a constant cross section trough.

FIGS. 17A, 17B and 17C show a top, side and an inlet view of an embodiment which is the same as that shown in FIGS. 16A–16C, but with an internal plug which is used to vary sheet width.

FIGS. 18A, 18B and 18C show a top, side and an inlet view of an internal flow control plug used in the embodiment shown in FIGS. 17A–17C.

FIGS. 19A, 19B and 19C show a top, side and an inlet view of an embodiment with a sloped top surface with a weir on each side, a horizontal bottom orifice, and a shaped trough.

FIGS. 20A, 20B and 20C show a top, side and an inlet view of an embodiment where the elements form a horizontal top orifice and two horizontal side orifices.

FIGS. 21A, 21B and 21C show a top, side and an inlet view of the two side elements and the bottom forming wedge of the apparatus shown in FIGS. 20A–20C.

FIGS. 22A, 22B and 22C show a top, side and an inlet view of an embodiment where the elements form a sloped top surface with weirs at each side and two horizontal side orifices.

FIGS. 23A, 23B and 23C show a top, side and an inlet view of the two side elements and the bottom forming wedge of the apparatus shown in FIGS. 22A–22C.

FIGS. 24A, 24B and 24C show a top, side and an inlet view of an embodiment that has radiant top heating devices and radiant side heating devices.

FIG. 26A shows a side view of the principle parts of the forming apparatus of a typical "Overflow Process" manufacturing system.

FIG. 26B shows a cross-section of FIG. 26A.

FIG. 28A shows the shape of the overflow trough at the start of a production run in an embodiment of the present invention.

FIG. 28B shows the sagged shape of the overflow trough after extended operation with a contoured bottom shape in an embodiment of the present invention.

FIG. 28C is a view of the flow control plug for initial production operations in an embodiment of the present invention.

FIG. 28D is a view of the flow control plug inserted into the trough bottom after extended operation in an embodiment of the present invention.

FIG. 28E is a view of a flow control plug in the trough in an embodiment of the present invention.

FIG. 28F shows the glass that forms the far end glass bead as it flows over the flow control plug in an embodiment of the present invention.

FIG. 28G is a view of a flow control plug that can be used for initial operations and extended operations by rotating it 180 degrees in an embodiment of the present invention.

FIG. 28H shows the glass that forms the far end glass bead as it flows on the top surface of the glass in the forming apparatus in an embodiment of the present invention.

FIG. 28I shows the glass that forms the far end glass bead as it flows on the top surface of the glass in the forming apparatus in an embodiment of the present invention.

FIG. 29A shows the shape of the overflow trough at the start of a production in an embodiment of the present invention.

FIG. 29B shows the sagged shape of the overflow trough after extended operation with a flow control plug rotated to reshape the trough bottom in an embodiment of the present invention.

FIG. 29C is a view of the flow control plug for initial production operations in an embodiment of the present invention.

FIG. 29D is a view of the flow control plug in the rotated position in an embodiment of the present invention.

FIG. 29E is a view of the flow control plug in the trough in an embodiment of the present invention.

FIG. 29F shows the glass that forms the far end glass bead as it flows over the flow control plug in an embodiment of the present invention.

FIG. 30A shows the shape of the overflow trough at the start of a production in an embodiment of the present invention.

FIG. 30B shows the sagged shape of the overflow trough after extended operation with the flow control plugs positioned to reshape the trough bottom in an embodiment of the present invention.

FIG. 30C is a view of the flow control plugs for initial production operations in an embodiment of the present invention.

FIG. 30D is a view of the flow control plugs repositioned for extended operation in an embodiment of the present invention.

FIG. 30E is a view of the flow control plug in the trough in an embodiment of the present invention.

FIG. 30F shows the glass that forms the far end glass bead as it flows over the flow control plug in an embodiment of the present invention.

FIG. 31A shows the shape of the overflow trough at the start of a production in an embodiment of the present invention.

FIG. 31B shows the sagged shape of the overflow trough after extended operation with the flow control plug positioned at the inlet end in an embodiment of the present invention.

FIG. 31C is a view of the flow control plug for initial production operations in an embodiment of the present invention.

FIG. 31D is a view of the flow control plug in a second position in an embodiment of the present invention.

FIG. 31E shows the glass that forms the far end glass bead as it flows over the flow control plug in an embodiment of the present invention.

FIG. 32A shows an illustration of the prior art glass forming trough.

FIG. 32B shows a cross section of the trough shown in FIG. 32A.

FIG. 32C shows a top view of the trough shown in FIG. 32A.

FIG. 32D shows a cross section of the trough shown in FIG. 32A.

FIG. 33A illustrates how the prior art trough design deforms as a result of thermal creep.

FIG. 33B shows a cross section of the trough shown in FIG. 33A.

FIG. 35A shows an embodiment of the present invention showing a single shaped orifice.

FIG. 35B shows a view along lines B—B of FIG. 35A.

FIG. 35C shows a top view of FIG. 35A.

FIG. 35D shows a view along lines D—D of FIG. 35A.

FIG. 36A shows an embodiment of the present invention showing an exaggeration of the typical deformation of the orifice shown in FIGS. 35A–35D.

FIG. 36B shows a view along lines B—B of FIG. 36A.

FIG. 36C shows a top view of FIG. 36A.

FIG. 36D shows a view along lines D—D of FIG. 36A.

FIG. 37A shows an embodiment of the present invention showing a single shaped orifice but with a different shape than that shown in FIGS. 35A–35D.

FIG. 37B shows a view along lines B—B of FIG. 37A.

FIG. 37C shows a top view of FIG. 37A.

FIG. 37D shows a view along lines D—D of FIG. 37A.

FIG. 38A shows an embodiment of the present invention showing multiple compression blocks on each end.

FIG. 38B shows a cross section of FIG. 38A.

FIG. 38C shows a top view of FIG. 38A.

FIG. 39A shows an embodiment of the present invention showing a single shaped orifice and showing multiple compression blocks on each end.

FIG. 39B shows a view along lines B—B of FIG. 39A.

FIG. 39C shows a partial top view of FIG. 39A.

FIG. 39D shows a view along lines D—D of FIG. 39A.

FIG. 42A shows the shape of the overflow trough at the start of a production run in an embodiment of the present invention.

FIG. 42B shows the glass that forms the far end glass bead as it flows on the top surface of the glass in the forming apparatus in an embodiment of the present invention.

FIG. 42C is a view of the flow control plug for initial production operations in an embodiment of the present invention.

FIG. 42D is the top view of the flow control plug shown in FIG. 42C in an embodiment of the present invention.

FIG. 42E shows the glass that forms the far end glass bead as it flows over the flow control plug in an embodiment of the present invention.

FIG. 42F is a view of the flow control plug inserted into the trough bottom after extended operation in an embodiment of the present invention.

DETAILED DESCRIPTION OF THE INVENTION

The present invention teaches that faster, more uniform flow of glass can be accomplished in the overflow glass process by modifying the forming apparatus in substantial ways. This process is currently used for making glass sheets that go into TFT/LCD display devices.

The glass must have very high surface quality, and sheet glass made using the overflow process has this quality. The overflow process is defined as a process that: 1) moves molten glass into a trough; 2) allows the glass to overflow the sides of the trough; and 3) the glass overflowing each side comes together such that the outside surface of the glass sheet is formed from glass that has not touched the surface of the glass forming equipment (post mixing). This untouched, "virgin glass", forms an extremely uniform and clean outside surface of the glass sheet. Any modifications to the process or apparatus must provide this high quality glass surface.

The flow dynamics in all embodiments of this invention are such that the outside surfaces of the glass sheet are formed from thoroughly mixed virgin glass that comes from the center of the glass stream flowing into the forming apparatus and thus has not contacted a refractory or refractory metal surface. This produces the highest possible surface quality. This pristine surface is essential for the manufacture of LCD/TFT semiconductor display devices.

The refractory materials from which the forming trough and its support structure are made have high strength in compression and low strength in tension. Like most structural materials they also change shape when stressed at high temperature by a phenomenon termed "thermal creep". Thermal creep and how it affects the manufacturing process is one of the reasons for this invention.

The glass flow into this apparatus from a stirring device or alternately from a forehearth bowl must be thoroughly mixed to eliminate cord and insure homogenous glass. A suitable overflow chamber may be required to insure that the glass flowing to the process is of the most uniform quality. Stirring and overflow chambers are satisfactorily understood glass manufacturing technology to those of skill in the art, and the various possible designs are not specifically disclosed.

Figure 1:
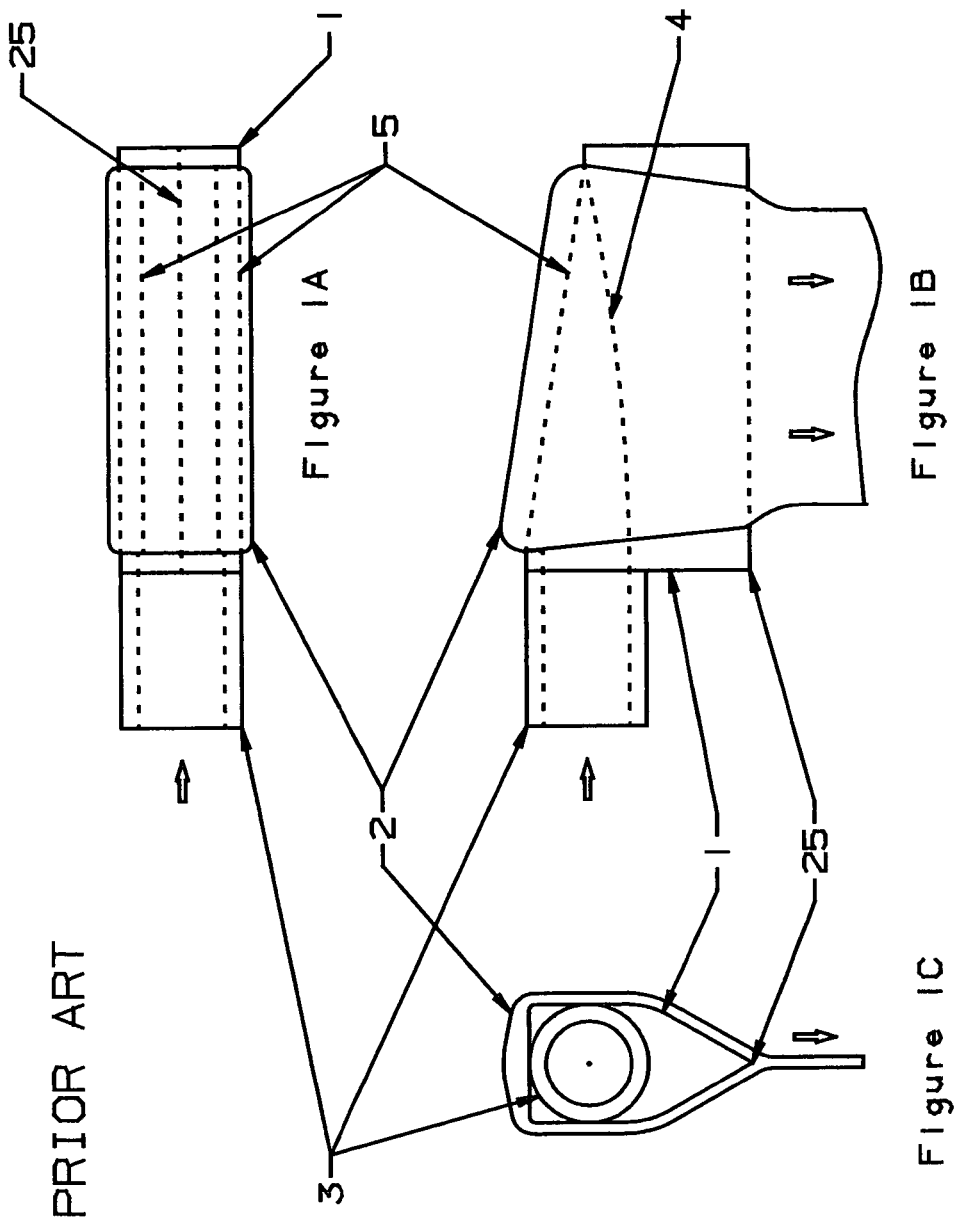
FIGS. 1A, 1B and 1C show a top, side and an inlet view of a typical overflow glass forming apparatus.
Figure 2:
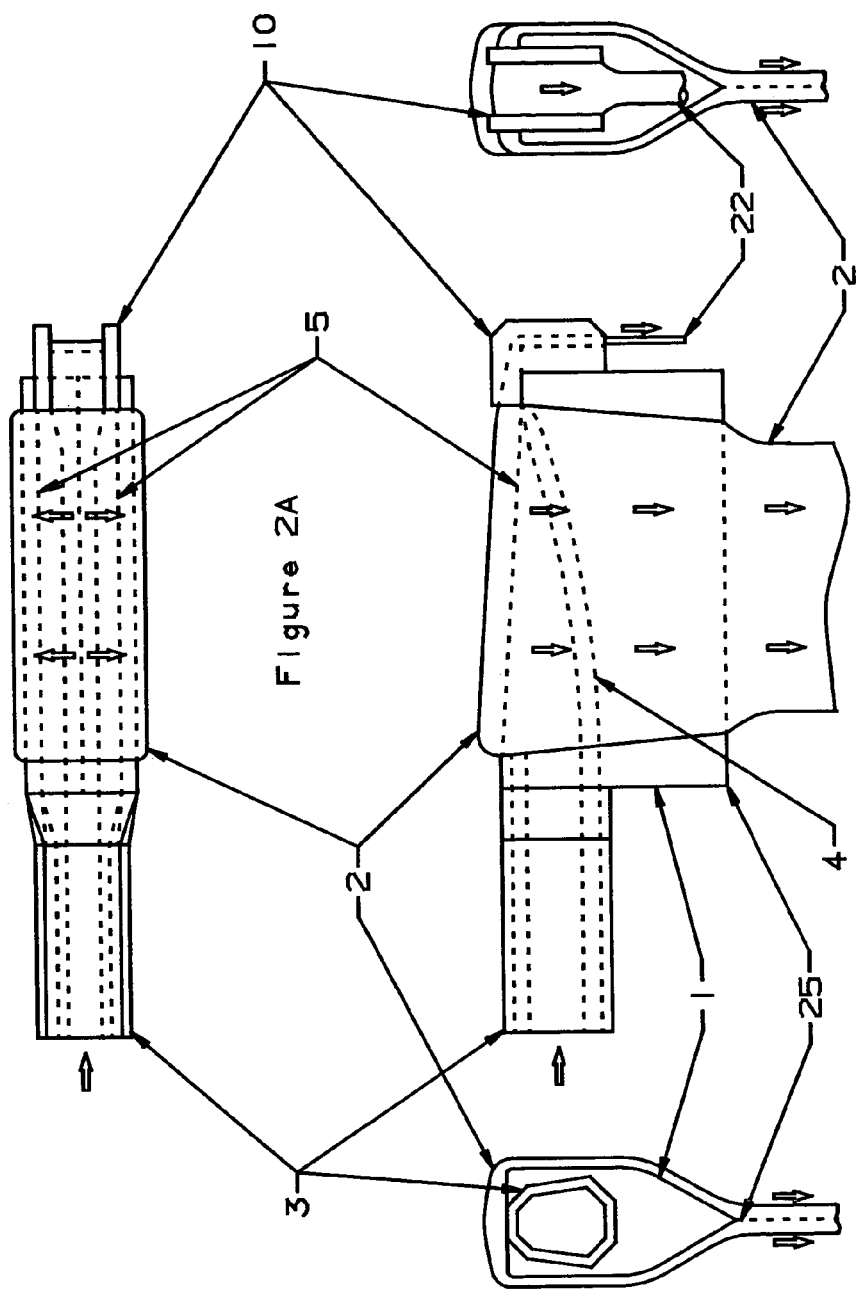
FIGS. 2A, 2B, 2C and 2D show a top, side, end and an inlet view of an embodiment of a forming apparatus that has a trough with straight sloped weirs, a contoured bottom and an overflow device.
Figure 3:
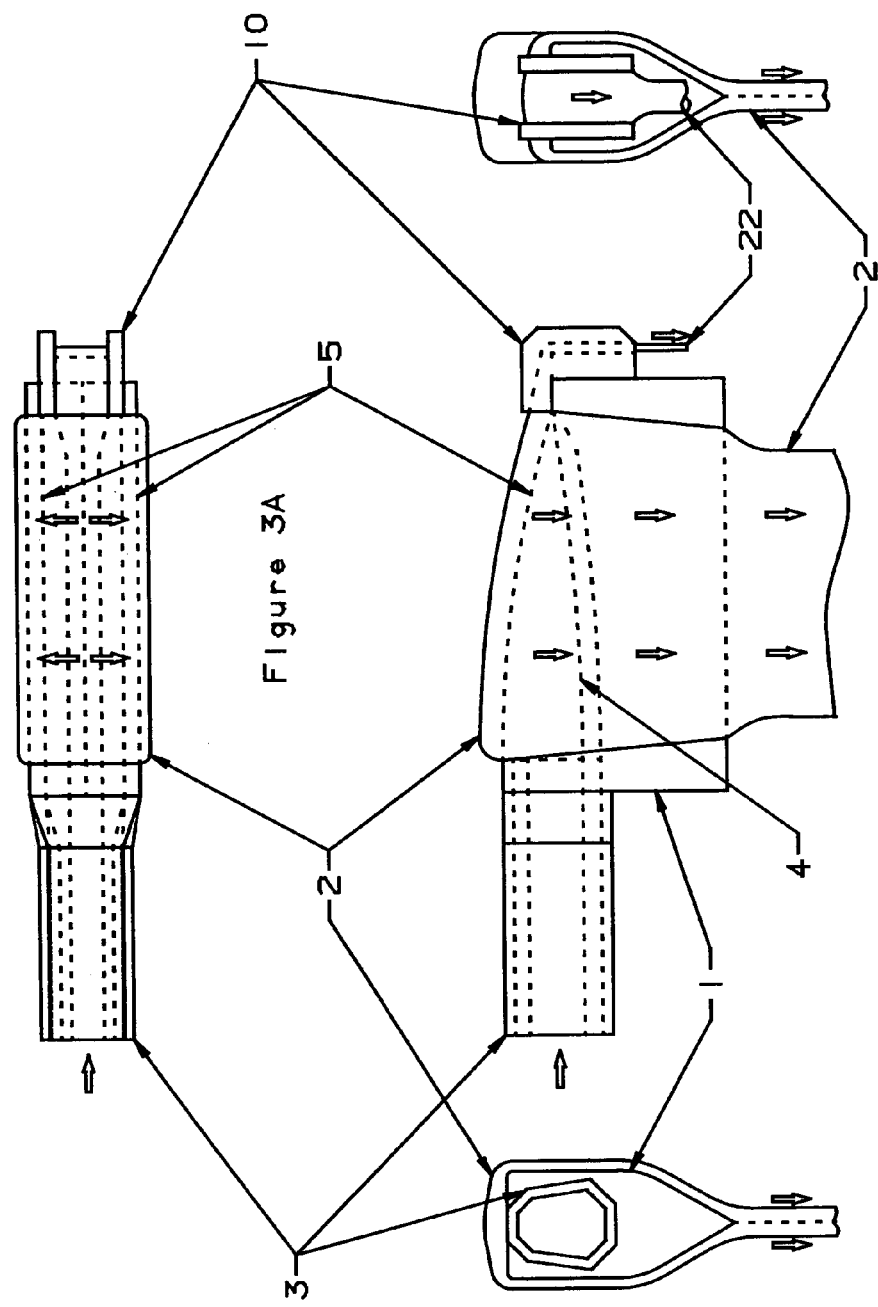
FIGS. 3A, 3B, 3C and 3D show a top, side, end and an inlet view of an embodiment of a forming apparatus that has a trough with contoured weirs and a contoured bottom.
Figure 4:
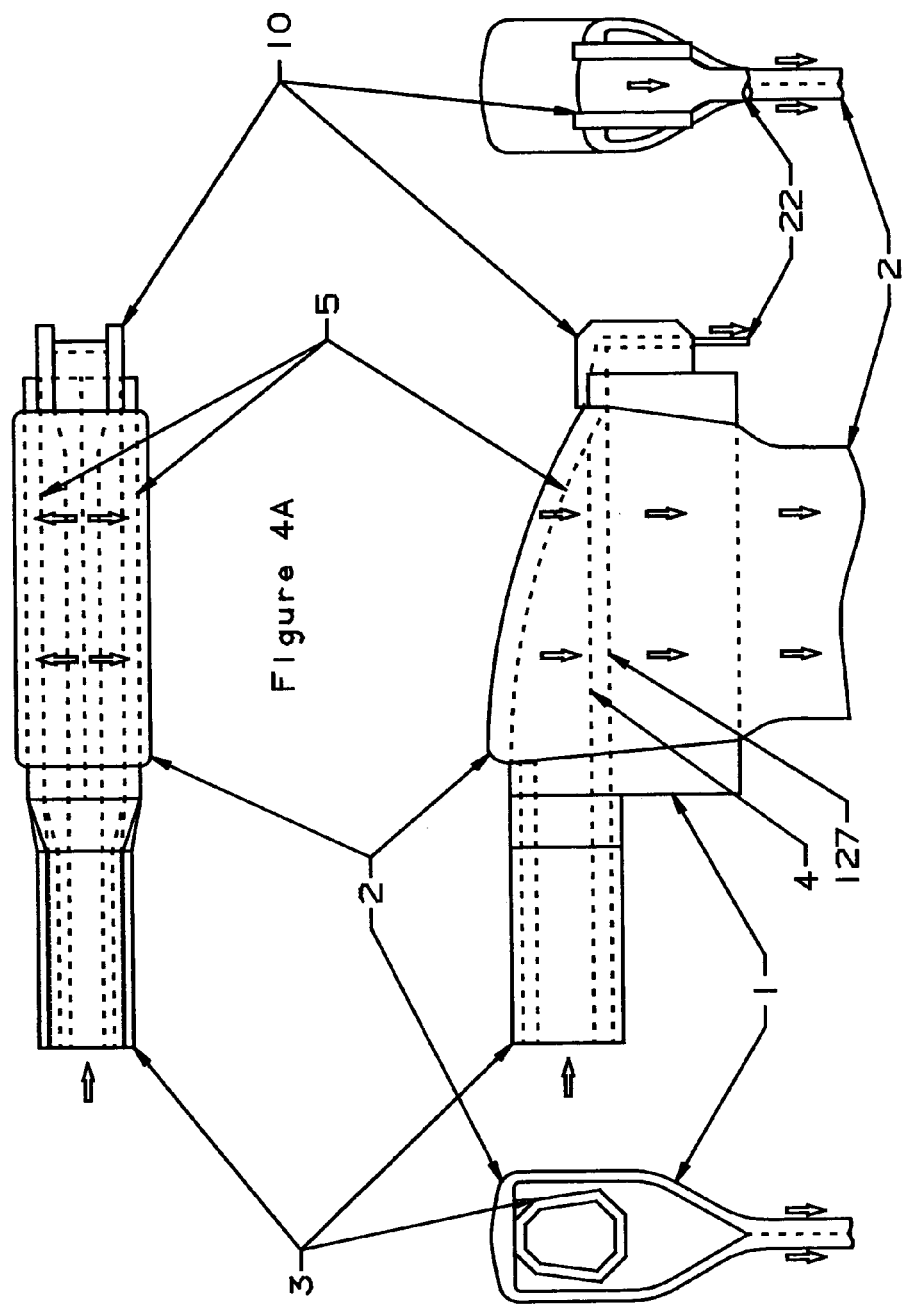
FIGS. 4A, 4B, 4C and 4D show a top, side, end and an inlet view of an embodiment of a forming apparatus that has a trough with contoured weirs and a flat bottom.

Referring to FIGS. 1A though 1C, FIG. 25, FIGS. 26A and 26B and FIGS. 32A through 32D, an overflow manufacturing system (101) is shown. The glass (2) from the melting furnace (102) and forehearth (103), which must be of substantially uniform temperature and chemical composition, feeds a stirring device (104). The stirring device (104) thoroughly homogenizes the glass. The glass (2) is then conducted through a bowl inlet pipe (105), into a bowl (106), and down into the downcomer pipe (107), through the joint (114) between the downcomer pipe (107) and the forming apparatus inlet pipe (3), to the inlet of the overflow trough (4). While flowing from the stirring device (104) to the trough (4), the glass (2), especially that which forms the sheet surface, must remain homogeneous. The normal purpose of the bowl (106) is to alter the flow direction from horizontal to vertical and to provide a means for stopping the flow of glass (2). A needle (113) is provided to stop glass flow. The normal function of the downcomer pipe (107) is twofold. It conducts the glass from the bowl (106) to the trough inlet pipe (3) and controls the flow rate of the glass stream entering the process. The downcomer pipe (107) is carefully designed such that by maintaining it at a specific temperature the desired glass stream flow rate is precisely maintained at the desired value. The normal function of the joint (114) between the downcomer pipe (107) and the trough inlet pipe (3) is to allow for removal of the sheet glass forming apparatus (1) for service as well as a means of compensation for the thermal expansion of the process equipment.

The molten glass (2) from the melting furnace and forehearth, which must be of substantially uniform temperature and chemical composition, enters the forming apparatus through the inlet pipe (3) to the sheet forming trough (4). The glass sheet forming apparatus (1), which is described in detail in both U.S. Pat. No. 3,338,696 and patent application Ser. Nos. 09/851,627 (filed May 9, 2001, U.S. Patent Publication No. US 2001/0039814) and Ser. No. 10/214,904 (filed Aug. 8, 2002, U.S. Patent Publication No. US 2003/0029199), herein incorporated by reference, is a wedge shaped forming apparatus (1). Straight sloped weirs (5), substantially parallel with the pointed edge of the wedge (25), form each side of the trough. The cross-sectional view of FIG. 1C shows that the forming apparatus (1) resembles an elongated wedge with the glass sheet being formed at the downward facing point of the wedge, called the root (25). The bottom of the trough (127) and sides of the trough (128) are contoured in a manner to provide even distribution of glass to the top of each side weir (5). The glass then flows over the top of each side weir (5), down each side of the wedge shaped forming apparatus (1), and joins at the pointed edge of the root (25) to form a sheet of molten glass (111).

The sheet of molten glass (111) is then cooled as it is pulled off the root (25) by pulling rollers (121) to form a solid glass sheet (112) of substantially uniform thickness. Edge rollers (120) may also be used to draw the molten glass sheet (111). In the prior art, the forming apparatus (1) was encased within a muffle (122) whose purpose is to control the temperature of the forming apparatus (1) and the molten glass (2). It is normal practice to maintain a constant temperature in the muffle chamber (123) surrounding the forming apparatus (1). Cooling the glass as it transitions from the molten state to the solid state must be carefully controlled. This cooling process starts on the lower part of the forming apparatus (1) just above the root (25), and continues as the molten glass sheet passes through the muffle door zone (124). The molten glass is substantially solidified by the time it reaches the pulling rollers (121). The molten glass forms a solid glass sheet (112) of substantially uniform thickness.

The flow must be compensated at each end of the forming apparatus (1) to account for end effects caused by surface tension. This compensation requires a localized adjustment in the shape of the weirs (5) and/or the shape of the trough (4) bottom. Surface tension affects the flow down the sides of the forming apparatus (1) and the flow in the free space below the forming apparatus (1) before the molten glass (2) has cooled to a solid form. Devices similar to the "Sheet Glass Edge Control Device" of U.S. Pat. No. 3,451,798, incorporated herein by reference, may be employed on all embodiments but are not shown in the figures.

Once the glass sheet is formed it is processed with known equipment for handling the glass sheet. It is essentially, "drawn down" from the bottom of the sheet forming apparatus (1). In general, the edges of the sheet are trimmed, so most handling, if not all, is done by machine touching just the edges. In addition, the equipment will prevent rapid temperature fluctuation to avoid degrading the quality of the glass. Such equipment is well known in the art and is not discussed in detail here. This invention is directed specifically to the overflow glass forming apparatus (1).

In all embodiments of this sheet forming apparatus, accurate and robust construction of the orifice is essential for the required uniform flow distribution over the duration of a production run. There are two material systems from which the apparatus may be fabricated: molybdenum or refractory, i.e. alumina or zircon. The refractory option is presently used by the Overflow Process. For the refractory option, when high durability is required, the orifices would be made from refractory metal, i.e. platinum, reinforced as required by refractory, i.e. alumina or zircon. The orifices may be either sprayed, via a molten platinum spraying process, directly on a shaped alumina body or fabricated from a sheet. The entire apparatus may be clad in a refractory metal envelope if maximum durability is required. The use of molybdenum is an option for the construction of the apparatus (1) because of the smaller size of the apparatus. Each of the side flow control elements and perhaps even the forming wedge element would be made of molybdenum. Molybdenum must be protected from oxidation when it is used at glass forming temperatures. This is accomplished by either covering the molybdenum with platinum, coating the glass contact areas with glass prior to high temperature exposure to oxygen, or surrounding the apparatus with a controlled non-oxidizing atmosphere.

The present invention teaches that the glass forming apparatus (1) can be designed to avoid many of the problems associated with the previous designs for the overflow trough (4). The apparatus and process of the present invention allows a degree of adjustment that has been previously unknown to this process. Many of the parts are designed to be adjusted or exchanged while the glass is hot. The output of glass sheet is interrupted for a brief period, but the production line continues such that the months of delay for shut down and start-up are avoided. In addition, novel features are provided that allow the system to run under pressure to increase glass flow.

Overflow Device

Referring to FIGS. 2A through 2D, the present invention provides a forming apparatus (1) that can be used to make substantially constant thickness glass (2) over an extended range of values of the mathematical product of glass flow and glass viscosity by using a combination of the tilt of the apparatus (1) with a change in glass flow through an overflow device (10) at the far end of the apparatus (1).

The forming apparatus shown in FIGS. 2A through 2D has straight sloped weirs (5) that are close to parallel with the pointed edge (25) of the wedge shaped portion of the forming apparatus (1) but sloped slightly downward in the direction away from the inflow pipe (3). Glass (2) enters the trough (4) through an inflow pipe (3). The bottom and sides of the trough (4) are contoured in a manner to provide even distribution of glass to the top of each side weir (5). The major portion of the glass (2) then flows over the top of each side weir (5), down each side of the wedge shaped portion of the forming apparatus (1), and joins at the pointed edge (25) of the wedge to form a sheet of molten glass (2). The molten glass (2) is then cooled to form a solid glass sheet of substantially uniform thickness. A small portion of the glass (22) passes through the forming trough (4) and out the far end through an overflow device (10). The overflow device (10) incorporated at the far end of the trough (4) is used in conjunction with tilting of the apparatus (1), changes in glass flow rate, and changes in glass viscosity to regulate the thickness profile of the sheet.

The sheet glass forming apparatus is designed for constant temperature operation in the region of the forming trough (4) and the weirs (5). The linear sheet thickness differential from one end of the sheet to the other end is called wedge. The nonlinear sheet thickness variations from one end of the sheet to the other end is called curvature. The wedge and curvature are primarily a function of the trough (4) shape and the shape of the weirs (5) on each side of the trough (4). The glass (2) sheet thickness distribution is the same for a given value of the mathematical product of glass flow rate times the glass viscosity. A change in either of these variables independent of the other will produce wedge and/or curvature in the sheet thickness distribution.

Operational adjustment of any wedge or curvature in the sheet thickness may be effected by tilting the apparatus (1) and by varying the portion of glass (2) flowing to the overflow device (10). For instance, if the glass (2) at the far end is thinner than at the inlet end, lowering the far end will flow more glass (2) to that end, consequently thickening the sheet at the far end. Conversely, increasing the portion of glass (22) flowing to the overflow (10) will decrease the glass thickness at the far end of the forming apparatus. Since the two effects are nonlinear, different combinations of tilt and overflow glass can produce corrections in both curvature and in wedge. This will allow for a longer production campaign with a given forming apparatus, thus reducing manufacturing down time with a resultant cost saving.

Non-Linear Weirs

The prior art required the trough (4) to be rectangular and did not contemplate anything other than straight weirs (5). FIGS. 3A through 3D show an embodiment that is the same as the embodiment shown in FIGS. 2A through 2D except that both of the weirs (5) and the bottom of the trough (4) are contoured such that the flow over the weirs (5) is uniform over their entire length. FIGS. 4A through 4D show an embodiment that is the same as the embodiment shown in FIGS. 2A through 2D except that trough (4) has a flat bottom (127) and only the weirs (5) are contoured such that the flow over the weirs (5) is uniform over their entire length. The trough (4) bottom (127) is shown horizontal but may be sloped.

The exact shape of the trough (4) and weirs (5) can be calculated by solving the Navier Stokes Equations using any of a number of computational fluid dynamics software packages such as CFD2000®, Fluent®, and Flow 3D®. The criteria for a satisfactory design is to have a substantially even distribution of glass (2) in the longitudinal direction flowing at the desired rate from the root (25) of the apparatus (1). To solve the equations, a spatial grid is constructed to represent the proposed internal geometry of the inflow pipe (3), the trough (4) internal cavity and the shape of the top surface of the weirs (5). The fluid properties are imposed along with boundary conditions to represent the walls, the free surfaces, and the required process glass flow rate. A trial solution is executed and the size and shape of the components are revised until the solution produces a flow distribution at the root (25) of the apparatus (1) that satisfies the design criteria.

In many cases, it will be desirable to keep the size and shape of some components static and vary just one or two components. For example, U.S. Pat. No. 3,338,696 teaches that the top portion of the weirs can be removed and resurfaced if worn, however, as opposed to replacing the weirs with new ones of the same shape, the present invention teaches that the new weirs could have a non-linear shape. In that way numerous flow conditions could be accommodated simply by modifying the shape of the weir and to calculate its shape all other components would be kept static and just the shape of the weir would be varied to develop an optimal solution to the Navier Stokes equations.

Inflow Pipe

One of the objectives of the present invention is to significantly reduce the time difference between the glass forming the near end of the sheet and the far end of the sheet. This can be accomplished by redesigning the inflow pipe (3) to the trough (4) such that the glass (2) that enters the trough (4) and forms the near end is delayed relative to the glass (2) that enters the trough (4), flows the length of the forming trough (4), and forms the far end of the sheet.

Figure 5:
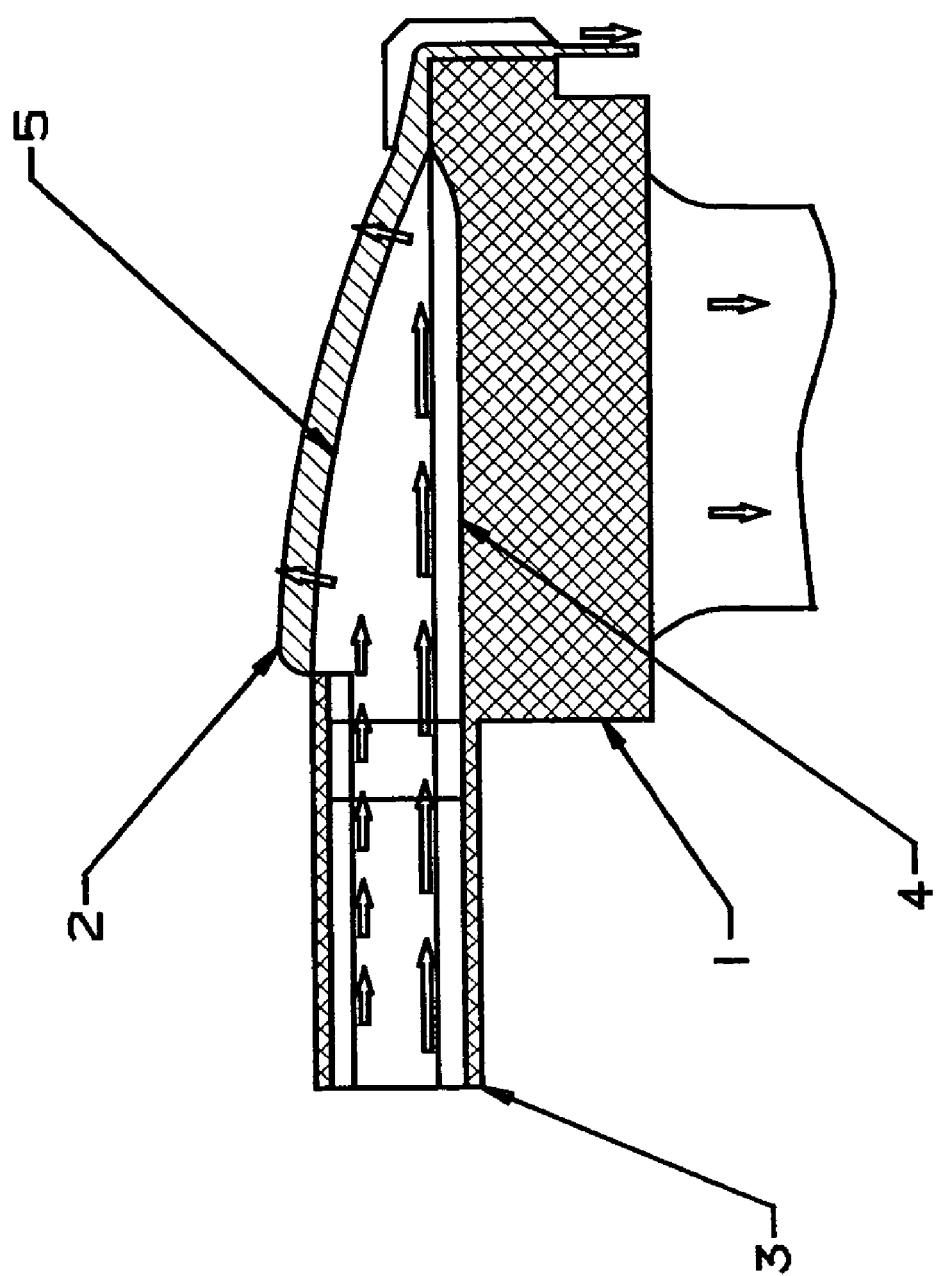
FIG. 5 is an illustration of the velocity distribution of the glass flow through the inflow pipe and the trough of the forming apparatus.

FIG. 5 is an illustration of the velocity distribution of the glass flow through the inflow pipe (3) and the trough (4) of the forming apparatus. The length of the arrows in the figure is proportional to the glass flow velocity. The inflow pipe (3) is shaped to be narrower at its top than at its bottom. This causes the flow of glass (2) to be slower at the top of the inflow pipe (3) than at its bottom. The glass flowing through the top of this shaped inflow pipe (3) goes to the near end of the weirs (5) and the glass (2) flowing through the bottom goes to the far end of the weirs (5). Shaping the inflow pipe (3), thus modulating the flow over each end of the weirs (5), minimizes the time difference between the glass (2) that forms the near end of the sheet versus the glass (2) that forms the far end the sheet.

Figures 6A, 6B, 6C:
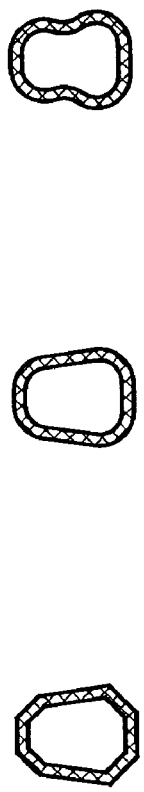
FIGS. 6A, 6B and 6C are illustrations of cross-sections of the inflow pipe of the forming apparatus through the section shown in FIG. 6D.
Figure 6D:
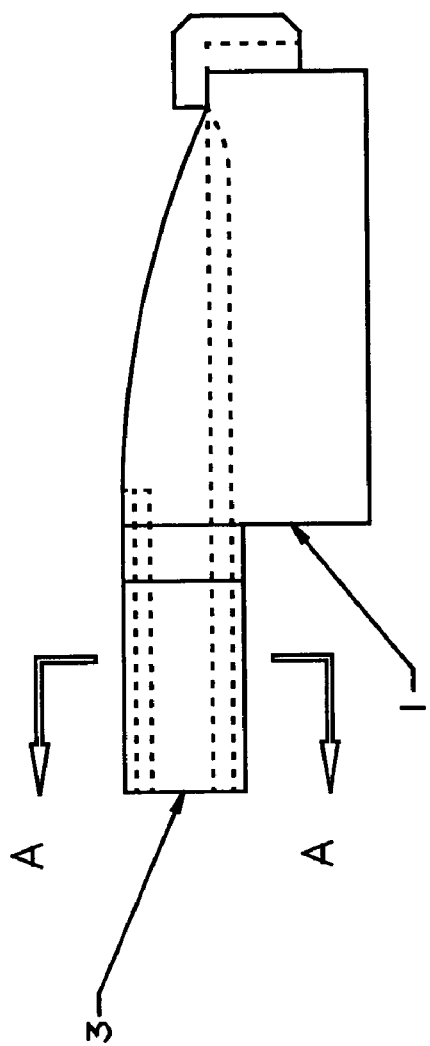
Figure 25:
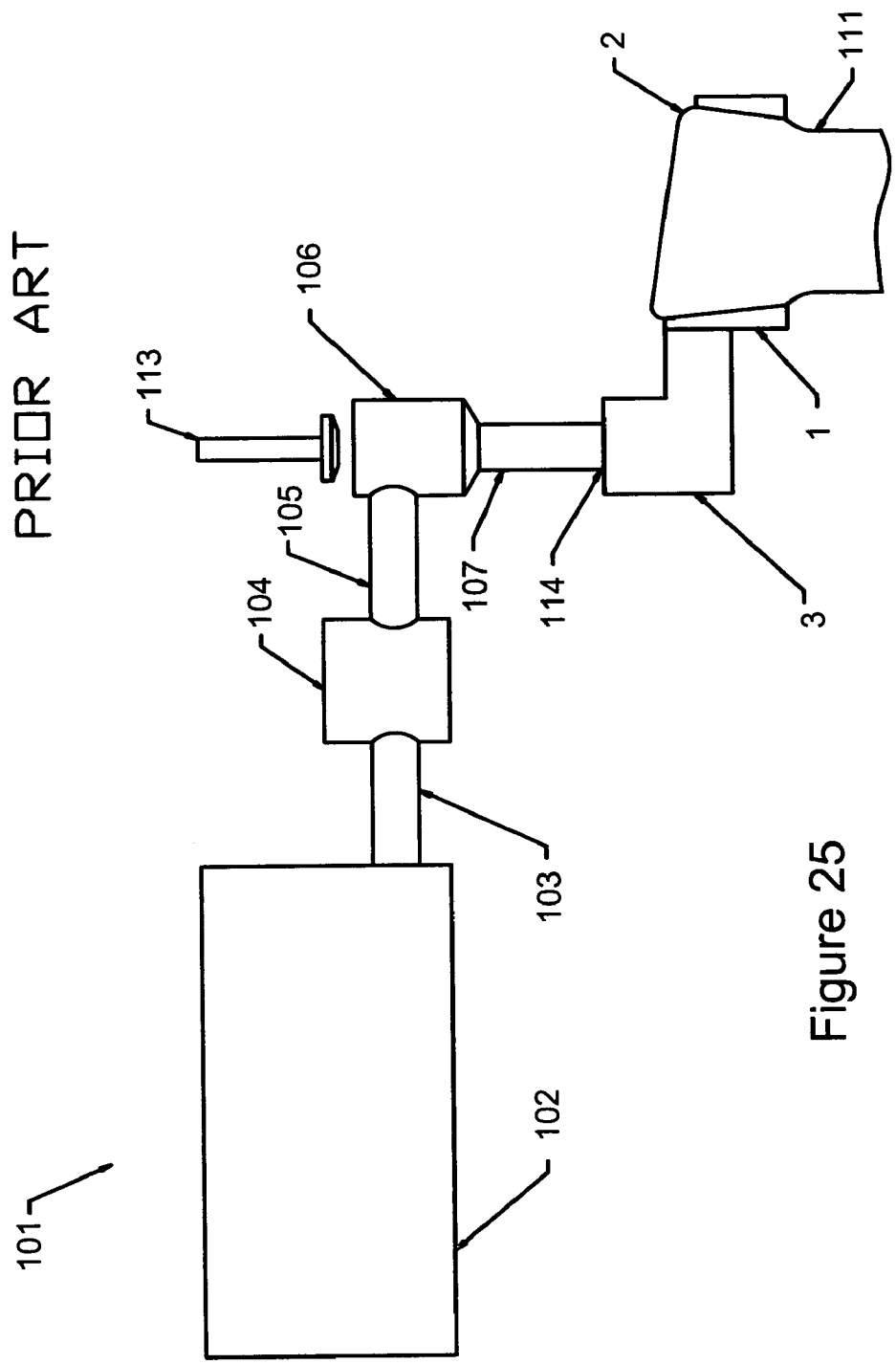
FIG. 25 illustrates the principle parts of "The Overflow Process" glass sheet manufacturing system.

FIGS. 6A through 6C are illustrations of cross-sections of the inflow pipe (3) of the forming apparatus (1). The cross-section of the inflow pipe (3) is determined by the requirements of the application which would include such considerations as flow modulation, heat losses, and ease of manufacture.

Non-Rectangular Trough Cross-Section

Along the same objectives, it is desirable to reduce the time difference between the glass (2) forming the near end of the sheet and the far end primarily by changing the rectangular cross-section of the trough (4) to reduce the regions of extremely slow glass flow. The glass "Sheet Forming Apparatus" in U.S. Pat. No. 3,338,696 requires a rectangular sheet forming trough cross-section, which inherently produces regions of unnecessarily slow flow, whereas this invention allows for a contoured trough (4) cross-section which can minimize the quiescent flow regions.

FIGS. 7A through 7C are illustrations of cross-sections of the trough of the forming apparatus. The shape of the forming trough (4) cross-section is also determined by the requirements of the application, the primary one of which is the flow distribution through the trough (4) to the weirs (5). Other considerations such as ease of manufacture, erosion of the weirs (5), and stress levels in the material of construction are important. Elimination of the square lower corners of the rectangular trough (4) is important to minimize slow glass flow in these regions.

Moving Glass Under Pressure

One of the most significant modifications of the overflow glass process taught by the present inventions is using pressure to move glass through the apparatus. The pressurized flow of glass requires a smaller flow channel for a fixed quantity of glass at a defined viscosity than the apparatus in U.S. Pat. No. 3,338,696. Inducing flow by elevated pressure reduces the size of the apparatus for a given production rate. Apparatus durability often requires that parts of the device are made from or coated with refractory metal, i.e. platinum. Therefore, the use of pressure leads to lower equipment cost and the potential of higher production rates.

Since the flow rate of glass through this apparatus is governed primarily by the glass inlet pressure, the glass viscosity, the apparatus geometry and to a lesser extent by the gravitational forces, the glass sheet formed will have substantially uniform thickness over an expanded range of glass flow and glass viscosity. This will facilitate process development and allow the manufacture of substantially different products on the same apparatus.

In all embodiments described below, the glass entering the apparatus from the inflow pipe would have a static pressure between 0.025 and 5.0 bar. The specification of low or high pressure is relative to this defined pressure range.

FIGS. 8A through 8C show an embodiment of an overflow glass forming apparatus (1) that would be typical of a system operating under relatively low inlet pressure. Glass (2) enters the apparatus (1) from the inflow pipe (3). The trough (4) is tapered toward the far end to minimize residence time of glass flowing to that end of the apparatus (1). The orifice (20) is on the top surface of the apparatus (1) and extends horizontally from near the inlet end to near the far end. The orifice (20) in this embodiment is narrow at the inlet end and very wide at the far end to accommodate for the loss in static pressure of the glass (2) as it flows to that end. The complex shape of the orifice (20) is designed to produce the desired uniform flow from the trough (4) to the sides of the apparatus (1).

FIGS. 9A through 9C is an embodiment that would be typical of a higher inlet pressure than the pressure used in the embodiment shown in FIGS. 8a–8c. The orifice (20) is very narrow at the inlet end and slightly wider at the far end to accommodate for the loss in static pressure of the glass (2) as it flows to that end. The tapered shape of the orifice (20) is less exaggerated in this higher pressure embodiment as the static pressure loss due to glass flow in the trough (4) has a lower effect on flow through the orifice (20) to the sides of the apparatus (1).

Accurate and robust construction of the orifice (20) is important for the required uniform flow distribution over the duration of a production run. The orifice may be made from refractory or to increase durability the orifice (20) could be made from refractory metal, i.e. platinum, reinforced as required by refractory, i.e. alumina. The orifice (20) may be either sprayed, via a molten platinum spraying process, directly on a shaped refractory or fabricated from a sheet. The body of the forming apparatus (1) is most likely made from refractory. It may be clad in a refractory metal envelope to insure long life. The envelope for the refractory may be either sprayed on or fabricated from sheet.

The flow is compensated at each end of the orifice (20) to account for end effects caused by surface tension as it affects the flow down the sides of the forming apparatus (1) and the flow in the free space below the forming apparatus (1) before the glass (2) has cooled to a final form. This compensation will require a localized adjustment in the width of the orifice (20) at each end. This end compensation is be applied to each orifice (20) shape.

For constant temperature operation of the forming apparatus (1), the sheet thickness will be a function of the quantity of glass flow and glass viscosity at the root (25) (wedge shaped bottom of apparatus (1) where the glass (2) joins to form the sheet). The sheet thickness distribution (wedge) will be a primary function of the trough (4) shape and the orifice (20) shape and substantially independent of the glass flow and viscosity. During operation, any wedge in the sheet thickness may be adjusted by tilting the apparatus (1). For instance, if the glass (2) at the far end is thinner than at the inlet end, lowering the far end will flow more glass (2) to that end, consequently thickening the sheet at the far end.

FIGS. 10A through 10C show an embodiment that has a simple trough (4) shape and a relatively low inlet pressure. Glass (2) enters the forming apparatus body (1) from the inflow pipe (3). The trough (4) has substantially the same cross section for the length of the apparatus (1) and access from both ends during manufacture. The orifice (20) is on the top surface of the apparatus (1) and extends horizontally from near the inlet end to near the far end. The orifice (20) is narrow at the inlet end and wider at the far end to accommodate for the loss in static pressure of the glass as it flows to that end. Note that the width change is less than the embodiment shown in FIGS. 8A through 8C as the loss in static pressure of the glass (2) flowing to the far end is less. The complex (somewhat parabolic) shape of the orifice (20) is designed to produce the desired uniform flow from the trough (4) to the sides of the apparatus.

FIGS. 11A through 11C show an embodiment that has a simple trough (4) shape, an orifice (20) that is not confined to a horizontal plane, and a relatively low inlet pressure. Glass (2) enters the apparatus from an inflow pipe (3). The trough (4) has substantially the same cross section for the length of the apparatus (1) and access from both ends during manufacture. The trough (4) has a pent roof shape such that a vee shaped orifice (20) may be formed. The orifice (20) is narrow at the inlet end and wider at the far end to accommodate for the loss in static pressure of the glass (2) as it flows to that end. Note that the width change is less than in FIGS. 8A through 8C and 10A through 10C as the loss in static pressure of the glass flowing to the far end is compensated for in part by the increase in static pressure at the far end caused by gravitational forces. The orifice (20) also has a more complex shape because of the interaction of flow and the gravitational forces. The orifice (20) is designed to produce the desired uniform flow from the trough (4) to the sides of the apparatus (1).

An advantage of this embodiment is that the orifice (20) is cut such that its exposed surfaces face either the trough (4) or the outside of the device. This general design would provide a geometry whereby both the trough (4) and the orifice (20) surface may be coated with refractory metal by a spraying process. The embodiment would, however, have a more limited range of operating flow conditions much like the apparatus in U.S. Pat. No. 3,338,696 because of the influence of gravitational forces. In some applications such as this embodiment, sloping and shaping the orifice (20) out of a horizontal plane may produce superior flow characteristics and/or provide for simplified construction. This would normally be at the expense of somewhat limiting the range of operation of a given apparatus (1).

The present invention significantly modifies "The Overflow Process" such that the deformation of the forming apparatus under stress occurs in such a way that the flow distribution of the glass in the longitudinal direction remains substantially uniform, thus the deformation has a minimum effect on the thickness variation of the glass sheet.

The present invention applies forces to the ends of the orifice structure to counteract stress caused by the hydrostatic pressure inside the forming apparatus. This substantially reduces or eliminates tension forces, which can cause failure. This also reduces the thermal creep deformation of the orifice.

FIGS. 33A and 33B illustrate the typical effects of thermal creep on the shape of the trough. FIG. 33A shows that the forming trough (4) sags in the middle such that the top of the weirs (224) and the root (225) are now curved (221). In addition, the trough bottom (206) has a change in curvature (221). This curvature (221) causes the molten glass (2) to no longer flow with constant thickness (222) over the weirs (224). This curvature (221) allows more glass to flow over the middle of the weirs resulting in an uneven sheet thickness distribution. FIG. 33B shows how the hydrostatic force from the molten glass (2) in the forming trough (4) forces the weirs (224) to move apart at the top. This allows more glass to flow to the middle of the forming trough (4), making the thickness in the middle even greater.

FIGS. 34A through 34D show a sheet glass forming apparatus (230) as known in the prior art. The forming apparatus (1) is supported by an inlet end supporting block (231) and a far end supporting block (232). The forming apparatus (1) is the equivalent of a beam, which is subject to a bending stress from its own weight, from the weight of the glass in the trough (4) and on the forming apparatus (1), and from drawing forces. Because of the low tensile strength of the trough material, a compressive force (233) is applied to the lower half of the forming apparatus (1) to force the material at the root (225) of the forming apparatus (1) into compression. Typically the inlet end support block (231) is restrained in the longitudinal (horizontal) direction and the compression force (233) is applied to the far end support block (232). Prior art considered primarily preventing tension at the root (225) of the forming apparatus (1), however, applying a force (233) of twice the value required to prevent tension in the root (225) will substantially reduce the sagging (221) shown in FIGS. 33A and 33B.

FIGS. 35A through 35D show an embodiment of this invention whereby an open top trough (4) with side weirs (5) is replaced with a shaped trough (246) with a shaped orifice (244) along the full length of the top of the trough. The glass (242) entering the trough must be at a substantially higher static pressure as the orifice (244) restricts the flow of glass from the trough. The orifice (244) has a varying shape over its length; however, the orifice width (247) and length (248) are proportioned such that the restriction to flow through the orifice (244) is equal at all locations except at the very ends. In the prior art, the vertical height of the weirs (5) was critical for regulating the flow distribution out of the trough (4). In contrast, in the present invention, the width (247) and the length (248) of the orifice (244) regulate the flow.

FIGS. 36A through 36D show the shape of a top orifice (254) that has changed shape during the production run. This change in shape is the result of thermal creep caused by the internal static pressure in the shaped trough (256), which has also changed shape. A new value for the width (257) of the orifice (254) is the result. The width (257) of the orifice has changed over time. This change in shape and the new value for the width (257) of the orifice (254) can be predicted by stress analysis knowing the internal pressure, the apparatus shape and the apparatus material characteristics. Knowing this new shape, the mathematical principles discussed below in the section titled "Design of the Orifice" are used to determine the width (247) and length (248) of the orifice (244) at the start of the production.

FIGS. 37A through 37D show an embodiment of this invention, which has a different shape than that shown in FIGS. 35A through 35D, but utilizes the same principles. The glass (262) enters the trough (266). The top surface of the orifice (264) is substantially flat instead of being convex like the top surface of the orifice (244) in FIGS. 35A through 35D. The top of the shaped trough (266) is shaped to accommodate the length (268) of the orifice (264). The shaped trough (266) is trapezoidal in cross-section in the center and rectangular at each end instead of being round along its entire length like the trough (246) in FIGS. 35A through 35D. This illustrates an example of the large number of variations in these features that may be used as long as the principles discussed below in the section titled "Design of the Orifice" are used the determine the width (267) and length (268) of the orifice (264).

FIGS. 38A through 38C show an embodiment of the present invention, where the sheet glass forming apparatus (270) has six end support blocks. The inlet end has three support blocks, a lower support block (271) and two upper support blocks (272). Longitudinal compression forces (275) and (276) are applied to the support blocks (271) and (272). The far end also has three support blocks, a lower support block (273) and two upper support blocks (274). Longitudinal compression forces (275) and (276) are applied to the support blocks (273) and (274).

The shape and loading of the support blocks (271) and (273) are preferably designed to the same criteria as support blocks (231) and (232) in FIGS. 34A through 34D. The upper support blocks (272) and (274) are attached to the outboard edges of the structure that forms the orifice (244). They exert a compressive force on the orifice (244) structure to counteract the affect of the hydrostatic forces, which place the outside of the orifice (244) structure in tension and tends to spread the orifice (244) apart. Because force (276) is applied at the top of the forming apparatus (1), force (275) must be greater than force (233) in FIGS. 34A through 34D to maintain the same relative compression of the root (225).

FIGS. 39A through 39D show an embodiment of the present invention where the sheet glass forming apparatus (270) has eight end support blocks. The inlet end has five support blocks, a lower support block (291) and two sets of orifice support blocks (292) and (299). Longitudinal compression force (233) is applied to the support block (291). Lateral forces (297) and (298) are applied to the orifice support blocks (292) and (299). The far end has three support blocks, a lower support block (293) and one set of orifice support blocks (294). Longitudinal compression force (233) is applied to support block (293). Lateral force (296) is applied to the orifice support blocks (294).

The shape and loading of the support blocks (291) and (293) are preferably designed to the same criteria as support blocks (231) and (232) in FIGS. 34A through 34D. The orifice support blocks (292), (294), and (299) are attached to the outboard edges of the structure that forms the orifice (284). They exert lateral forces on the orifice (284) structure to counteract the affect of the hydrostatic forces, which place the outside of the orifice (284) structure in tension and tends to spread the orifice (284) apart. The sum of forces (297) and (298) acts to control the spreading apart of the inlet end of the orifice (284), and force (296) acts to control the spreading apart of the far end of the orifice (284). The spreading apart of the center section of the orifice (284) is a function of these forces and the beam deflection of the orifice structure. The relative magnitude of forces (297) and (298) would exert a moment on the orifice such as to effect the parallelism of the orifice sides (285).

The orifice (284) extends the full length of the top of the forming apparatus (1) to allow the lateral forces (296), (297), and (298) to be effective. Cover blocks (288) and (289) contain the glass in the forming apparatus (1).

The forces (296), (297), and (298) are adjustments only in the sense that they act to control the thermal creep of the structure, which occurs over a long period of time. Use of these forces to adjust the orifice width in the short term would require forces of a magnitude that would most likely result in structural failure of the refractory components.

Design of the Orifice

The design of the orifice, to manufacture sheet glass of a thickness that meets the product specification over the life of the production campaign, must account for the change in shape caused by thermal creep. "Computational Fluid Dynamics" (CFD) is the technology which uses computers to calculate the distribution of glass flow through an orifice as it changes size and shape. "Finite Element Analysis" (FEA) is the technology which uses computers to calculate the change in size and shape of the orifice caused by thermal creep. An iterative procedure is used whereby the change in width of an orifice due to thermal creep is assumed. With the assumed width change, an orifice size and shape is designed using CFD such that an even flow distribution through the orifice is obtained at the initial and final orifice width. The internal pressure distribution in the trough as calculated by CFD at different times in the production campaign is then used in FEA to recalculate the actual structural deflection with the calculated orifice design. The calculated structural deflection is then used to determine a new orifice shape using CFD. This process is repeated until the analysis converges to a final design. The following closed form approach to the solution of the present invention is presented herein.

The flow (Q) through a parallel plate orifice per unit length is a function of the width (w) (distance between the plates), the length of the orifice (l) in the direction of flow and the pressure difference across the orifice.

The equation is:

$$Q = K*p*w^2/l \qquad (1)$$

where:
Q=flow rate
K=constant of proportionality
p=pressure difference across orifice
w=distance between plates
l=length of orifice in the direction of flow The change in flow written in the form of a partial differential equation is:

$$\Delta Q = \partial Q/\partial p * \Delta p + \partial Q/\partial w * \Delta w + \partial Q/\partial l * \Delta l \qquad (2)$$

where:

$$\frac{\partial Q}{\partial p} = \frac{\partial (Kpw^2/l)}{\partial p} = \frac{Kw^2}{l} = \frac{Q}{p} \qquad (3)$$

$$\frac{\partial Q}{\partial w} = \frac{\partial (Kpw^2/l)}{\partial w} = 2\frac{Kpw}{l} = 2\frac{Q}{w} \qquad (4)$$

$$\frac{\partial Q}{\partial l} = \frac{\partial (Kpw^2/l)}{\partial l} = -\frac{Kpw^2}{l^2} = -\frac{Q}{l} \qquad (5)$$

For the initial examination assume $\Delta p=0$ and $\Delta l=0$.

If $\Delta=0$ and $\Delta l=0$, then:

$$\Delta Q = \partial Q/\partial w * \Delta w \qquad (6)$$

[from equation 1]

$$= (2Q/w) * \Delta w$$

[substitution equation 4 into equation 6], or:

$$\Delta Q/Q = 2 * \Delta w/w \qquad (7)$$

The goal is for $\Delta Q/Q$ (the percentage change in flow rate) to be equal at all orifice locations along the top of the apparatus. Although there are changes in any manufacturing process over time, these changes preferably result in no variation in the sheet thickness distribution. Changes in actual sheet thickness are easily corrected with the speed of the drawing of the glass sheet.

The percentage change in the flow is preferably always the same at all orifice locations along the top of the apparatus. Then, the apparatus does not change the thickness profile of the sheet.

For the percentage change in flow at any point along the orifice to be equal, the percentage change in width of the orifice at any point along the orifice must also be equal.

$\Delta Q/Q$ is preferably equal at all points (percentage change in flow rate), therefore at any two points (1 and 2) along the orifice:

$$\Delta Q_1/Q_1 = \Delta Q_2/Q_2 \qquad (8)$$

$$\Delta w_1/w_1 = \Delta w_2/w_2 \qquad (9)$$

Rearranging equation 9:

$$w_2 = w_1 * \Delta w_2/\Delta w_1 \qquad (10)$$

$\Delta w_1$ and $\Delta w_2$ (change in w over time) are both known from the analysis of the relative thermal creep of each section of the orifice. Once $w_1$ is established, $w_2$ can be calculated at any other point on the orifice. It is also important to calculate the orifice length in the direction of flow (1) in order that the flows ($Q_1$ and $Q_2$) be identical.

Rearrange equation 1 by solving for w:

$$w = \left(\frac{Ql}{Kp}\right)^{1/2} \qquad (11)$$

$$\frac{w_1}{w_2} = \left[\left(\frac{Q_1 l_1}{Kp_1}\right)\left(\frac{Kp_2}{Q_2 l_2}\right)\right]^{1/2}, \text{ or equivalently}$$

$$\frac{w_1}{w_2} = [(Q_1 * l_1 * p_2)/(Q_2 * l_2 * p_1)]^{1/2} \qquad (12)$$

Solve equation 12 for $l_2$, considering that $Q_1 = Q_2$:

$$l_2 = (p_2 * l_1 * w_1^2)/(p_1 * w_2^2) \qquad (13)$$

The design of this system is an iterative process whereby an orifice and trough structure is designed for uniform flow of glass from the orifice along the length of the apparatus. The structure is then analyzed for thermal creep. The orifice and structure are then redesigned using the above criteria. The design iteration is continued until the solution converges. The principles of computational fluid dynamics guide the design process.

The design is further refined by considering the change in static pressure that occurs as the orifice width is changed by the thermal creep.

$$\Delta Q = \partial Q/\partial p * \Delta p + \partial Q/\partial w * \Delta w + \partial Q/\partial l * \Delta l \qquad (2)$$

The same kind of analysis can be done assuming that only $\Delta l=0$. This alters equation 2 into:

$$\Delta Q = \partial Q/\partial p * \Delta p + \partial Q/\partial w * \Delta w \qquad (14)$$
$$= Q/p * \Delta p + 2 * Q/w * \Delta w$$

[substituting equations 3 & 4 into 14], or:

$$\Delta Q/Q = \Delta p/p + 2 * \Delta w/w \qquad (15)$$
$$= \Delta w/w * (2 + w/p * (*\Delta p/\Delta w))$$

$\Delta Q/Q$ is preferably equal at all points (percentage change in flow rate), therefore at any two points (1 and 2) along the orifice:

$$\Delta Q_1/Q_1 = \Delta Q_2/Q_2 \qquad (16)$$

$$\Delta w_1/w_1 * (2 + w_1/p_1 * (*\Delta p/\Delta w)_1) = \Delta w_2/w_2 * (2 + w_2/p_2 * (*\Delta p/\Delta w)_2) \qquad (17)$$

Rearranging equation 17:

$$w_2 = w_1 * \Delta w_2/\Delta w_1 * (2 + w_2/p_2 * (*\Delta p/\Delta w)_2)/(2 + w_1/p_1 * (*\Delta p/\Delta w)_1) \qquad (18)$$

Although $\Delta p/\Delta w$ is a less important variable in some applications, the magnitude of $\Delta p/\Delta w$ can be significant as it is a function of the specific design. $\Delta p/\Delta w$ is determined from structural and fluid flow calculations. The effect of $\Delta p/\Delta w$ is non-linear over time, but can be minimized by the adjustment of operating parameters (tilt, temperature, etc). The effect of sagging of the trough can be included in $\Delta p/\Delta w$. It is desirable to minimize $\Delta p/\Delta w$ to make the glass forming process more stable. One goal is to minimize the change in pressure over the operating life of the apparatus.

The calculation for $l_2$ as shown in equations 11 to 13 remains the same.

In the embodiments shown in FIGS. 35A through 35D and FIGS. 37A through 37D, the short (approximately 10% of the length) ends of the orifices (244) and (264) do not necessarily conform to the principles described in the "Design of the Orifice" section. The glass that flows from these end areas forms the unusable edge portions of the formed glass sheet (112).

A computer mathematical simulation was performed to demonstrate the application of this embodiment of the present invention. Computational fluid dynamics (CFD) was used. A CFD product called CFD2000® was used, which is one of several that are available commercially. In this example, the glass flow was approximately 8 tons per day at 40,000 poise using an orifice 1.6 meters long. The 1.6 meter orifice produces saleable glass sheet approximately 1.2 meters wide. The design of the orifice structure was assumed such that the change in width ($\Delta w$) is the same at all points along the length of the orifice.

TABLE 1

| | Extent of Orifice on Top of Trough (z) | | | | | | | | | | |
|---|---|---|---|---|---|---|---|---|---|---|---|
| | 0.00 | 0.16 | 0.32 | 0.48 | 0.64 | 0.80 | 0.96 | 1.12 | 1.28 | 1.44 | 1.60 |
| Length (l) | .1344 | .1072 | .0860 | .0730 | .0620 | .0513 | .0422 | .0334 | .0262 | .0219 | .0187 |
| Width (w) @ time 0 | .0180 | .0175 | .0170 | .0165 | .0160 | .0155 | .0150 | .0145 | .0140 | .0135 | .0130 |
| Width (w) @ time 1 | .0200 | .0195 | .0190 | .0185 | .0180 | .0175 | .0170 | .0165 | .0160 | .0155 | .0150 |
| Width (w) @ time 2 | .0220 | .0215 | .0210 | .0205 | .0200 | .0195 | .0190 | .0185 | .0180 | .0175 | .0170 |
| Width (w) @ time 3 | .0240 | .0235 | .0230 | .0225 | .0220 | .0215 | .0210 | .0205 | .0200 | .0195 | .0190 |

Figure 40A:
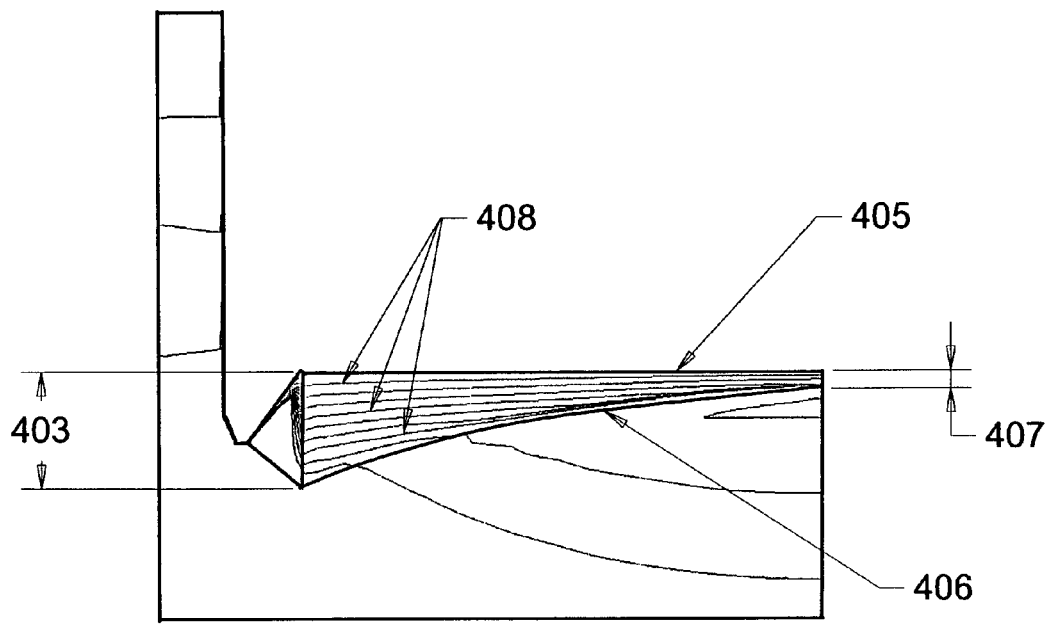
FIG. 40A shows pressure contours from a mathematical model of an embodiment of the present invention at the start-up operating conditions.
Figure 40B:
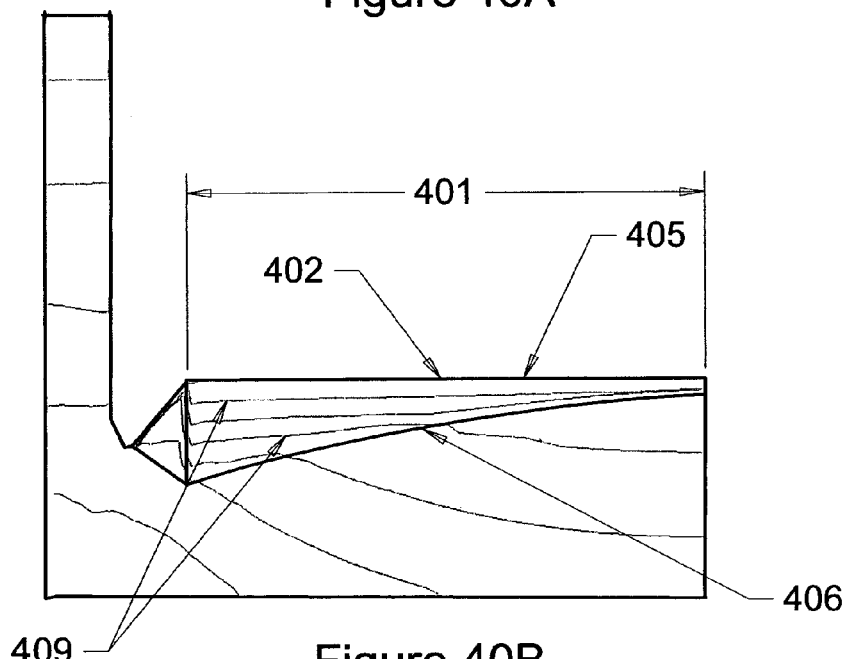
FIG. 40B shows pressure contours from a mathematical model of an embodiment of the present invention at the shut-down operating condition.
Figure 41A:
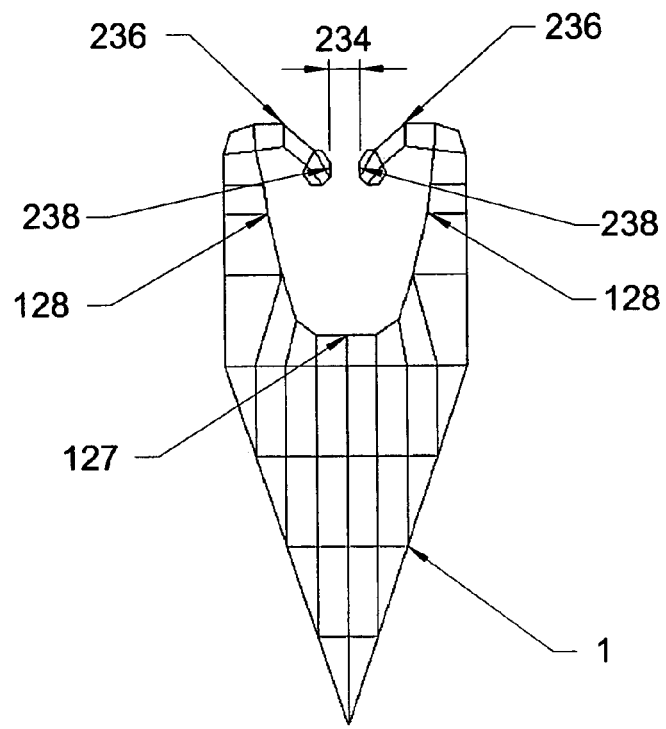
FIG. 41A shows the cross-section of the forming apparatus at the start-up operating condition in an embodiment of the present invention.

Table 1 lists the dimensions of the orifice at the start of the production campaign and for three orifice shapes that have greater width (w) that was the result of thermal creep, each at increasing time during the production campaign. FIGS. 40A and 40B illustrate the extent (z) of the orifice along the top of the trough (401) and the length (l) of the orifice (403) at the inlet end and (407) at the far end of the trough. FIG. 41A illustrates the width (w) of the orifice (234). The data for the dimensions at the center of the extent of the orifice (402), which is z=0.80, is show in the sixth column of data. It shows that the length (l) of the orifice is 0.0513 meters and that the width (w) at time zero of the campaign is 0.0155 meters. The width (w) at times 1, 2, and 3 are 0.0175, 0.0195, and 0.0215 respectively.

Table 2 lists the flow distribution for the center eight of ten equal increments of the length of the orifice, at each of the times in the production campaign. The two end increments are not listed as they form the unusable edges of the sheet. The first data column lists the flow from the orifice between extent locations 0.16 and 0.32 meters and the last data column lists the flow from the orifice between extent locations 1.28 and 1.44 meters. The flow from all segments was equal at time zero and was normalized to 1.00. It can be seen that the flow from the segment 0.16–0.32 increases from 1.00 at time zero to 1.059 at time 3 and the flow from segment 1.28–1.44 decreases from 1.00 to 0.962. This flow change would result in a glass sheet thickness distribution error that would be close to product specification limits. If the thickness error could not be compensated by other means, i.e. tilting of the trough or temperature distribution this error could result in the production campaign ending at or near time 3. Note that the orifice width increases by 39% and the flow distribution for the center eight flow regions remains within 6%.

pressure (408) at time zero. The top of the orifice (405) is horizontal whereas the bottom of the orifice (406) is concave, the inlet end (403) of the orifice being substantially longer than the outlet end (407). FIG. 40B is a sectional view and shows the lines of constant static pressure (409) at time three. The static pressure at times zero and three differ substantially, therefore the example represents a condition where $\Delta p/\Delta w$ is significant.

For this example, the change in width ($\Delta w$) was assumed constant for the entire length of the orifice. The static pressure data for times zero and three as well as at the intermediate times is now used in a finite element stress analysis to insure a structural design that meets the constant change in width ($\Delta w$) design criteria.

Non-Widening Orifice

Figure 41B:
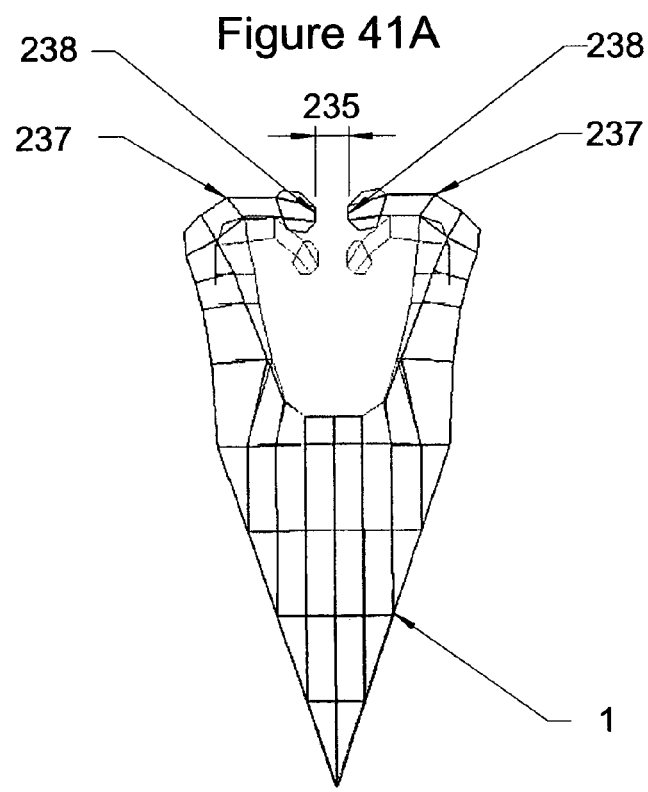
FIG. 41B shows the cross-section of the forming apparatus at the shut-down operating condition as predicted by a mathematical model in an embodiment of the present invention.

FIGS. 41A and 41B show an embodiment of this invention, which is a structural configuration of the forming apparatus (1), whereby the orifice (238) does not change width (234) and (235) substantially when subject to thermal creep. FIG. 41A shows a cross-section of the shape of the forming apparatus (1) at the start of the campaign. The trough side walls (128) are designed to be stiff in bending. The initial trough top surfaces (236) to which is mounted the orifice (238) are not as rigid and are curved inward and downward as they connect to the orifice (238) which has an initial width (234). FIG. 41B shows an exaggerated deformation of the side walls (128) and the deformed top surfaces (237) when subject to internal hydrostatic pressure which would cause thermal creep. The deformation of the structure is such that the new orifice width (235) remains substantially the same as the initial orifice width (234). The orifice (238) is radiused such that the shape of the orifice (238), which is exposed to flow, is the same in both the initial position and

TABLE 2

| | Segments of Orifice on top of trough | | | | | | | |
|---|---|---|---|---|---|---|---|---|
| | 0.16–0.32 | 0.32–0.48 | 0.48–0.64 | 0.64–0.80 | 0.80–0.96 | 0.96–1.12 | 1.12–1.28 | 1.28–1.44 |
| Flow (Q) @ time 0 | 1.000 | 1.000 | 1.000 | 1.000 | 1.000 | 1.000 | 1.000 | 1.000 |
| Flow (Q) @ time 1 | 1.010 | 1.005 | 1.000 | 0.997 | 0.995 | 0.993 | 0.994 | 0.995 |
| Flow (Q) @ time 2 | 1.031 | 1.018 | 1.045 | 0.995 | 0.987 | 0.982 | 0.981 | 0.983 |
| Flow (Q) @ time 3 | 1.059 | 1.035 | 1.012 | 0.993 | 0.978 | 0.967 | 0.963 | 0.962 |

FIG. 40A is a sectional view of a mathematical depiction of the shape of the orifice and lines of constant static the deformed position. The deformed shape of the forming apparatus shown in FIG. 41B was calculated using FEM software by ALGOR®. This embodiment may be used in combination with the orifice design techniques discussed in the preceding paragraphs.

The present invention is much less susceptible to changes in the glass flow distribution caused by the vertical sagging of the top surface of the trough (4) (shown in FIGS. 33A and 33B). The change in weir (224) elevation does not greatly affect the flow because it is small relative to the higher static pressure at the inlet of the orifice (244) in the present invention.

Tilting of the longitudinal axis of the trough may still be used to change the end to end thickness of the glass sheet, but it has a much lower effect than in the prior art because the change is small relative to the higher static pressure at the inlet of the orifice (244) in the present invention.

Due to the insensitivity of the flow to sagging of the weirs (224) shown in FIGS. 33A and 33B, the manufacturing process is more robust with the apparatus of the present invention. The week to week operating conditions of the apparatus are far more stable than in the apparatus of the prior art.

Flow Control Plug

One of the discoveries of the present invention is that an improvement can be provided such that flow dynamics can be altered during hot operation by insertion, removal or adjustment of a flow control plug.

FIGS. 12A through 12C show an embodiment that has a simple trough (4) shape and an internally mounted flow control plug (30). The orifice (20) is designed for a relatively high inlet pressure. The trough (4) has substantially the same cross section for the length of the apparatus (1) and access from both ends during manufacture. The flow control plug (30), an example shape of which is shown in FIGS. 13A through 13C, is designed to modulate the flow in the trough (4) such that the static pressure at the inlet to the orifice (20) is constant along its entire length. The orifice (20) is narrow and substantially the same width its entire length. Because the static pressure change in the glass flowing through the orifice (20) is the same along its working length, a constant width orifice (20) will produce the desired uniform flow from the trough (4) to the sides of the apparatus (1).

The plug (30) can be moved vertically in the trough (4) to alter the flow distribution to cause a convex or concave shape in the sheet thickness. This can be used to compensate for the changes in sheet thickness distribution caused by apparatus degradation.

While FIGS. 13A through 13C show one example of flow control plug (30), many other shapes are possible, and the intention is that the plug (30) would facilitate both theoretical and empirical operational modifications to a running system such that a particular facility might have a number of plugs (30) on hand to quickly adapt to a change in the system. For example, if wear was developing in a trending pattern that was being corrected by plugs (30), the future wear could be projected and next few plugs (30) could be designed and constructed well in advance of when they would be needed.

Another shape that would have a particular utility would be a flow control plug (30) with a conical, cylindrical, or prismatic shape. A unique irregularly shaped flow control plug (30) with an eccentric axis could be located in the center of the trough (4) or partially embedded in the bottom of the trough (4). The plug (30) could be rotated about its axis to alter the flow distribution and thereby compensate for changes in sheet thickness distribution. It could also be tilted and/or moved horizontally or vertically to produce the desired sheet thickness correction.

Figure 27B:
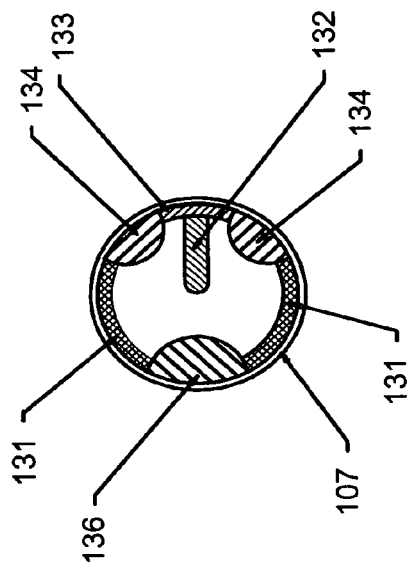
FIG. 27B shows a cross-section of the glass flow in the inlet pipe across line B—B of FIG. 27A.
Figure 27C:
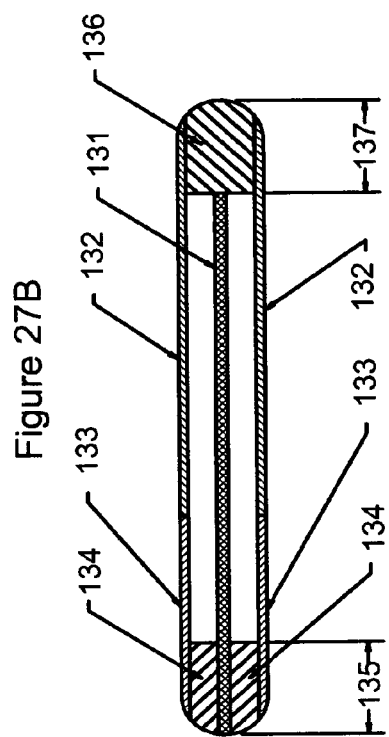
FIG. 27C shows a cross-section across line C—C of FIG. 27A, where the glass which flows in the inlet pipe appears in the formed glass sheet.
Figure 27A:
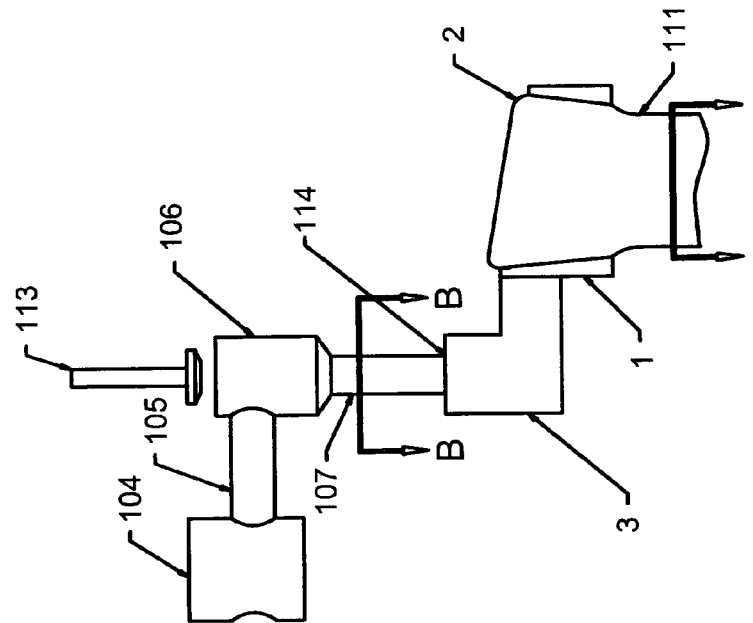
FIG. 27A shows a side view of "The Overflow Process" as known in the prior art.
Figures 34A, 34B, 34C, 34D:
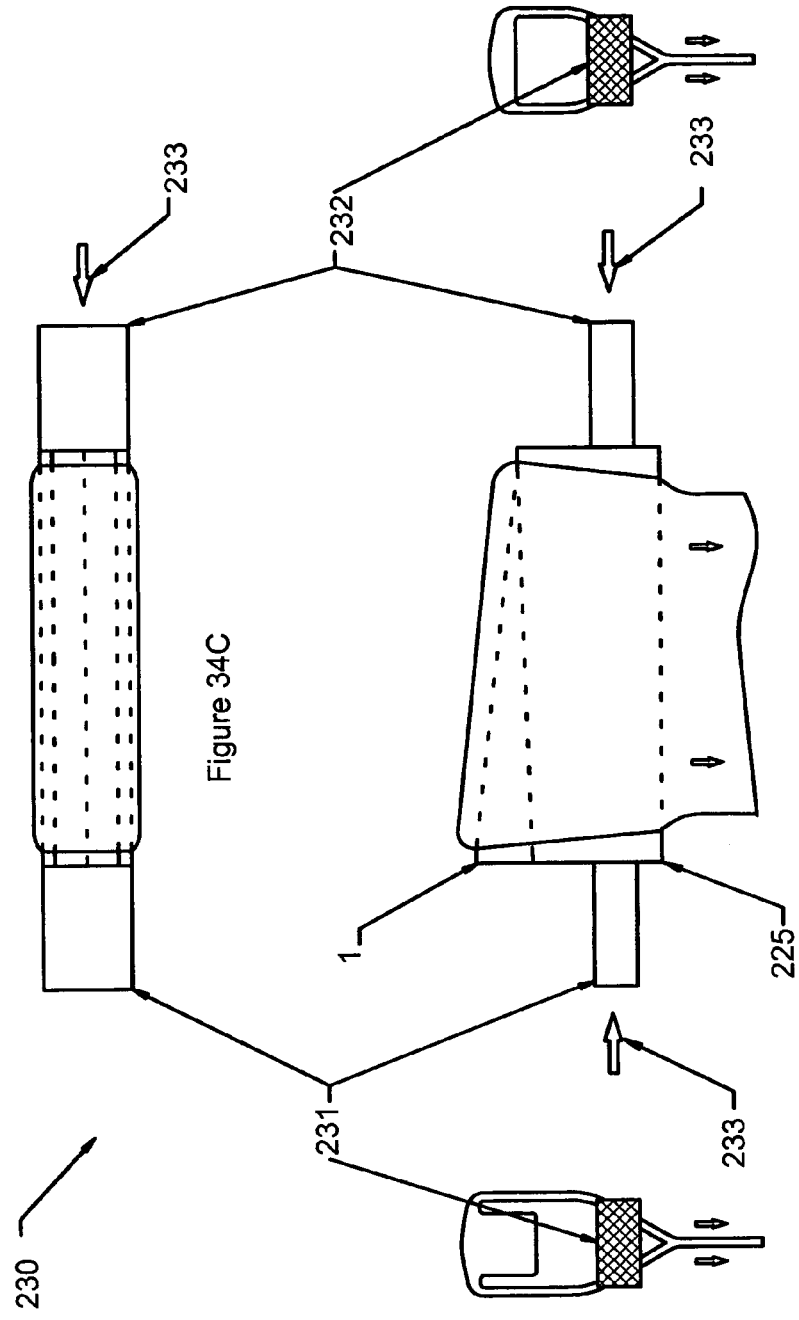
FIG. 34A illustrates the prior art design of the forming trough support system.
FIG. 34B shows a cross section of FIG. 34A.
FIG. 34C shows a top view of FIG. 34A.
FIG. 34D shows a cross section of FIG. 34A.

FIGS. 27A through 27C illustrate where the glass (2) flowing in the inlet pipe (3) ends up in the formed glass sheet in the prior art "Overflow Process". The glass flow in proximity to the side surfaces (131) of the inlet pipe (3) ends up in the center of the drawn sheet. The flow (133) in proximity to the front surface of the downcomer pipe (107) is distributed over the entire glass surface; however, it is most concentrated on the approximate one third of the sheet at the inlet end. This surface glass (133) is subject to disruption by the downcomer pipe surface, and by the glass in the quiescent zones in the bowl (106), and at the downcomer pipe (107) to the inlet pipe (3) connection (114). The surface of the remaining substantially two thirds of the sheet is formed from virgin interior glass (132). Two other portions of the glass flow (134) which are symmetrically offset from the front surface at an angle of approximately 45 degrees end up forming the near end unusable edge section (135) at the inlet end of the sheet. Another portion (136) centered at an angle of 180 degrees proceeds to the far end unusable edge section (137).

The refractory materials from which the forming trough and its support structure are made change shape when stressed at high temperature. As shown in FIG. 33B, the trough sags in the middle under its own weight and the weight of the glass in the trough.

Referring to FIGS. 28A through 28I, FIG. 28A shows a trough with straight weirs (5) and a contoured bottom (127). This trough makes a glass sheet of substantially uniform thickness. The trough has a bottom formed by a flow control plug (142) shown in FIG. 28C. In time, the trough will sag such that the weirs (5) will have the curved shape (146) shown in FIG. 28B. Process adjustments are made to keep the sheet thickness within specification; however, at a point in time the limits of this adjustments will be reached and the manufacturing campaign would have to be terminated.

To make glass of substantially uniform thickness with the original process adjustments, a contoured bottom shape (147) like that shown in FIG. 28B is required. The flow control plug (142) shown in FIG. 28C is replaced by the flow control plug (143) shown in FIG. 28D. This replacement is facilitated by a glass seal (144) at the location shown in FIGS. 28A and 28B. Glass of uniform thickness can then be made and the production run extended.

The flow control plug (145) shown in FIG. 28G has a top contour (127) like the flow control plug (142) in FIG. 28C and a bottom contour (147) like the flow control plug (143) in FIG. 28D. If a flow control plug (145) of this shape is used, it can be rotated 180 degrees to convert the bottom contour from the shape of FIG. 28A to the shape of FIG. 28B.

FIG. 28F shows the shape of the region (140) of the glass (136) which ends up in the unusable far end bead (137) as it flows over the top of the flow control plug (143). Because this glass completely covers the flow control plug, any defects caused by the presence of the flow control plug (143) do not cause defects in the useable sheet.

FIG. 28H shows the shape of the region (139) of the glass (136) which ends up in the unusable far end bead (137) as it flows on the top surface of the forming apparatus in the start-up configuration. The triangular shaped prism (148) attached to the top of the flow control plug (142) pierces the top surface of the glass within this region (139), thus no defects occur in the useable sheet.

FIG. 28I shows the shape of the region (141) of the glass (136) which ends up in the unusable far end bead (137) as it flows on the top surface of the forming apparatus in the configuration using the replacement flow control plug (143). The triangular shaped prism (149) attached to the top of the flow control plug (143) pierces the top surface of the glass within this region (141), thus no defects occur in the useable sheet. Prisms (148) and (149) are not restricted to triangular shape and may have a contoured shape on all three axis. The shape of the regions (139) and (141) depend on the shape of the prisms (148) and (149). A flow control plug that pierces the top surface of the glass more than half the distance to the inlet end may be designed to produce no defects in the useable portion of the sheet.

Although the triangular shaped prisms (148) and (149) are shown fixed to the top of the flow control plugs (142), (143), and (145), they can be made to be adjustable in the longitudinal direction relative to the flow control plugs (142), (143), and (145), to provide the capability for additional degrees of adjustment of the glass flow distribution in the trough.

Referring to FIGS. 29A through 29F, FIG. 29A shows a trough design of the present invention. One of the differences between this design and the teachings of U.S. Pat. No. 3,338,696 is that the bottom is substantially flat and the weirs contoured. This allows latitude in the shape of the flow control plug (152) in that the flow control plug (152) may be either flat or contoured in the initial operating position. This trough has a bottom formed in part by the substantially flat side (157) of the flow control plug (152) shown in FIG. 29C. The flow control plug (152) may be rotated about the centerline (151) out of a cavity (159) in the bottom of the trough.

In time the trough will sag such that eventually the weirs (155) will have the curved shape (156) shown in FIG. 29B. At this time the flow control plug (152) is rotated into the position shown in FIG. 29B such that the contoured top edge has the shape (158) shown in FIG. 29D. This rotation is facilitated by a glass seal (154) at the location shown in FIGS. 29A and 29B. The flow control plug (152) is contoured in three dimensions such that during the time the trough is sagging from the initial weir shape (155) to the shape (156) shown in FIG. 29B, incremental rotation of the plug makes glass of substantially uniform thickness with the original process adjustments. FIG. 29F shows the shape of the region (150) of the glass (136), which ends up in the unusable far end bead (137) as it flows over the top of the flow control plug (152). Because this glass completely covers the flow control plug, any defects caused by the presence of the flow control plug (152) do not cause defects in the useable sheet.

Referring to FIGS. 30A through 30F, FIG. 30A shows a trough design of the present invention. One of the differences between this design and the teachings of U.S. Pat. No. 3,338,696 is that the bottom is substantially flat (167) and the weirs (165) contoured. This allows latitude in the shape of the flow control plugs (162) and (163) in that the flow control plugs may be either flat or contoured in the initial operating position. The trough has a bottom formed in part by the substantially flat side (167) of the flow control plugs (162) and (163) shown in FIG. 30C. The flow control plug mechanism (161) has multiple parts, in this case two flow control plugs (162) and (163), which may be raised or tilted out of a cavity (169) in the bottom of the trough.

In time the trough will sag such that eventually the weirs (165) will have the curved shape (166) shown in FIG. 30B. At that time the flow control plugs (162) and (163) are raised and tilted into the position shown in FIG. 6B such that the contoured top edge has the shape (168) shown in FIGS. 30B and 30D. This adjustment is facilitated by a glass seal (164) at the location shown in FIGS. 30A and 30B. The flow control plugs (162) and (163) are contoured such that during the time the trough is sagging from the initial weir shape (165) to the shape (166) shown in FIG. 30B, incremental positioning of the flow control plugs (162) and (163) makes glass of substantially uniform thickness with the original process adjustments. FIG. 30F shows the shape of the region (160) of the glass (136), which ends up in the unusable far end bead (137), as it flows over the top of the flow control plugs (162) and (163). Because this glass completely covers the flow control plug, any defects caused by the presence of the flow control plugs (162) and (163) do not cause defects in the useable sheet.

Referring to FIGS. 31A through 31E, FIG. 31A shows a trough of the present invention. One of the differences between this design and the teachings of U.S. Pat. No. 3,338,696 is that the bottom (177) is flat and the weirs (175) contoured. This allows the flow control plug (172) to move on a substantially flat surface. The bottom of the trough (177) must be flat or concave over the distance traversed by the flow control plug (172). The flow control plug (172) in this embodiment is positioned at the inlet end, not at the far end as in the first three embodiments.

In time the trough will sag such that eventually the weirs (175) will have the curved shape (176) shown in FIG. 31B. At this time the flow control plug (172) is inserted into the position shown in FIG. 311B such that the contoured top edge has the shape (178) shown in FIG. 31D. This insertion is facilitated by a glass seal (174) at the location shown in FIGS. 31A and 31B. The flow control plug (172) is contoured such that during the time the trough is sagging from the initial weir shape (175) to the shape (176) shown in FIG. 311B, incremental insertion of the plug makes glass of substantially uniform thickness with the original process adjustments. FIG. 31E shows the shape of the region (170) of the glass (136) which ends up in the unusable far end bead (137) as it flows over the top of the flow control plug (172). Because this glass completely covers the flow control plug, any defects caused by the presence of the flow control plug (172) do not cause defects in the useable sheet.

Referring to FIGS. 42A through 42F, FIG. 42A shows a trough and flow control plug design of the present invention. In this embodiment the flow control plug (422) is inserted into the trough (4) through the top surface of the glass (2) in the trough instead of using a glass seal (144), (154), (164), and (174) at an end of the trough as in the previous embodiments. FIG. 42B shows that the flow control plug (422) pierces the glass surface in the region (429) which bounds the glass (136), which forms the unusable far end bead (137). There is a small cavity (421) between the trough bottom (127) and the flow control plug (422). This cavity (421) allows the flow control plug to be moved vertically and horizontally and to be tilted in the trough (4). FIGS. 42C and 42D are side and top views of the flow control plug (422).

In time the trough (4) will sag such that eventually the weirs (5) will have a curved shape. At this time the flow control plug (422) is repositioned vertically, horizontally, and tilted as required to correct the flow distribution error caused by the sagging of the weirs (5) and trough (4). When the glass flow distribution error exceeds that which can be compensated by repositioning of the installed flow control plug (422) which has a top surface contour (427), a flow control plug (423) of a different top surface contour (428) as shown in FIG. 42F may be substituted. FIG. 42E shows the shape of the region (420) of the glass (136) which ends up in the unusable far end bead (137) as it flows over the top of the flow control plugs (422) and (428). Because this glass completely covers the flow control plugs, any defects caused by the presence of the flow control plugs (422) and (428) do not cause defects in the useable sheet.

Multiple Orifices—Bottom Orifice

The prior art overflow process is limited in the sheet thickness that can be created using the system and there is little to no way to modify sheet thickness in an operating production run.

One embodiment of the invention provides a forming apparatus with multiple orifices to allow greater variability in sheet thickness. The forming apparatus proper consists of two independent sides that are most likely but not necessarily mirror images of each other. The outside shape is essentially that of an elongated wedge with the point facing downward. The glass enters one end of a trough formed by the two sides of the forming apparatus under pressure and flows out of a top and bottom orifice formed by the two pieces. Effectively, the bottom orifice adds glass to the middle of the formed sheet.

FIGS. 14A through 14C show a top, side and an inlet view of an embodiment with a horizontal top orifice (20), a horizontal bottom orifice (35) and a shaped trough (4). Glass (2) enters the apparatus from the inflow pipe (3). The trough (4) formed by the two independently mounted sides (36) and the end cap (34). It is tapered toward the far end to minimize the residence time of glass flowing to that end of the apparatus (1). An individual side (36) is shown in FIG. 15A through 15C. The orifice (20) on the top surface of the apparatus (1) extends horizontally from near the inlet end to near the far end. It is wider at the far end to compensate for the loss in static pressure caused by the glass flow in the trough (4). The orifice (35) on the bottom is also wider at the far end being shaped for a specified flow distribution along its length.

A significant portion of the glass (2) that forms the sheet flows out of the bottom orifice (35). The glass (2) that flows out of the top orifice (20) flows down both sloped sides of the wedge, joining at the bottom (root (25)) with the molten glass (2) from the bottom orifice (35) to form a flat sheet of molten glass (2). The molten glass (2) is subsequently cooled until it is a solid sheet and processed such that once the molten glass (2) leaves the root (25) it has essentially the same physical dimensions as a sheet formed without a bottom orifice (35).

The distribution of flow out of the horizontal trough (4) is controlled by the size and shape of each of the contoured orifices (20) and (35) at the top and bottom of the apparatus (1) and the shape of the trough (4). The sum flow of glass (2) through the top and bottom orifices (20) and (35) along the length of the forming apparatus (1) as a total must be substantially uniform in order that the sheet of glass has uniform thickness when formed. The designed shape of the trough (4) and the contoured orifices of the forming apparatus (1) are determined by the solution of the Navier-Stokes equations and confirmed by operational test.

FIGS. 16A through 16C show a top, side and an inlet view of an embodiment with a horizontal top orifice, a horizontal bottom orifice, and a constant cross section trough. Unlike the embodiment shown in FIGS. 14A through 14C, the trough (4) formed by the two independently mounted sides (36) and end cap (34) and has substantially the same cross section for its total length. The orifice (20) on the top surface of the apparatus (1) extends horizontally from near the inlet end to near the far end. It is wider at the far end to compensate for the loss in static pressure caused by flow in the trough (4). The orifice (35) on the bottom is also wider at the far end being shaped for a specified flow distribution along its length. The taper of the top and bottom orifices (20) and (35) is less than the taper shown in FIGS. 14A through 14C as less static pressure loss compensation is required.

The flow is compensated at each end of the forming apparatus (1) to account for end effects caused by surface tension as it affects the flow down the sides of the forming apparatus (1) and the flow in the free space below the forming apparatus (1) before the glass (2) has cooled to a final form. This compensation requires a localized adjustment in the width of the orifice (20) and/or the height of the weirs (5) at each end. This end compensation is applied to each orifice (20) shape.

The sheet thickness will be a function of the quantity of glass flow and glass viscosity at the root (25). The sheet thickness distribution (wedge) will be a primary function of the trough (4) shape and the size and shape of the orifices (20) and (35) and weirs (5). During operation, any wedge in the sheet thickness may be adjusted by tilting the apparatus (1). For instance, if the glass (2) at the far end is thinner than at the inlet end, lowering the far end will flow more glass (2) to that end, consequently thickening the sheet at the far end.

Additional wedge correction may be accomplished by selectively moving the appropriate end of the two sides (36) of the apparatus (1) together or apart to change the width of the orifices (20) and (35). At each end of the apparatus (1) there is variable width gap with a glass seal (37) that allows this movement. Applying torque to the ends of the apparatus sides (36) can effect changes in the thickness contour. Each side (36) can be bowed or made S-shape to effect a uniquely shaped orifice opening. The two sides (36) of the apparatus (1) may be adjusted by displacement, rotation, and torque relative to each other to affect the width and shape of these orifices (20) and (35).

The bottom orifice (35) may be shaped such that the glass flowing out of the center portion is thicker or thinner than that flowing out of the ends. The top orifice (20) would be designed so that the flow distribution at the root (25) is uniform. With this shape moving the individual sides (36) together or apart would produce a curvature correction in the sheet thickness.

The flow out of the top and bottom orifices (20) and (35) may be further modified by a replaceable interior plug (30) that can modify the flow to the orifices (20) and (35). This plug (30) may be used to substantially alter the width of the formed sheet to permit economical manufacture of a broad range of product widths. FIGS. 17A through 17C show a top, side and an inlet view of an embodiment which is the same as that shown in FIGS. 16A through 16C, but with an internal plug (30) which is used to vary sheet width. FIGS. 18A through 18C show a top, side and an inlet view of an internal flow control plug (30) used in the embodiment shown in FIGS. 17A through 17C. This plug (30) is designed to be removable while the forming apparatus (1) is at elevated temperature and to modulate the flow in the trough (4) in a manner that limits the flow of glass (2) out of each end of the top and bottom orifices (20) and (35). Use of the flow control plug (30) will control the width of the glass sheet manufactured.

FIGS. 19A through 19C show a top, side and an inlet view of an embodiment with a sloped top surface with a weir (5) on each side, a horizontal bottom orifice (35), and a shaped trough (4). This embodiment more closely resembles the apparatus of U.S. Pat. No. 3,338,696 in that it has two sloped weirs (5) on top, one on each side, instead of the top orifice (20). Unlike the device taught in the prior patent, it has a bottom orifice (35). Glass (2) enters the forming apparatus body (1) from the inflow pipe (3). The top surface of the apparatus (1) that extends horizontally from the inlet end to the far end has a downward slope to insure even glass flow out of the top of the apparatus and over the weirs (5). The trough (4) formed by the two independently mounted sides (36) is tapered, being smaller toward the far end to control the glass flow over the weirs (5) on the top of the apparatus (1). The orifice on the bottom (35) is also shaped for a specified flow distribution along its length. It is wider at the far end to compensate for the loss in static pressure caused by flow in the trough (4).

Multiple Orifices—Side Orifices

In another embodiment of the invention, the apparatus (1) is formed by two side flow control elements (38), an end cap (34) and a bottom shaped wedge (39) creating a top and two side orifices (20) and (40). FIGS. 20A through 20C show a top, side and an inlet view of an embodiment where the elements form a horizontal top orifice (20) and two horizontal side orifices (40). FIGS. 21A through 21C show a top, side and an inlet view of the two side elements (38) and the bottom forming wedge (39) of the apparatus (1) shown in FIGS. 20A through 20C.

The system would be run at a pressure equal to or higher than the local atmospheric pressure. Glass (2) enters the forming apparatus body (1) from the inflow pipe (3). The glass (2) flows into the trough (4) and exits by a top orifice (20) and two side orifices (40). The glass (2) exiting the top orifice (20) flows down the sides of the apparatus (1) to the location of the side orifices (40) and covers the glass (2) exiting from these side orifices (40). A significant portion of the glass (2) that forms the sheet flows out of each side orifice (40). The combined flow then continues down each side of the forming wedge (39) and all join at the bottom (25) of the forming wedge (39), where they are solidified into a glass sheet.

The distribution of flow out of the horizontal trough (4) is controlled by the size and shape of each of the contoured orifices (20) and (40) at the top and sides of the apparatus (1) and the shape of the trough (4). The shape of the trough (4) may be either simple for ease of manufacture or contoured to assist in the flow and distribution of the glass (2). The orifices (20) and (40) on the top surface and sides of the apparatus (1) extend horizontally from near the inlet end to near the far end. They are wider at the far end to compensate for the loss in static pressure caused by the glass flow in the trough (4), being shaped for uniform flow along the entire orifice length. The width of and thus the flow through the side orifices (40) may be adjusted by vertical movement of the side flow control elements (38). This provides for process adjustment thus enabling different operating conditions.

The sheet thickness will be a function of the quantity of glass flow and glass viscosity at the root (25). The sheet thickness distribution (wedge) will be a primary function of the trough (4) shape and the size and shape of the orifices (20) and (40) and weirs (5). During operation, any wedge in the sheet thickness may be adjusted by tilting the apparatus (1). For instance, if the glass at the far end is thinner than at the inlet end, lowering the far end will flow more glass to that end, consequently thickening the sheet at the far end.

Wedge correction may be accomplished by selectively moving the appropriate end of either of the two sides (38) of the apparatus (1) relative to the bottom wedge (39) to change the width of the orifices (40). The two sides (38) of the apparatus (1) may be adjusted by displacement, rotation, and torque relative to each other to affect the width and shape of the orifices (20) and (40). Each side (38) can be bowed or made S-shape to effect a uniquely shaped orifice (40) opening. A glass seal (37) at each end allows this adjustment. The sum flow of glass (2) through the top and bottom orifices (20) and (40) along the length of the forming apparatus (1) as a total must be substantially uniform in order that the sheet of glass has uniform thickness when formed. The designed shape of the trough (4) and the contoured orifices (20) and (40) of the forming apparatus (1) are determined by the solution of the Navier-Stokes equations and confirmed by operational test.

The side orifices (40) may be shaped such that the glass flowing out of the center portion is thicker or thinner than that flowing out of the ends. The top orifice (20) would be designed so that the flow distribution at the root (25) is uniform. With this shape, moving the individual sides (38) vertically would produce a curvature correction in the sheet thickness.

The flow out of the top and side orifices (20) and (40) may be further modified by a replaceable interior plug (30) which can modify the flow to the orifices (20) and (40). This plug (30) may be used to substantially alter the width of the formed sheet to permit economical manufacture of a broad range of product widths. In any of the embodiments the glass flow to the orifices (20) and (40) may be altered by contouring the internal shape of the bottom forming wedge (39) element and/or the side flow control elements (38). A formed body or plug (30) attached to either of the end plates may also be used to alter the flow pattern in the trough (4). This plug (30) may be extended into the trough (4) to effectively shorten the length of the orifices such that narrower sheet may be manufactured.

A similar embodiment is shown in FIGS. 22A through 22C but the elements form a sloped top surface with weirs (5) at each side and two horizontal side orifices (40). FIGS. 23A through 23C show a top, side and an inlet view of the two side elements (38), the end cap (34) and the bottom forming wedge (39) of the apparatus shown in FIGS. 22A through 22C. The glass (2) flows into the trough (4) and exits over weirs (5) on each side of the top surface and by orifices (40) on sides of the cavity. The glass exiting the top weirs (5) flows down the sides of the apparatus (1) to the location of the side orifices (40) and covers the glass exiting from these side orifices. The combined flow then continues down each side of the forming wedge (39) and joins at the bottom of the forming wedge (39), where they are solidified into a glass sheet. The weirs (5) on the top surface extend horizontally from near the inlet end to near the far end and are sloped to produce uniform flow over the entire length. The orifices (40) on the sides of the apparatus (1) extend horizontally from near the inlet end to near the far end. They are wider at the far end to compensate for the loss in static pressure caused by the glass flow in the trough (4), being shaped for uniform flow along the entire orifice length. The width of and thus the flow through the side orifices (40) may be adjusted by vertical movement of the side flow control elements (38). This provides for process adjustment thus enabling different operating conditions.

Heating and Cooling of Glass

Prior art requires that the molten glass (2) be maintained at a constant temperature in the inlet pipe (3), the full length of the trough (4), over the weirs (5) and on the upper part of the forming apparatus body (1). The glass is uniformly cooled as it approaches the root (25) of the forming apparatus body (1) in preparation to becoming a solid sheet.

Additional thickness correction may be accomplished by selective heating or cooling of the molten glass (2) in the trough (4), and/or heating the weirs and thus the molten glass (2) flowing over the weirs, and/or heating the orifice (20) and thus the molten glass (2) flowing through the orifice. One caveat with this approach is that the molten glass (2) flowing from the root (25) of the apparatus (1) must be of substantially uniform temperature. Therefore, the glass molten (2) would need to be selectively cooled or heated as it flows down the outside of the apparatus in order to produce the required substantially uniform temperature.

FIGS. 24A through 24C show an embodiment that has a simple trough (4) with sloped weirs (5), radiant top heating devices (42) and radiant side heating devices (44). The top heating devices (42) would be individually powered to either heat or cool the molten glass (2) as it flows through the trough (4). The lowered viscosity of the molten glass caused by a heating strategy would flow substantial molten glass (2) to the far end of the forming apparatus body (1). This heating or cooling effect could be made linear thus effecting the wedge in glass sheet thickness or nonlinear thus effecting the curvature of the glass sheet thickness. The side heating devices would be selectively powered to restore the molten glass (2) to a substantially uniform temperature as it reaches the root (25) of the forming apparatus body (1).

An additional embodiment would be an electrical heating system inserted in the trough. If the two parallel elements of the flow control plug shown in FIGS. 13A through 13C were constructed as individual isolated electrodes, they may be used as a pair of electrodes for introducing electrical energy through the electrically conductive molten glass (2) from one side to the other side of the trough (4).

Numerous other methods of heating the weirs (5), the orifice (20), and/or the molten glass (3) in the trough (4) are possible. If the weirs (5) are made from molybdenum or are clad with platinum they may be used as a pair of electrodes for firing electrical energy through the electrically conductive molten glass (2) from one side to the other side of the trough (4). If either the weirs (5) or the orifice (20) are clad with platinum, they may be used as a conductor in an electric circuit to heat the molten glass (2). If either the weirs (5) or the orifice (20) are made from molybdenum or are clad with platinum and the flow control plug (30) is an electrode, an electric circuit may be established to heat the electrically conductive molten glass (2) in the trough (4). All of the above heating techniques would require some type of selectively powered side heating devices (44) to restore the molten glass (2) to a substantially uniform temperature as it reaches the root (25) of the forming apparatus body (1).

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An improved apparatus for forming sheet glass, wherein the apparatus includes a trough for receiving molten glass that has sides attached to a wedged shaped sheet forming structure that has downwardly sloping weirs converging at the bottom of the wedge such that a glass sheet is formed when molten glass flows over the sides of the trough, down the downwardly sloping sides of the wedged shaped sheet forming structure and meets at the bottom of the wedge, and wherein the improvement comprises:

an internally mounted flow control plug mechanism that can be inserted and adjusted within the trough to change at least one flow characteristic of the molten glass within the trough, wherein the flow control plug mechanism forms at least a portion of a bottom of the trough and wherein the glass that flows in direct contact with the flow control plug mechanism ends up in an unusable far end bead.

2. The apparatus of claim 1, further comprising a glass seal, wherein the elements of the trough are held together with the glass seal such that small adjustments in a position of the flow control plug mechanism may be made.

3. The apparatus of claim 2, wherein when the weirs begin to sag due to extended use, the flow control plug mechanism is incrementally rotated along a centerline of the bottom of the trough to make glass of substantially uniform thickness.

4. The apparatus of claim 2, further comprising an inflow pipe for delivering molten glass to the trough, wherein the flow control plug mechanism is positioned at an end of the trough opposite the inflow pipe.

5. The apparatus of claim 2, wherein the flow control plug mechanism comprises at least one flow control plug.

6. The apparatus of claim 2, wherein the flow control plug mechanism comprises at least two flow control plugs, and wherein, when the weirs begin to sag due to extended use, the flow control plugs may be independently raised or tilted out of a cavity in the bottom of the trough to make glass of substantially uniform thickness.

7. The apparatus of claim 2, further comprising an inflow pipe for delivering molten glass to the trough, wherein the flow control plug mechanism is positioned at an end of the trough where molten glass is delivered from the inflow pipe.

8. The apparatus of claim 2, wherein the bottom of the trough is substantially flat.

9. The apparatus of claim 8, further comprising an inflow pipe for delivering molten glass to the trough, wherein the flow control plug mechanism is positioned at an end of the trough where molten glass is delivered from the inflow pipe.

10. The apparatus of claim 2, wherein the portion of the flow control plug mechanism forming the bottom of the trough is substantially flat.

11. The apparatus of claim 2, wherein the portion of the flow control plug mechanism forming the bottom of the trough is contoured.

12. The apparatus of claim 2, wherein the flow control plug mechanism is removable and replaceable.

13. The apparatus of claim 12, wherein the flow control plug has a contoured shape on both a top and a bottom along at least a portion of a length of the trough such that it can be installed in either a 0 degree or a 180 degree position.

14. The apparatus of claim 12, wherein the flow control plug has a top contoured shape along at least a portion of a length of the trough.

15. The apparatus of claim 12, wherein the flow control plug has a contoured shape along at least a portion of a length of the trough and a longitudinally adjustable top portion that pierces a top surface of the molten glass in the trough, wherein the top portion can be repositioned during operation to change at least one flow characteristic of the molten glass in the trough.

16. The apparatus of claim 1, wherein the flow control plug mechanism is inserted into the trough through a top surface of the glass at a far end of the trough, wherein the flow control plug mechanism is removable and replaceable.

17. The apparatus of claim 1, wherein the flow control plug mechanism is inserted into the trough through a top surface of the glass at a far end of the trough, wherein the flow control plug mechanism is adjustable vertically, horizontally and angularly during operation.

18. The apparatus of claim 17, wherein when the weirs begin to sag due to extended use, the flow control plug mechanism can be incrementally moved vertically, horizontally, or is tilted to make glass of substantially uniform thickness.

19. The apparatus of claim 17, wherein the flow control plug mechanism comprises at least two flow control plugs.

20. An improved method for forming sheet glass using an apparatus that includes a trough for receiving molten glass that has sides attached to a wedged shaped sheet forming structure that has downwardly sloping weirs converging at the bottom of the wedge such that a glass sheet is formed when molten glass flows over the sides of the trough, down the downwardly sloping sides of the wedged shaped sheet forming structure and meets at the bottom of the wedge, and wherein the improvement comprises:
  a) providing an internally mounted flow control plug mechanism that can be inserted and adjusted within the trough to change at least one flow characteristic of the molten glass within the trough, wherein the glass that flows in direct contact with the flow control plug mechanism ends up in an unusable far end bead;
  b) using the flow control plug to adjust at least one flow characteristic of the molten glass within the trough; and
  c) flowing molten glass into the trough such that a glass sheet of substantially uniform thickness is formed.

21. The method of claim 20, further comprising the step of holding a plurality of elements of the trough together using a glass seal such that small adjustments in a position of the flow control plug mechanism may be made.

22. The method of claim 21, wherein the flow control plug mechanism is removable and replaceable.

23. The method of claim 20, wherein the flow control plug mechanism comprises at least one flow control plug.

24. The method of claim 20, wherein the flow control plug mechanism forms at least a portion of a bottom of the trough.

25. The method of claim 20, wherein a portion of the flow control plug mechanism pierces a top surface of the molten glass.

26. The method of claim 25, wherein the flow control plug mechanism is removable and replaceable.

27. An apparatus for forming sheet glass comprising:
  an inflow pipe of appropriate structure for conveying molten glass under pressure;
  a trough having sides and a top attached to the inflow pipe wherein the trough receives the molten glass;
  an orifice running along the top of the trough having a width and a length such that as molten glass is conveyed to the trough the molten glass exits through the orifice and passes down the sides of the trough; and
  a wedged shaped sheet forming structure attached to the trough having a wedge at the bottom of the structure such that a glass sheet of substantially uniform thickness is formed when molten glass passes down the sides of the trough and meets at the bottom of wedge;
  wherein as the width of the orifice changes during a duration of a production campaign as the orifice deforms due to thermal creep caused by internal hydrostatic pressure, a structure of the orifice, the width of the orifice, and the length of the orifice at each location along the orifice are designed such that a linear flow characteristic is maintained with respect to all locations along the orifice except at the ends of the orifice.

28. The apparatus of claim 27, wherein as the orifice is made larger by a stress applied to the apparatus, a percentage width increase is the same at all locations along the orifice such that a percentage increase in glass flow is also the same at all locations along the orifice.

29. The apparatus of claim 27, wherein as the orifice is made larger by a stress applied to the apparatus, a percentage width increase at all locations along the orifice is proportioned to account for a change in internal hydrostatic pressure caused by a deformation of the apparatus in order to maintain equal glass flow at all locations along the orifice except at the ends of the orifice.

30. The apparatus of claim 27, wherein the orifice has a varying shape along its length.

31. The apparatus of claim 27, wherein a top surface of the orifice is concave.

32. The apparatus of claim 27, wherein a top surface of the orifice is convex.

33. The apparatus of claim 27, wherein a top surface of the orifice is substantially flat.

34. The apparatus of claim 27, wherein the trough has a circular shape in cross section along its entire length.

35. The apparatus of claim 27, wherein the trough has a trapezoidal shape in cross section in a center of the trough and a rectangular shape at each end of the trough.

36. The apparatus of claim 27, further comprising a plurality of end support blocks to control a deformation of the orifice caused by a hydrostatic stress applied to the trough.

37. The apparatus of claim 36, wherein two upper support blocks are located at a first, inlet end of the trough and two upper support blocks are located at a second, far end of the trough, wherein the upper support blocks are attached to an edge of the orifice and exert a compressive force on the orifice to counteract an effect of a hydrostatic force.

38. The apparatus of claim 36, wherein the end support blocks comprise eight end support blocks, wherein five of the end support blocks are located at a first inlet, end of the trough, wherein the five inlet end support blocks comprise a lower inlet end support block and two sets of inlet end orifice support blocks, and three of the end support blocks are located at a second, far end of the trough, wherein the three far end support blocks comprise a lower far end support block and one set of far end orifice support blocks, wherein a longitudinal compression force is applied to the lower inlet end support block and the lower far end support block and a lateral force is applied to the inlet end orifice support blocks and the far end orifice support blocks.

39. The apparatus of claim 27, wherein a percentage change in a rate of flow of molten glass over time is equal at all locations along the orifice except at the ends of the orifice.

40. The apparatus of claim 27, further comprising an internally mounted flow control plug mechanism that can be inserted and adjusted within the trough to change at least one flow characteristic of the molten glass within the trough, wherein the glass that flows over a top of the flow control plug mechanism ends up in an unusable far end bead.

41. A method for forming sheet glass comprising:
  a) providing an inflow pipe connected to a trough having sides and a top attached to the inflow pipe;
  b) designing an orifice running along the top of the trough having a width and a length such that as molten glass is conveyed to the trough, a uniform flow of the molten glass exits through the orifice and passes down the sides of the trough;

c) providing the orifice;

d) providing a wedged shaped sheet forming structure attached to the trough having a wedge at a bottom of the structure;

e) conveying molten glass through the inflow pipe into the trough such that the molten glass exits through the orifice and flows down the sides of the trough and meets at the bottom of the wedge and forms a glass sheet of substantially uniform thickness;

f) calculating via finite element analysis a change in orifice width produced by thermal creep for an assumed structure;

g) redesigning the orifice, which has a uniform linear flow characteristic at all locations along the orifice except at the ends of the orifice at an initial width, at least one intermediate width and a final width, using computational fluid dynamics;

h) calculating a new width change with the assumed structure via finite element analysis, using the pressure information and an orifice shape from step f); and i) using an iterative procedure of changing a structural design and an orifice size and shape until a solution converges to a useable design.

42. The method of claim 41, further comprising the step of redesigning the orifice such that, as the orifice deforms over time, the orifice maintains a linear flow characteristic at all locations along the orifice except at the ends of the orifice.

43. The method of claim 41, further comprising the step of proportioning the width and the length of the orifice such that a restriction to glass flow through the orifice is equal at all locations along the orifice except at the ends of the orifice.

44. The method of claim 41, further comprising the step of designing the wedge shaped sheet forming structure which supports the orifice such that a deformation of the apparatus structure over time due to thermal creep maintains the orifice at a constant width at all locations along the orifice except at the ends of the orifice.

45. The method of claim 44, further comprising the step of designing the wedge shaped sheet forming structure such that the constant width calculated is biased to account for a change in internal hydrostatic pressure caused by a deformation of the apparatus in order to keep the glass flow equal at all locations along the orifice except at the ends of the orifice.

46. An apparatus for forming sheet glass comprising:
an inflow pipe of appropriate structure for conveying molten glass under pressure;
a trough having sides and a top attached to the inflow pipe wherein the trough receives the molten glass;
an orifice running along the top of the trough having a width and a length such that as molten glass is conveyed to the trough the molten glass exits through the orifice and passes down the sides of the trough; and
a wedged shaped sheet forming structure attached to the trough having a wedge at the bottom of the structure such that a glass sheet of substantially uniform thickness is formed when molten glass passes down the sides of the trough and meets at the bottom of the wedge;
wherein as the forming apparatus changes shape during the duration of a production campaign as the orifice deforms due to thermal creep caused by internal hydrostatic pressure, a structure of the orifice, the width of the orifice and the length of the orifice at each location along the orifice are designed such that the orifice maintains a substantially constant width with respect to all locations along the orifice except at the ends of the orifice.

47. The apparatus of claim 46, wherein any width change is proportioned to account for a change in internal hydrostatic pressure caused by a deformation of the apparatus in order to keep the glass flow equal at all locations along the orifice except at the ends of the orifice.

48. An improved apparatus for forming sheet glass, wherein the apparatus includes a trough for receiving molten glass that has sides attached to a wedged shaped sheet forming structure that has downwardly sloping weirs converging at the bottom of the wedge such that a glass sheet is formed when molten glass flows over the sides of the trough, down the downwardly sloping sides of the wedged shaped sheet forming structure and meets at the bottom of the wedge, and wherein the improvement comprises:
an internally mounted flow control plug mechanism that can be inserted and adjusted within the trough to change at least one flow characteristic of the molten glass within the trough, wherein the glass that flows in direct contact with the flow control plug mechanism ends up in an unusable far end bead; and
an inflow pipe for delivering molten glass to the trough, wherein the flow control plug mechanism is positioned at an end of the trough opposite the inflow pipe.

49. An improved apparatus for forming sheet glass, wherein the apparatus includes a trough for receiving molten glass that has sides attached to a wedged shaped sheet forming structure that has downwardly sloping weirs converging at the bottom of the wedge such that a glass sheet is formed when molten glass flows over the sides of the trough, down the downwardly sloping sides of the wedged shaped sheet forming structure and meets at the bottom of the wedge, and wherein the improvement comprises:
an internally mounted flow control plug mechanism that can be inserted and adjusted within the trough to change at least one flow characteristic of the molten glass within the trough, wherein the flow control plug mechanism is inserted into the trough through a top surface of the glass at a far end of the trough, wherein the glass that flows in direct contact with the flow control plug mechanism ends up in an unusable far end bead.

50. The apparatus of claim 49 wherein the flow control plug mechanism is removable and replaceable.

51. The apparatus of claim 49, wherein the flow control plug mechanism is adjustable vertically, horizontally and angularly during operation.

52. An improved apparatus for forming sheet glass, wherein the apparatus includes a trough for receiving molten glass that has sides attached to a wedged shaped sheet forming structure that has downwardly sloping weirs converging at the bottom of the wedge such that a glass sheet is formed when molten glass flows over the sides of the trough, down the downwardly sloping sides of the wedged shaped sheet forming structure and meets at the bottom of the wedge, and wherein the improvement comprises:
an internally mounted flow control plug mechanism that can be inserted and adjusted within the trough to change at least one flow characteristic of the molten glass within the trough, wherein the glass that flows in direct contact with the flow control plug mechanism ends up in an unusable far end bead; and an inflow pipe for delivering molten glass to the trough, wherein the flow control plug mechanism is positioned at an end of the trough where molten glass is delivered from the inflow pipe.

53. An apparatus for forming sheet glass comprising:
an inflow pipe of appropriate structure for conveying molten glass under pressure;
a trough having sides and a top attached to the inflow pipe wherein the trough receives the molten glass;
an orifice running along the top of the trough having a width and a length such that as molten glass is conveyed to the trough the molten glass exits through the orifice and passes down the sides of the trough, wherein as the orifice deforms over time, the orifice maintains a linear flow characteristic with respect to all locations along the orifice except at the ends of the orifice; and
a wedged shaped sheet forming structure attached to the trough having a wedge at the bottom of the structure such that a glass sheet of substantially uniform thickness is formed when molten glass passes down the sides of the trough and meets at the bottom of wedge;
wherein a top surface of the orifice is selected from the group consisting of a concave surface, a convex surface, and a substantially flat surface.

54. An apparatus for forming sheet glass comprising:
an inflow pipe of appropriate structure for conveying molten glass under pressure;
a trough having sides and a top attached to the inflow pipe wherein the trough receives the molten glass;
an orifice running along the top of the trough having a width and a length such that as molten glass is conveyed to the trough the molten glass exits through the orifice and passes down the sides of the trough, wherein as the orifice deforms over time, the orifice maintains a linear flow characteristic with respect to all locations along the orifice except at the ends of the orifice;
a wedged shaped sheet forming structure attached to the trough having a wedge at the bottom of the structure such that a glass sheet of substantially uniform thickness is formed when molten glass passes down the sides of the trough and meets at the bottom of wedge; and
a plurality of end support blocks to control a deformation of the orifice caused by a hydrostatic stress applied to the trough.

* * * * *